(12) United States Patent
Takahashi

(10) Patent No.: US 7,684,685 B2
(45) Date of Patent: Mar. 23, 2010

(54) IMAGE STABILIZER, LENS BARREL AND IMAGER APPARATUS

(75) Inventor: Tatsuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 11/446,268

(22) Filed: Jun. 5, 2006

(65) Prior Publication Data

US 2006/0285840 A1 Dec. 21, 2006

(30) Foreign Application Priority Data

Jun. 7, 2005 (JP) ............................. 2005-167307
Jun. 17, 2005 (JP) ............................. 2005-178358
Nov. 2, 2005 (JP) ............................. 2005-319786

(51) Int. Cl.
*G03B 17/00* (2006.01)

(52) U.S. Cl. ................... 396/55; 348/208.4; 348/208.5; 348/208.11; 348/208.99; 359/554; 359/555; 359/556; 359/557

(58) Field of Classification Search ................... 396/55; 359/554–557; 310/208, 179; 348/208.4, 348/208.5, 208.11, 208.99
See application file for complete search history.

(56) References Cited

U.S. PATENT DOCUMENTS

| 4,644,205 | A | | 2/1987 | Sudo et al. | |
|---|---|---|---|---|---|
| 4,834,006 | A | | 5/1989 | Goto | |
| 5,266,988 | A | * | 11/1993 | Washisu | 396/55 |
| 5,627,687 | A | * | 5/1997 | Fujisawa | 359/823 |
| 5,689,369 | A | | 11/1997 | Noguchi | |
| 5,723,933 | A | * | 3/1998 | Grundl et al. | 310/266 |
| 5,835,799 | A | * | 11/1998 | Washisu | 396/55 |
| 5,880,455 | A | * | 3/1999 | Otaki et al. | 250/201.8 |
| 5,883,742 | A | | 3/1999 | Kamata | |
| 5,910,859 | A | | 6/1999 | Takahashi et al. | |
| 5,974,269 | A | | 10/1999 | Sato et al. | |
| 5,978,137 | A | | 11/1999 | Takahashi et al. | |
| 5,995,762 | A | | 11/1999 | Enomoto et al. | |
| 6,052,240 | A | * | 4/2000 | Ikari | 359/819 |
| 6,057,963 | A | * | 5/2000 | Hirunuma et al. | 359/557 |
| 6,226,123 | B1 | * | 5/2001 | Kanai et al. | 359/557 |

(Continued)

FOREIGN PATENT DOCUMENTS

DE 198 21 224 A1 11/1998

(Continued)

OTHER PUBLICATIONS

Non-final Office Action dated Aug. 21, 2008 in U.S. Appl. No. 11/446,269 (15 pages).

(Continued)

*Primary Examiner*—William B. Perkey
*Assistant Examiner*—Linda B Smith
(74) *Attorney, Agent, or Firm*—Finnegan, Henderson, Farabow, Garrett & Dunner, L.L.P.

(57) ABSTRACT

An image stabilizer that stabilizes images by moving a correcting lens for stabilizing images formed by a lens system in a first direction and a second direction which are perpendicular to an optical axis of said lens system and which are perpendicular to each other, includes a driver which is provided at one side of the correcting lens and which moves the correcting lens in the first direction and the second direction.

11 Claims, 44 Drawing Sheets

U.S. PATENT DOCUMENTS

| | | | |
|---|---|---|---|
| 6,327,433 B1 * | 12/2001 | Ishikawa et al. | 396/55 |
| 6,377,521 B1 * | 4/2002 | Kijima et al. | 369/44.23 |
| 6,456,444 B1 | 9/2002 | Yumiki et al. | |
| 6,587,270 B2 | 7/2003 | Terada | |
| 6,819,500 B2 | 11/2004 | Tsuzuki | |
| 6,856,345 B1 * | 2/2005 | Yamamoto et al. | 348/207.2 |
| 7,009,321 B1 * | 3/2006 | Mahoney et al. | 310/208 |
| 7,330,405 B2 | 2/2008 | Matsui | |
| 7,375,908 B2 | 5/2008 | Takahashi | |
| 2001/0014213 A1 | 8/2001 | Terada | |
| 2003/0184878 A1 | 10/2003 | Tsuzuki | |
| 2004/0245861 A1 * | 12/2004 | Miyajima et al. | 310/12 |
| 2007/0009244 A1 | 1/2007 | Takahashi | |

FOREIGN PATENT DOCUMENTS

| | | |
|---|---|---|
| JP | 03-186823 | 8/1991 |
| JP | 03-188430 | 8/1991 |
| JP | 07-105553 | 4/1995 |
| JP | 8-63769 | 3/1996 |
| JP | 08 194964 | 7/1996 |
| JP | 9-91725 | 4/1997 |
| JP | 10-311995 | 11/1998 |
| JP | 2000-123387 | 4/2000 |
| JP | 2000-231129 | 8/2000 |
| JP | 2000-258813 | 9/2000 |
| JP | 2001-021783 | 1/2001 |
| JP | 2003-015009 | 1/2003 |
| JP | 2007-017957 | 1/2007 |

OTHER PUBLICATIONS

Final Office Action dated Feb. 19, 2009 in U.S. Appl. No. 11/446,269 (14 pages).

Notice of Allowance with Notice of Allowability dated Jan. 25, 2008 in U.S. Appl. No. 11/446,149, now U.S. Patent 7,375,908 (7 pages).

International Search Report from the European Patent Office mailed Nov. 2, 2009 in International Application No. EP 06 25 2903 (5 pages).

* cited by examiner

IMAGE STABILIZER, LENS BARREL AND IMAGER APPARATUS

CROSS REFERENCES TO RELATED APPLICATIONS

The present invention contains subject manner related to Japanese Patent Application JP 2005-167307 filed in the Japanese Patent Office on Jun. 6, 2005, JP 2005-178358 filed in the Japanese Patent Office on Jun. 17, 2005 and JP 2005-319786 filed in the Japanese Patent Office on Sep. 2, 2005, the entire contents of which being incorporated herein by reference.

BACKGROUND OF THE INVENTION

1. Field of the Invention

The present invention relates to an image stabilizer which stabilizes image blurred by vibration or the like at the time of shooting; a lens barrel which has the image stabilizer; and an imager apparatus such as a digital still camera or video camera, incorporating the lens barrel.

2. Description of the Related Art

In recent years, performance of an imager apparatus such as a digital still camera and a video camera has been improved remarkably, and it became possible for anyone to easily shoot still pictures and moving pictures with high image quality and with high efficiency. Improved efficiency of such an imager apparatus owes to high performance of an imager apparatus such as a lens, a CCD and CMOS, and an image processing circuit.

However, even though the lens, the CCD and the like can be made higher in performance, if hand shake or vibration occurs in photographer's hands by which a camera (imager apparatus) is held, blurring occurs in images with high resolution and shot images are blurred. To solve this problem, a part of relatively expensive cameras is equipped with an image stabilizer capable of stabilizing images blurred by camera shake and the like upon image pickup. However, cameras that require such image stabilizer are not professional-level cameras, and it is to be understood that image stabilizers are indispensable to consumer cameras for a large number of amateur photographers with less shooting experience.

Further, in general, a demand for smaller and lighter cameras (imager apparatuses) is strong and most of photographers like cameras which are light in weight and easy to carry. However, since an image stabilizer in related art is comparatively large in size, when such large image stabilizer is mounted on a camera body, the whole of the camera becomes large in size, which is against a demand for making cameras smaller in size and lighter in weight. In addition, image stabilizers in related art require a large number of components and a problem arises, in which a cost of cameras increases as the number of components is increased.

As this kind of image stabilizer in related art, there is an image stabilizer described in Patent Literature 1, for example. In Patent Literature 1, there is described the one relating to a vibration-prevention device provided in a camera or the like, which detects camera shakes relatively low in frequency and uses the detected results as information for the prevention of image blurring, thereby preventing image blurring. This vibration-prevention device described in Patent Literature 1 (hereinafter referred to as "a first related-art example") is a vibration-prevention device for a camera, including: a correcting optical mechanism, a vibration detector and a vibration-prevention controller. The correcting optical mechanism is provided inside a lens barrel holding a lens group and deviates the optical axis of the lens group. The vibration detector detects vibration applied to the lens barrel. The vibration-prevention controller prevents vibration by driving the correcting optical mechanism based upon a signal from the above-described vibration detector. The correcting optical mechanism has: a correcting lens, a fixing frame, a first holding frame, a second holding frame, first and second coils, first and second drivers, and first and second position detectors. The fixing frame fixes the correcting lens. The first holding frame holds the fixing frame in such a manner that the fixing frame can be moved in the first direction different from the optical axis direction of the lens group. The second holding frame holds the first holding frame in such a manner that the first holding frame can be moved in the second direction different from the optical axis direction and the first direction, and is fixed to the lens barrel. The first and second coils move the first and second holding frames in the first and second directions, respectively. The first and second drivers are formed of first and second magnetic field generating members facing the first and second coils. The first and second position detectors detect the amount in which the fixing frame and the first holding frame are moved in the first and second directions. And at least one of the first and second magnetic field generating members and the first and second position detectors are provided in a fixed member including the second holding frame, fixed to the lens barrel.

According to the vibration-prevention device with the structure described in Patent Literature 1, there can be expected the effectiveness in which the vibration-prevention device can respond to vibration up to high-frequency vibration without increasing the cost and the large space.

As another example of an image stabilizer in related art, there is an image stabilizer described in Patent Literature 2, for example. In Patent Literature 2, there is described the one relating to a camera image blurring restrainer in which vibration (camera shakes) of approximately 1 Hz to 12 Hz in frequency applied to an apparatus such as a camera are detected to be used as information for restraining image blurring, thereby preventing image blurring. This camera image blurring restrainer described in Patent Literature 2 (hereinafter referred to as "a second related-art example") calculates a correction amount of deviating the optical axis necessary for restraining image blurring on an image surface, based upon detected information on vibration applied to a lens barrel. And, according to the above-mentioned correction amount, the image blurring restrainer controls movement of a correcting optical system supported in a floating manner so as to be moved in the diameter direction of the lens barrel. Regarding the support of the above-mentioned correcting optical system in a floating manner, there are provided a first holding frame and a second holding frame. The first holding frame supports the correcting optical system in such a manner that the correcting optical system can be moved in the first direction set within a plane that is perpendicular to the optical axis, but restricts movement in other directions than that. The second holding frame supports the second holding frame in such a manner that the second holding frame can be moved in a second direction that is different from the first direction within the above-mentioned plane, but restricts movements in other directions than that. And, this second holding frame is fixed to the lens barrel.

According to the camera image blurring restrainer with the structure described in Patent Literature 2, there can be expected the effectiveness in which there is no problem of being out of focus at the time of restraining image blurring. Also, since the correcting optical mechanism can be constructed with its size being small in the direction of the optical axis, there can be expected the effectiveness in which a camera can be small-sized.

Also, as yet another example of an image stabilizer in related art, there is an image stabilizer described in Patent Literature 3, for example. In Patent Literature 3, there is described the one relating to a lens drive device of an optical apparatus. This lens drive described in Patent Literature 3 (hereinafter referred to as "a third related-art example") is a lens drive device including: a first driver and a second driver. The first driver drives a lens storage portion holding a lens in a first direction within a plane that is perpendicular to the optical axis of the above-described lens. The second driver drives the lens storage portion in a second direction perpendicular to the first direction within the plane. And, the first driver and the second driver are aligned along an axis parallel with the optical axis of the lens.

According to the lens drive device with the structure described in Patent Literature 3, there can be expected the effectiveness in which a lens drive device that drives a correcting lens for stabilizing blurred images can be small-sized.

[Patent Literature 1] Japanese Published Patent Application No. H3-186823

[Patent Literature 2] Japanese Published Patent Application No. H3-188430

[Patent Literature 3] Japanese Published Patent Application No. H10-311995

However, regarding the first and second related-art examples, the area as regards an image stabilizer becomes large in the directions perpendicular to the optical axis of a correcting lens, so that there is not only a problem in which a lens device and an imager apparatus are made large as a whole, but also a problem that the number of components increases, which results in considerable cost increase. Specifically, regarding the first and second related-art examples, a fixing frame having a correcting lens is roughly formed into a square shape, a pair of yaw shafts are disposed outside the fixing frame on both sides in the lengthwise direction, and a pair of pitch shafts are disposed outside the fixing frame on both sides in the widthwise direction. Further, pitch coils are attached to both ends of the fixing frame in the lengthwise direction, and each pitch coil is provided inside a first magnetic circuit made of a magnet and a yoke.

Regarding the pair of pitch shafts, both ends thereof are supported by a first holding frame, and the fixing frame is supported in such a manner that the fixing frame can move in a pitch direction with respect to this pair of pitch shafts. Also, regarding the pair of yaw shafts, both ends thereof are supported by the first holding frame, and a pair of housings fixed to a second holding frame are fitted on this pair of yaw shafts in a freely slidable manner. Further, a pair of yaw coils are attached to the outside of the pair of yaw shafts of the first holding frame, and each yaw coil is provided inside a second magnetic circuit made of a magnet and a yoke.

Thus, by applying electric current to the pitch coils of the first magnetic circuit, the fixing frame having the correcting lens is driven in a pitch direction regarding the first holding frame. Also, by applying electric current to the yaw coils of the second magnetic circuit, the fixing frame having the correcting lens is driven in a yaw direction regarding the second holding frame, integrally with the first holding frame.

However, in the case of the first and second related-art examples, a structure is employed in which a magnet and a yoke are necessary for both an actuator for driving a correcting lens in a first direction (for example, a pitch direction) and an actuator for driving the correcting lens in a second direction (for example, a yaw direction), and those actuators are disposed in such a manner as to surround all sides of the correcting lens. For that reason, an image stabilizer becomes large in the directions perpendicular to the optical axis of the correcting lens, hence the above-mentioned problem in which the whole of device is enlarged and the number of components increases, occurs, thereby leading to cost increase.

Also, in the third related-art example, coils of a first actuator for driving a correcting lens in a first direction and of a second actuator for driving the correcting lens in a second direction are both constructed of flat coils which are wound to expand in a direction parallel with the optical axis of the correcting lens. For that reason, a magnet and a yoke for the first actuator and a magnet and a yoke for the second actuator are separately required, hence a large number of components are required to make the number of processing and assembly processes increase, which leads to a problem of cost increase.

Further, between the yoke for the first actuator and the yoke for the second actuator is provided one center yoke which serves as a yoke for the two actuators. As a result, the magnetic flux density of each of the magnets of the first and second actuators has to be prepared by one yoke, so that it is necessary to provide in a predetermined position a center yoke which is twice as thick and capable of saturating the magnetic flux density of each magnet. For that reason, the area of an image stabilizer becomes large in the directions perpendicular to the optical axis of the correcting lens, thus causing a lens barrel and an imager apparatus as a whole to be large.

Also, in the first, second and third related-art examples, a holding frame which has a correcting lens is guided and supported in a movable manner in a first direction and a second direction perpendicular to each other; and the guide supporting mechanism is formed of a combination of a shaft and a bearing portion, each forming a pair with two sets thereof. In this case, there may be required a gap of a certain size between the shafts and bearings to allow the holding frame to move, thereby causing rattle at the time of the movement, which makes smooth movement difficult and makes the position of the correcting lens unstable.

SUMMARY OF THE INVENTION

As described in the related-art examples, there is a problem in which when actuators for driving a correcting lens in a first direction and in a second direction perpendicular to the optical axis of the correcting lens are provided separately from each other, and those actuators are disposed in the vicinity of the correcting lens, an image stabilizer becomes large in the directions perpendicular to the optical axis of the correcting lens, thus enlarging the whole of the device. Also, there is a problem in which when a magnet and a yoke are necessary for each actuator, a large number of parts may be required, and so the number of processing and assembly processes increase, leading to cost increase.

An image stabilizer according to an embodiment of the present invention stabilizes images by moving a correcting lens for stabilizing images formed by a lens system in a first direction and a second direction which are perpendicular to an optical axis of the lens system and which are perpendicular to each other. The image stabilizer includes a driver which is provided at one side of the correcting lens and which moves the correcting lens in the first direction and the second direction.

A lens barrel according to an embodiment of the present invention includes an image stabilizer that stabilizes images by moving a correcting lens for stabilizing images formed by a lens system in a first direction and a second direction which are perpendicular to an optical axis of a lens system and which are perpendicular to each other. The image stabilizer includes a driver which is provided at one side of the correcting lens and which moves the correcting lens in the first direction and the second direction.

An imager apparatus according to an embodiment of the present invention includes: a lens barrel having an image stabilizer that stabilizes images by moving a correcting lens for stabilizing images formed by a lens system in a first direction and a second direction which are perpendicular to an optical axis of a lens system and which are perpendicular to each other; and an imager apparatus case in which the lens barrel is stored. The image stabilizer includes a driver which is provided at one side of the correcting lens and which moves the correcting lens in the first direction and the second direction.

According to an embodiment of an image stabilizer, a lens barrel and an imager apparatus of the present invention, a driver which moves a correcting lens in directions perpendicular to the optical axis of a lens system is provided at one side of the correcting lens, and so the number of components can be reduced, and the lens barrel and the imager apparatus can be small-sized by reducing space for the driver.

DESCRIPTION OF THE PREFERRED EMBODIMENTS

A driver is arranged at one side of a correcting lens and the driver moves the correcting lens in a first direction and a second direction, and so an apparatus for stabilizing images can be small-sized; and an image stabilizer, a lens barrel and an imager apparatus are obtained in which the correcting lens can be moved swiftly and surely in the first direction and the second direction with a simplified structure.

Figure 1:
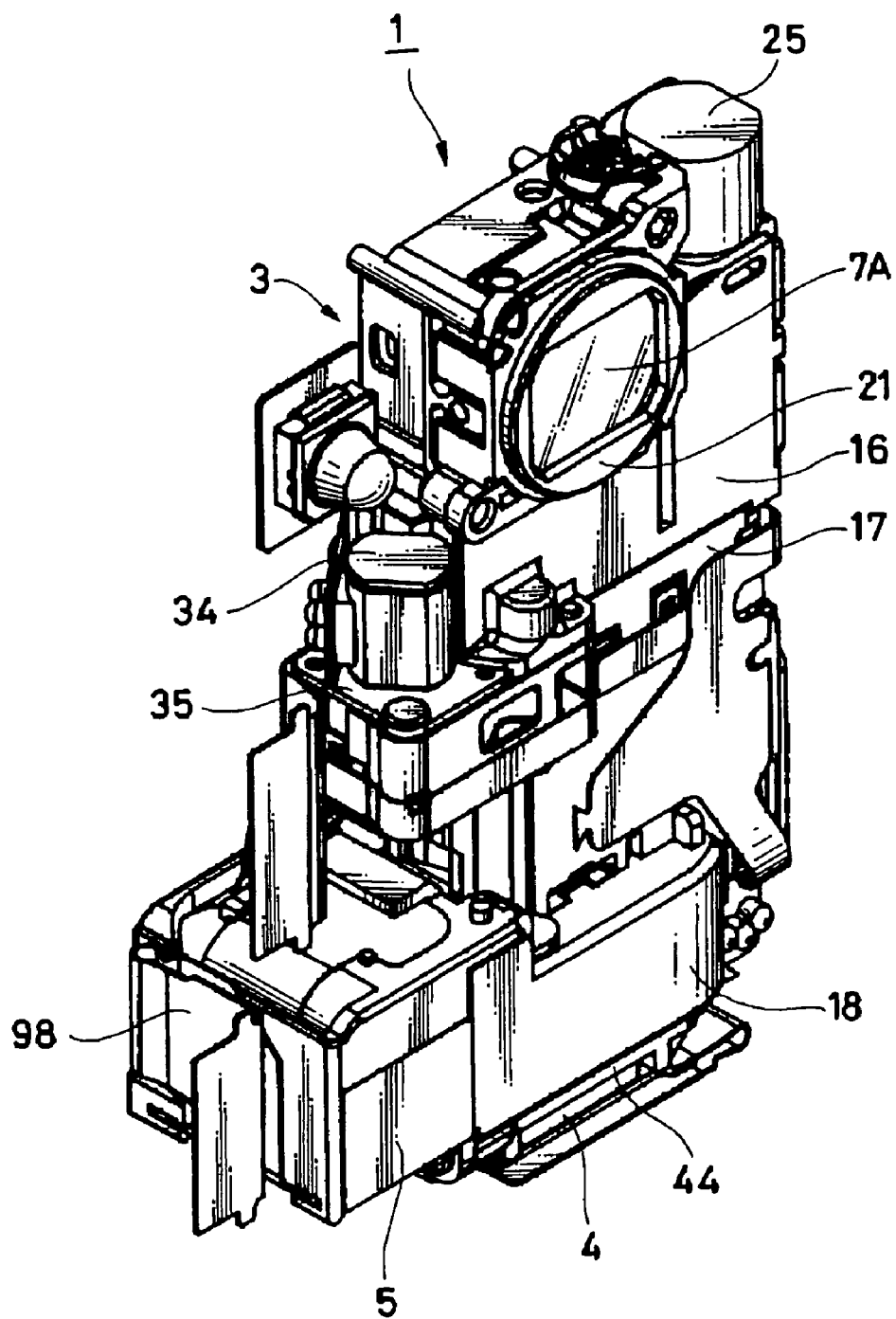
FIG. 1 is a perspective view showing a first embodiment of a lens barrel according to the present invention, as seen from the front.
Figure 2:
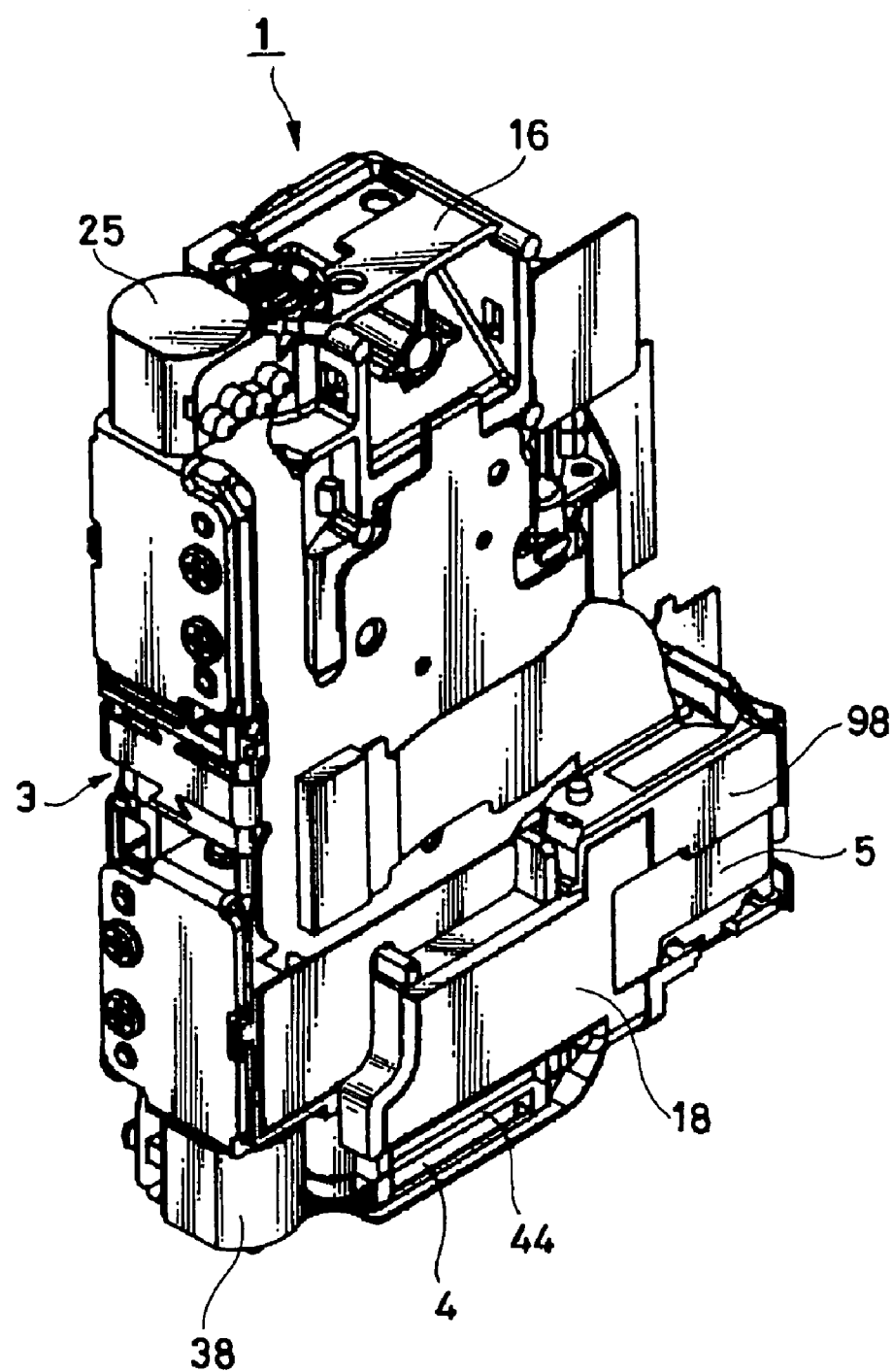
FIG. 2 is a perspective view of the lens barrel shown in FIG. 1, as seen from behind.
Figure 3:
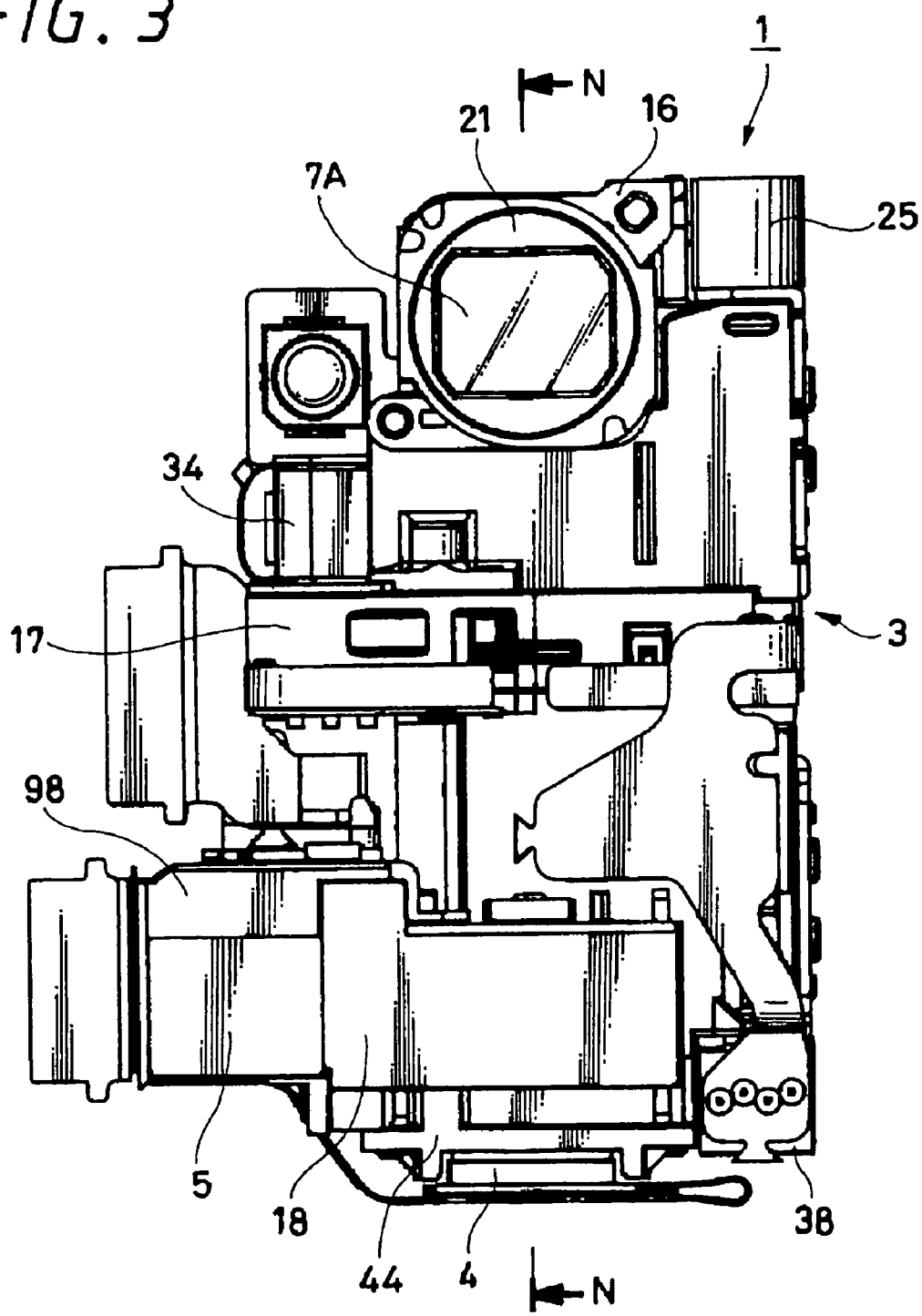
FIG. 3 is a front view of the lens barrel shown in FIG. 1.
Figure 4:
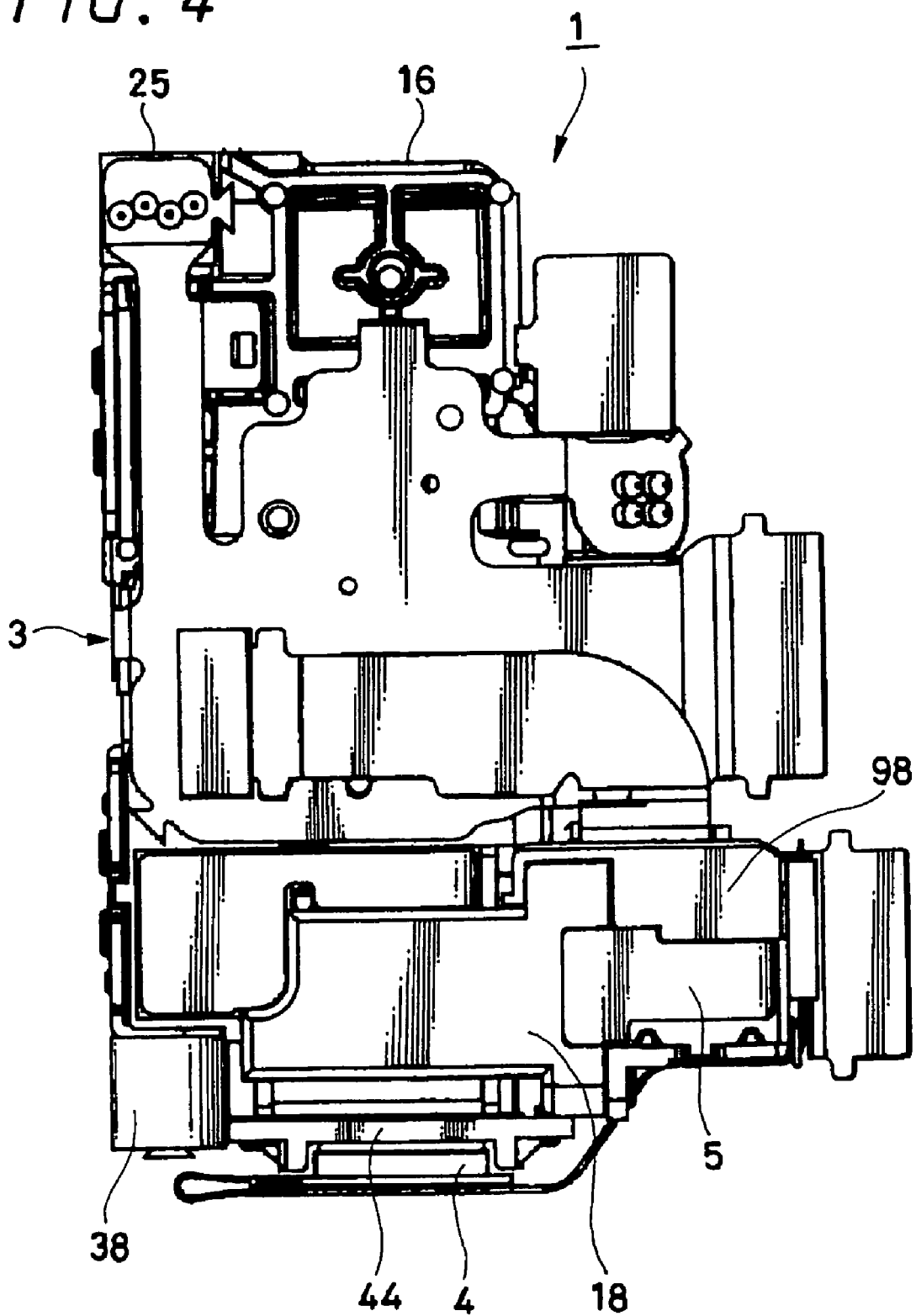
FIG. 4 is a rear view of the lens barrel shown in FIG. 1.
Figure 5:
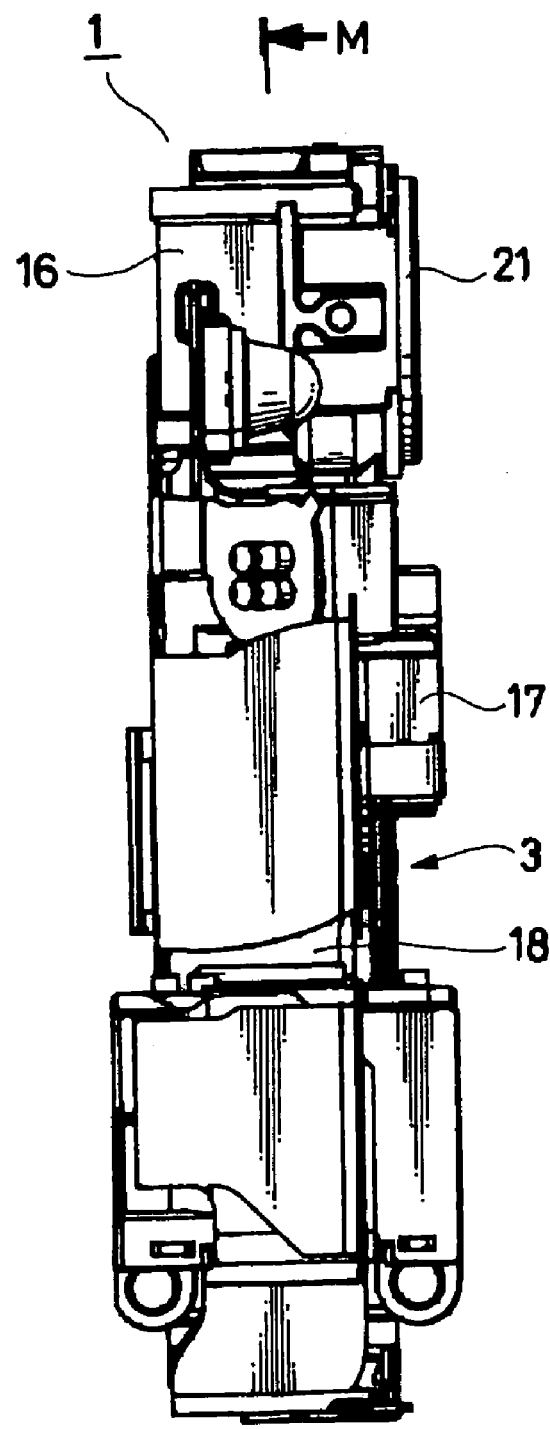
FIG. 5 is a left side elevational view of the lens barrel shown in FIG. 1.
Figure 6:
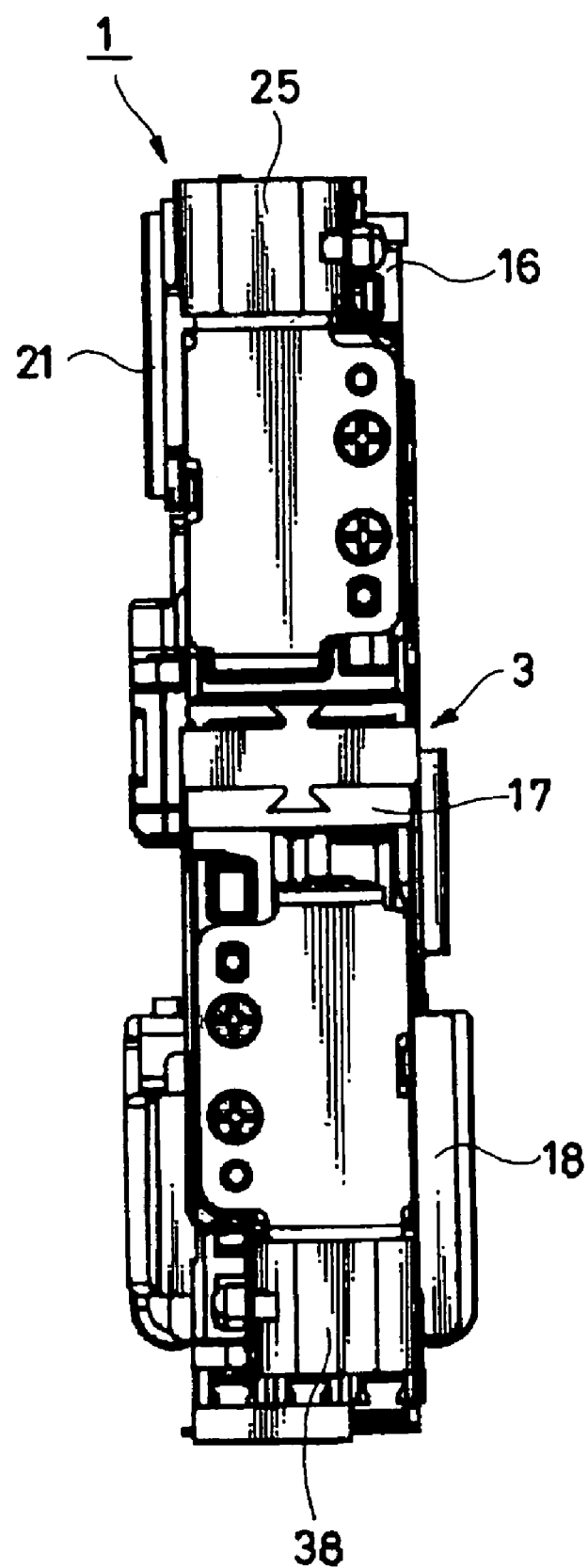
FIG. 6 is a right side elevational view of the lens barrel shown in FIG. 1.
Figure 7:
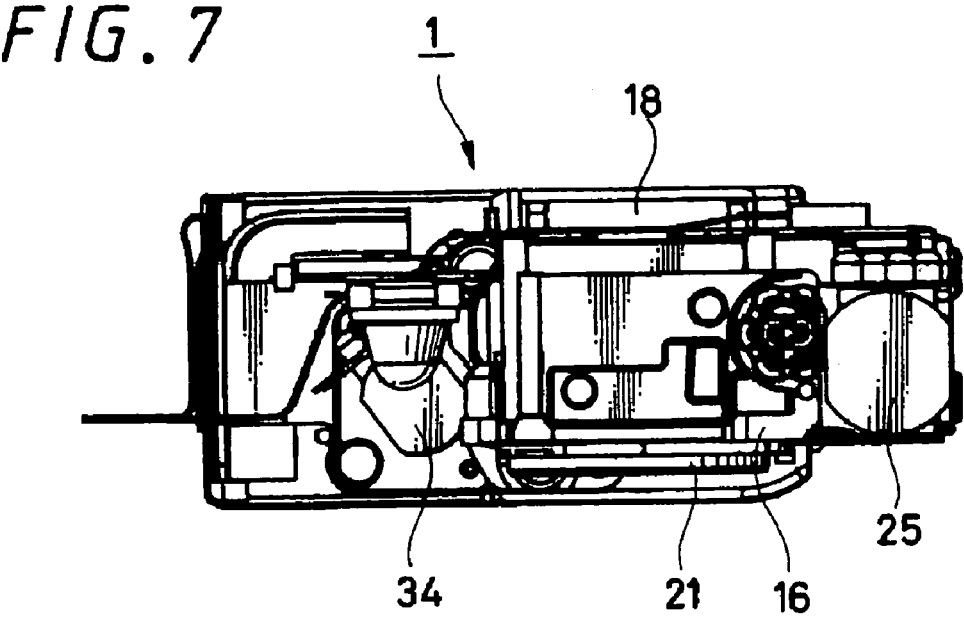
FIG. 7 is a plan view of the lens barrel shown in FIG. 1.
Figure 8:
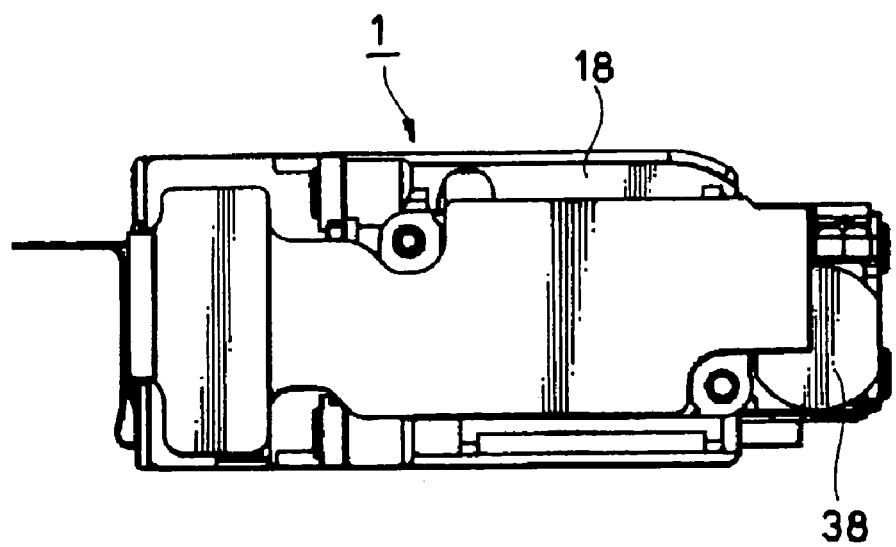
FIG. 8 is a bottom view of the lens barrel shown in FIG. 1.
Figure 9:
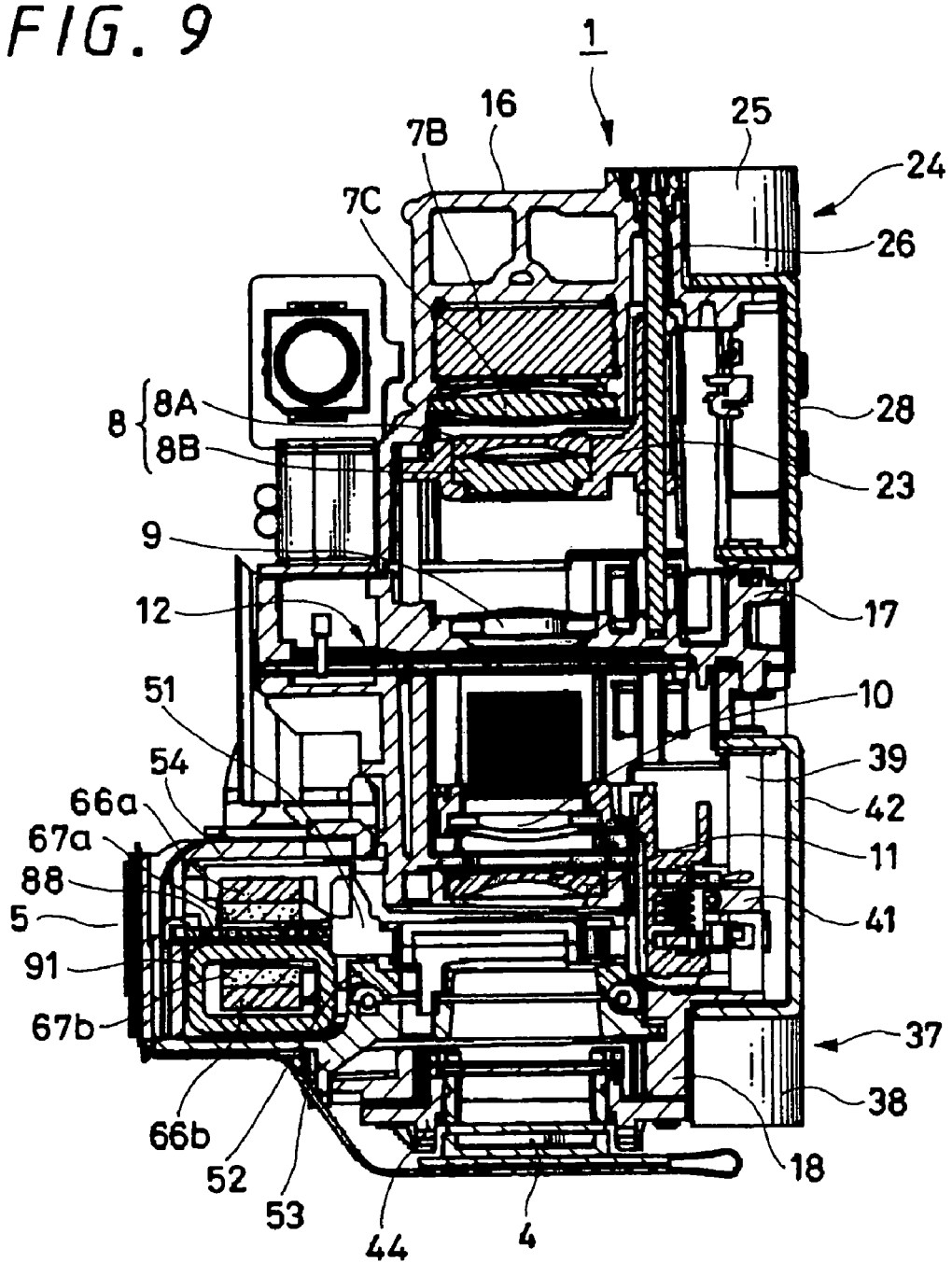
FIG. 9 is an M-M line sectional view of the lens barrel shown in FIG. 5.
Figure 10:
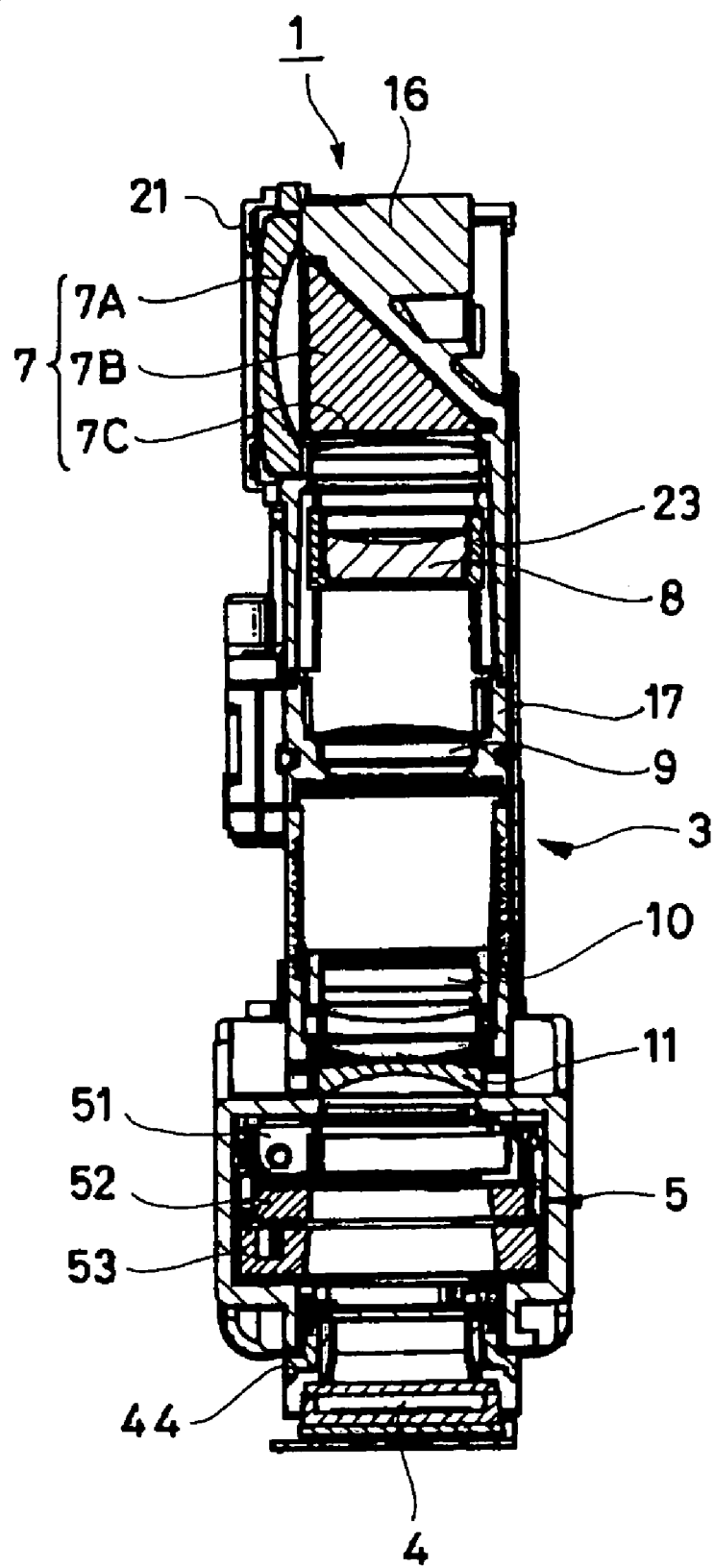
FIG. 10 is an N-N line sectional view of the lens barrel shown in FIG. 3.
Figure 11:
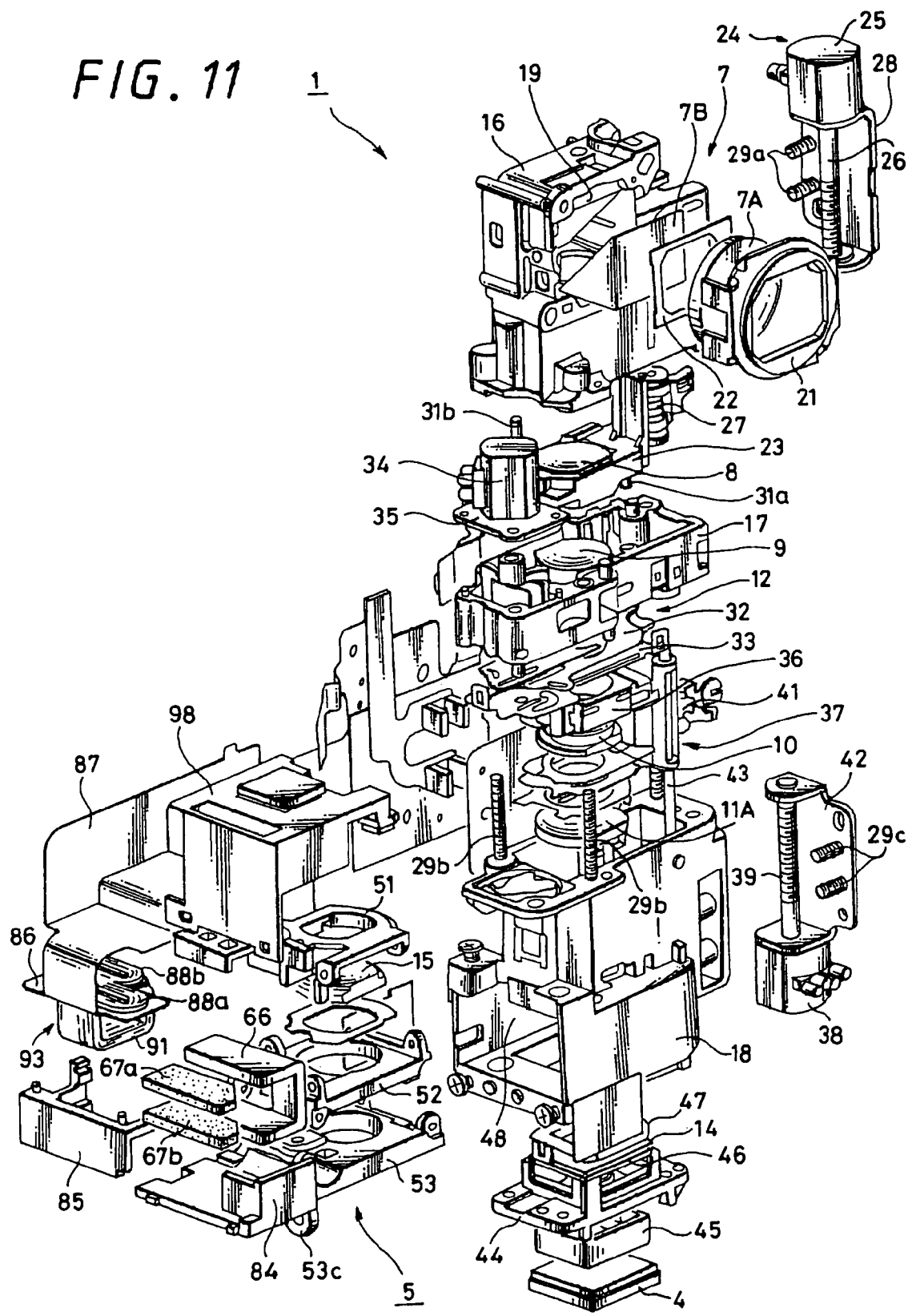
FIG. 11 is an exploded perspective view of the lens barrel shown in FIG. 1.
Figure 12:
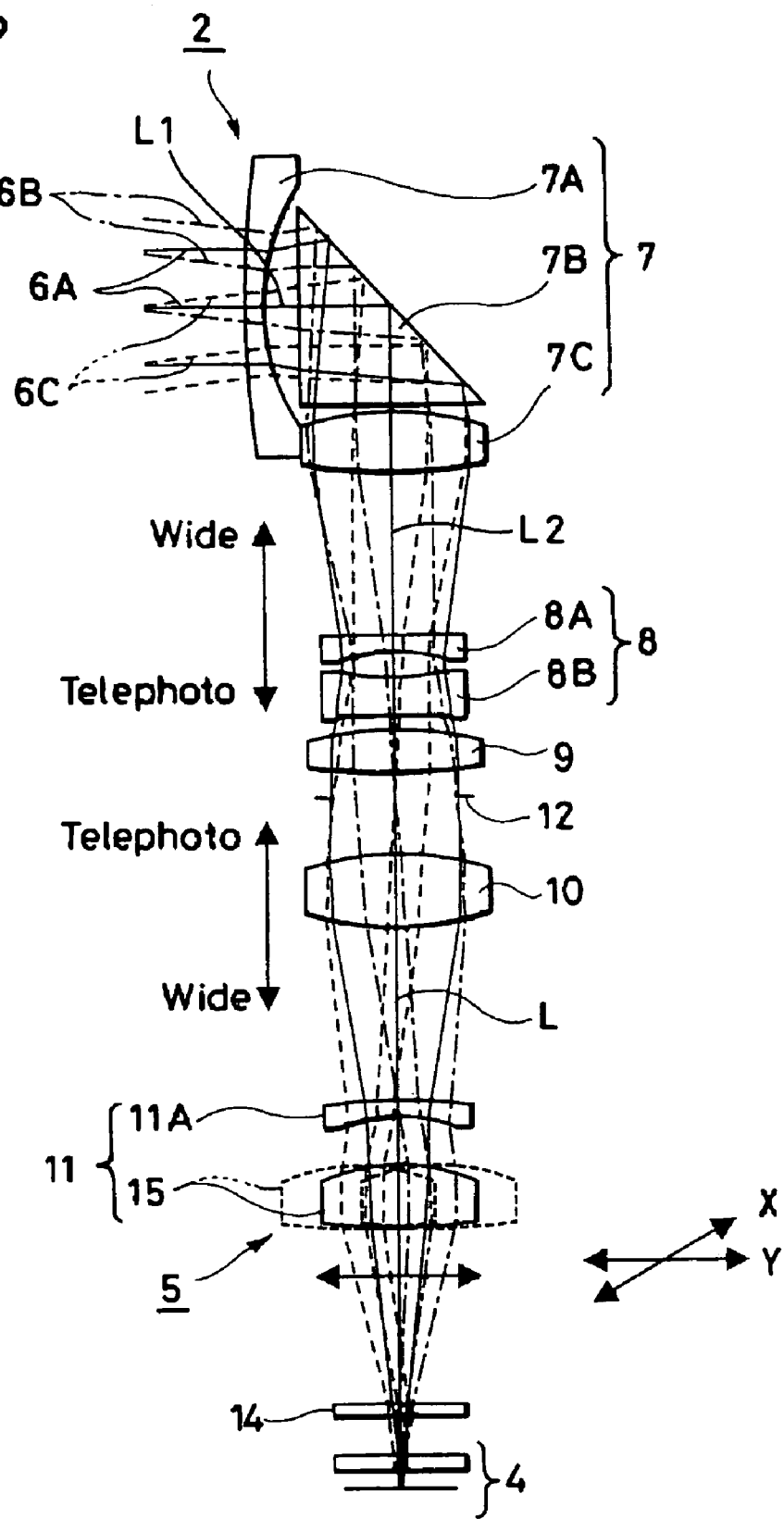
FIG. 12 is an explanatory diagram for explaining a lens system of the lens barrel shown in FIG. 1.
Figure 67:
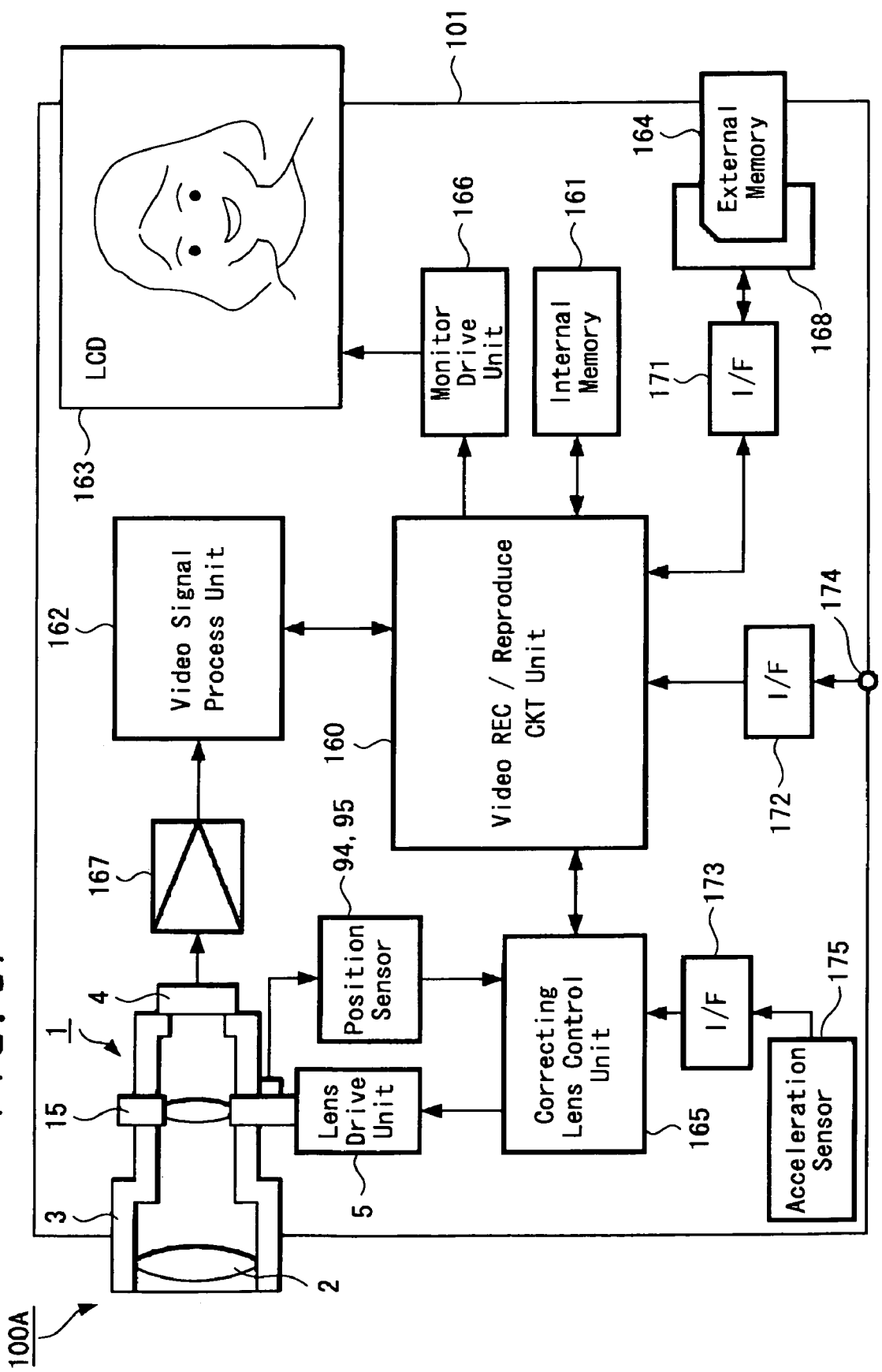
FIG. 67 is a block diagram showing a second embodiment of the schematic configuration of an imager apparatus according to the present invention.

Hereinafter, embodiments of the present invention are explained referring to attached drawings. FIGS. 1 to 67 are figures for explaining embodiments of the present invention. Specifically, FIGS. 1 to 12 show a first embodiment of a lens barrel according to the present invention. FIG. 1 is a perspective view seen from the front; FIG. 2 is a perspective view seen from behind; FIG. 3 is a front view; FIG. 4 is a rear view; FIG. 5 is a left side elevational view; FIG. 6 is a right side elevational view; FIG. 7 is a plan view; FIG. 8 is a bottom view; FIG. 9 is an M-M line sectional view of FIG. 5; FIG. 10 is an N-N line sectional view of FIG. 3; FIG. 11 is an exploded perspective view; and FIG. 12 is an explanatory diagram of a lens system.

Figure 13:
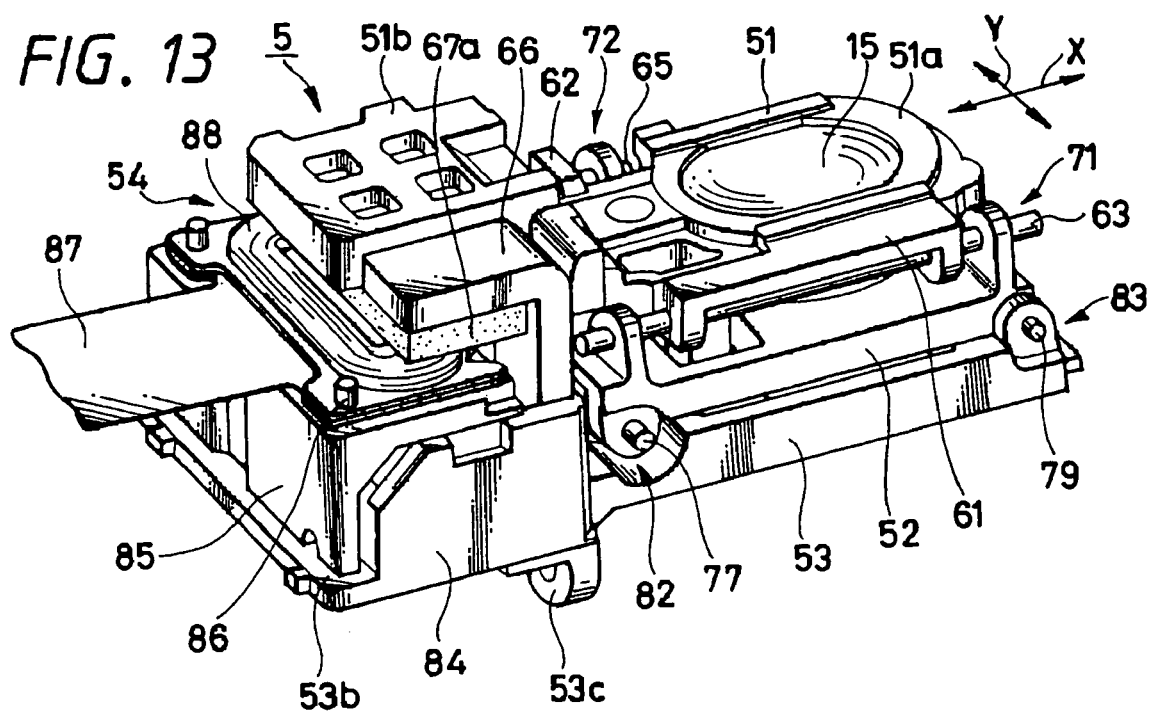
FIG. 13 shows a first embodiment of an image stabilizer according to the present invention, as seen from the front.
Figure 14:
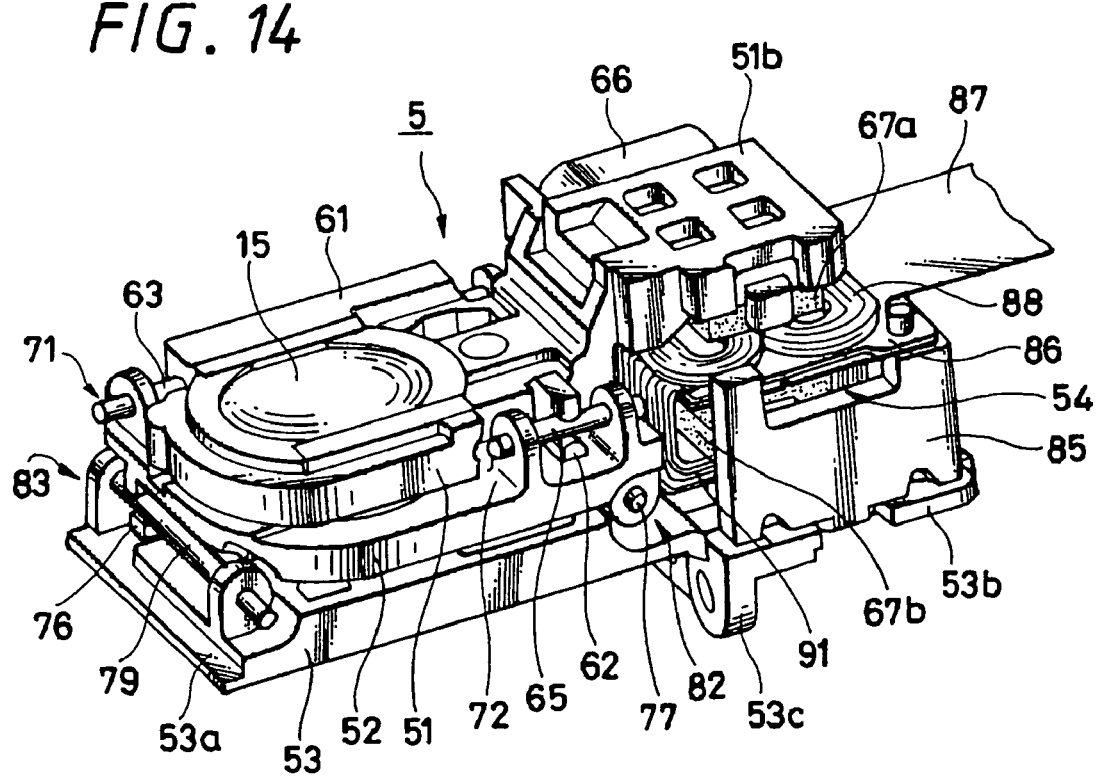
FIG. 14 is a perspective view of the image stabilizer shown in FIG. 13, as seen from behind.
Figure 15:
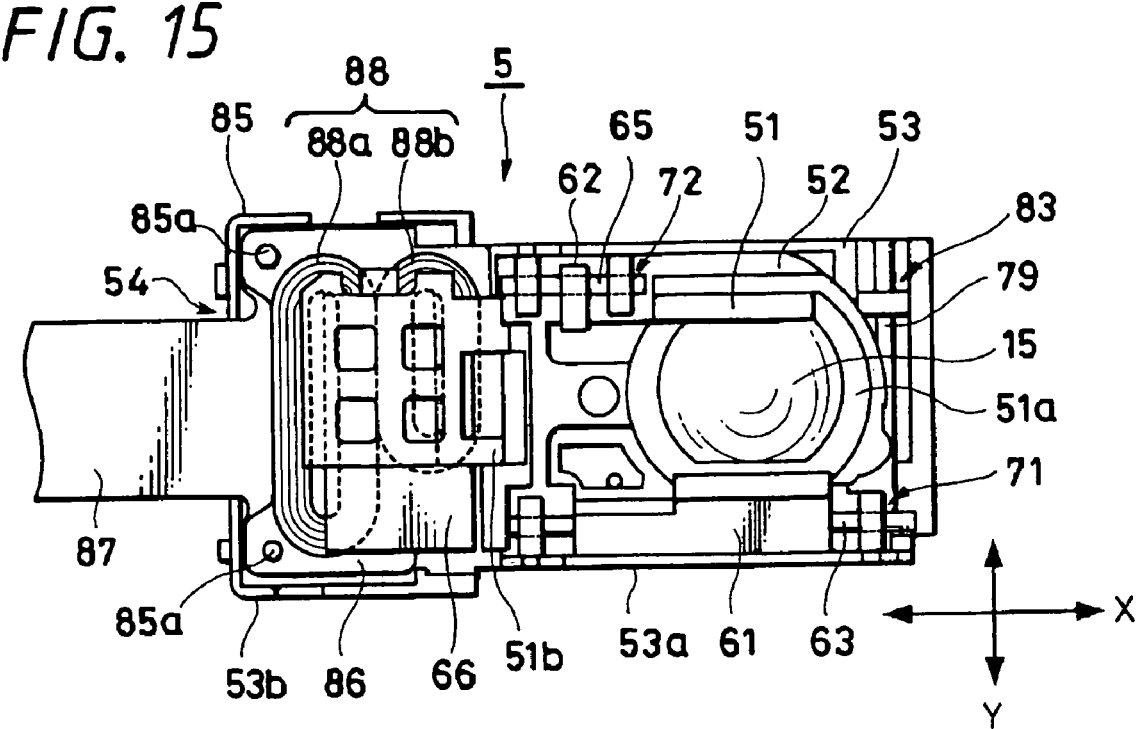
FIG. 15 is a plan view of the image stabilizer shown in FIG. 13.
Figure 16:
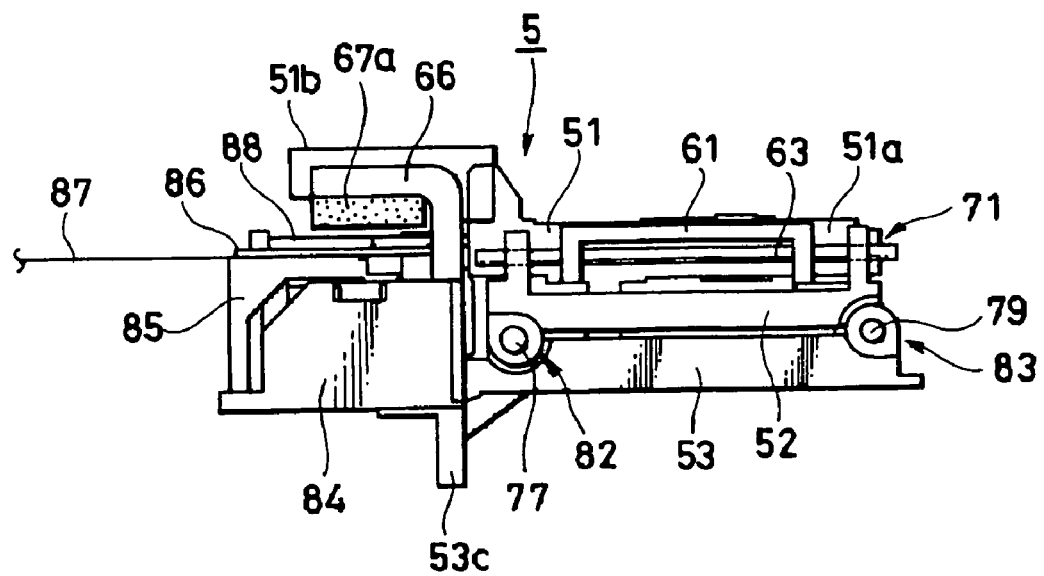
FIG. 16 is a front view of the image stabilizer shown in FIG. 13.
Figure 17:
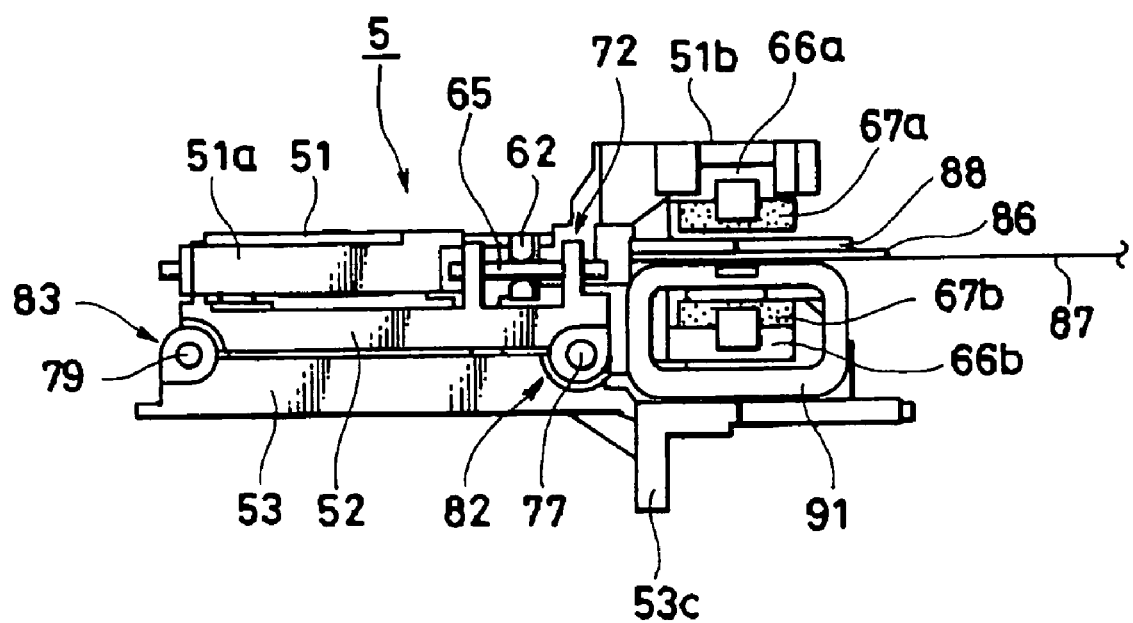
FIG. 17 is a rear view of the image stabilizer shown in FIG. 13.
Figure 18:
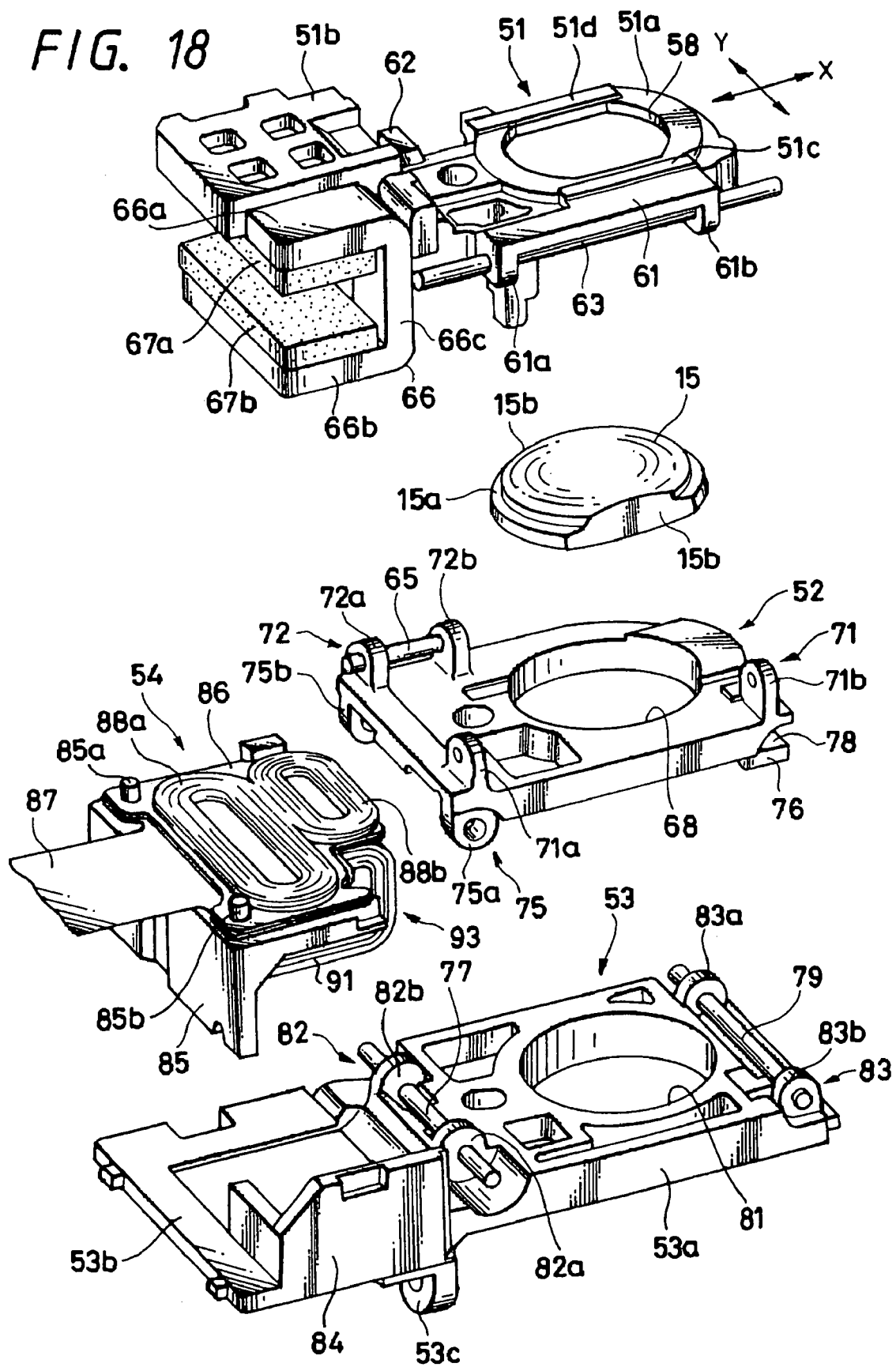
FIG. 18 is an exploded perspective view of the image stabilizer shown in FIG. 13.
Figure 19:
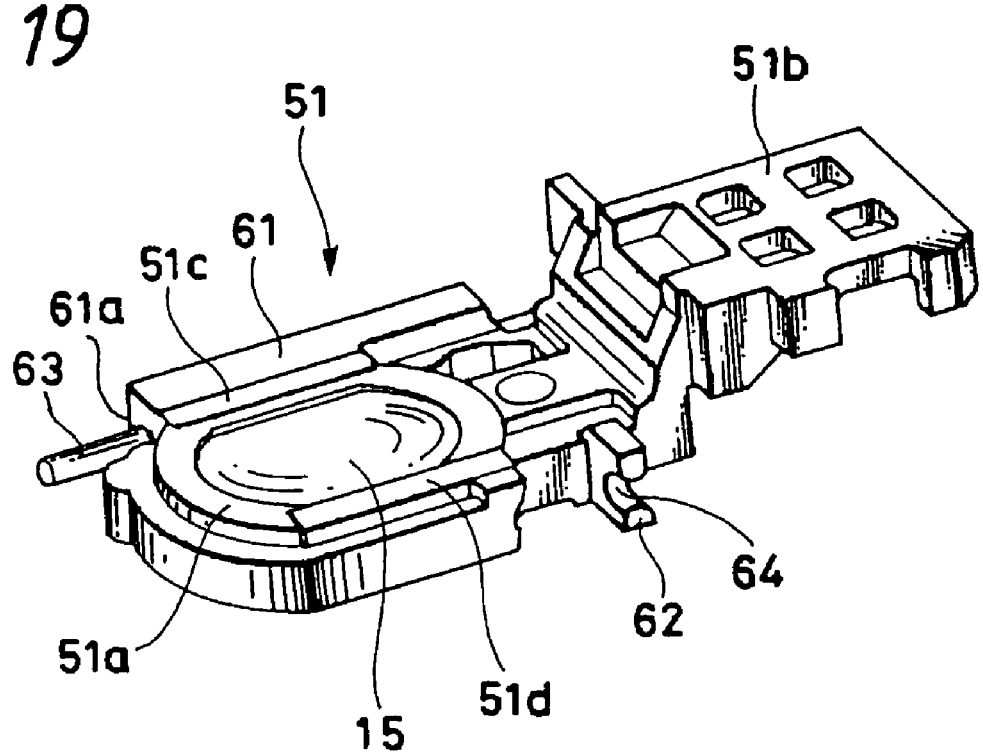
FIG. 19 is a perspective view showing a first moving frame of the image stabilizer in FIG. 13.
Figure 20:
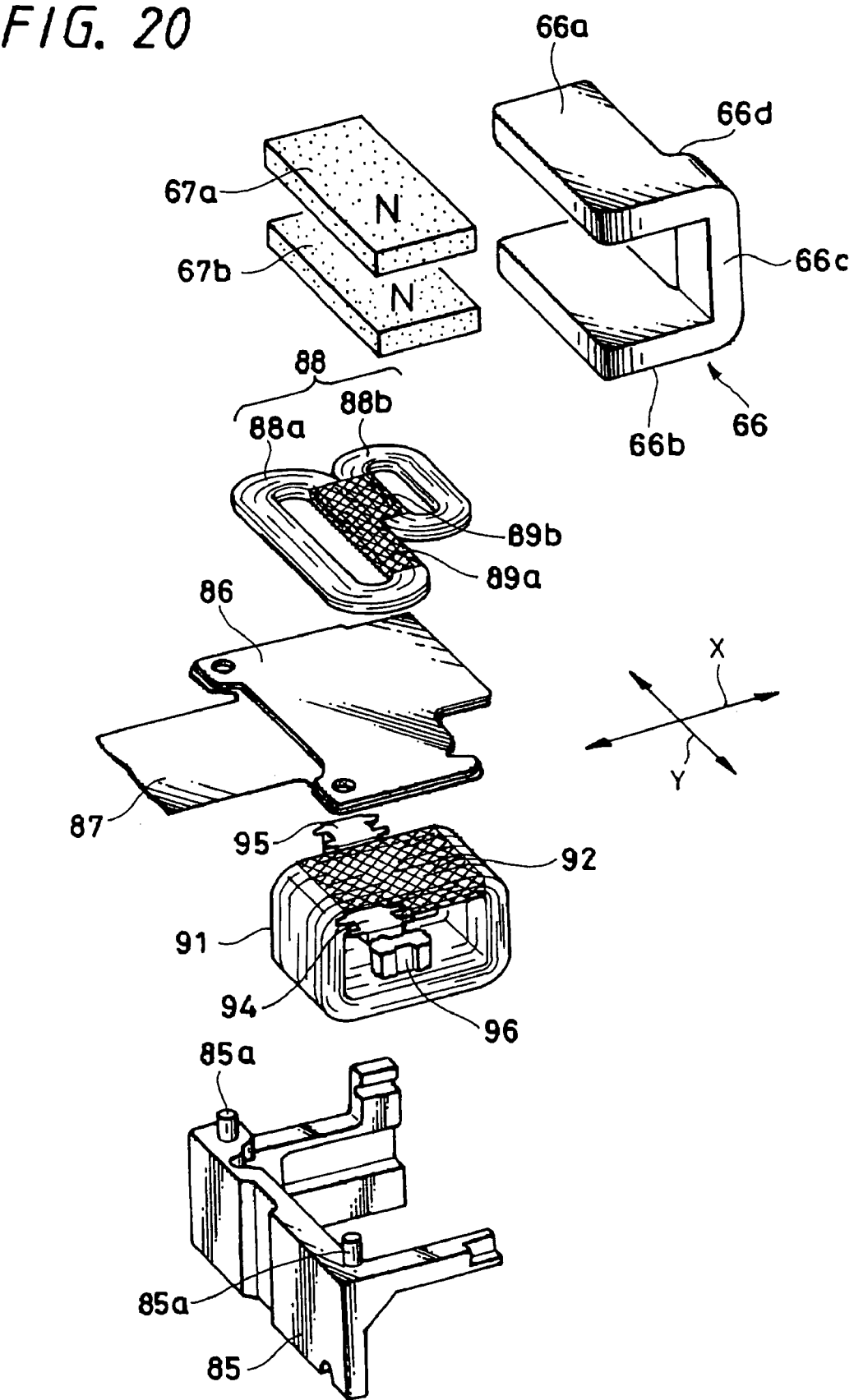
FIG. 20 is an exploded perspective view showing a coil assembly body, magnets and a yoke of the image stabilizer in FIG. 13.
Figure 21:
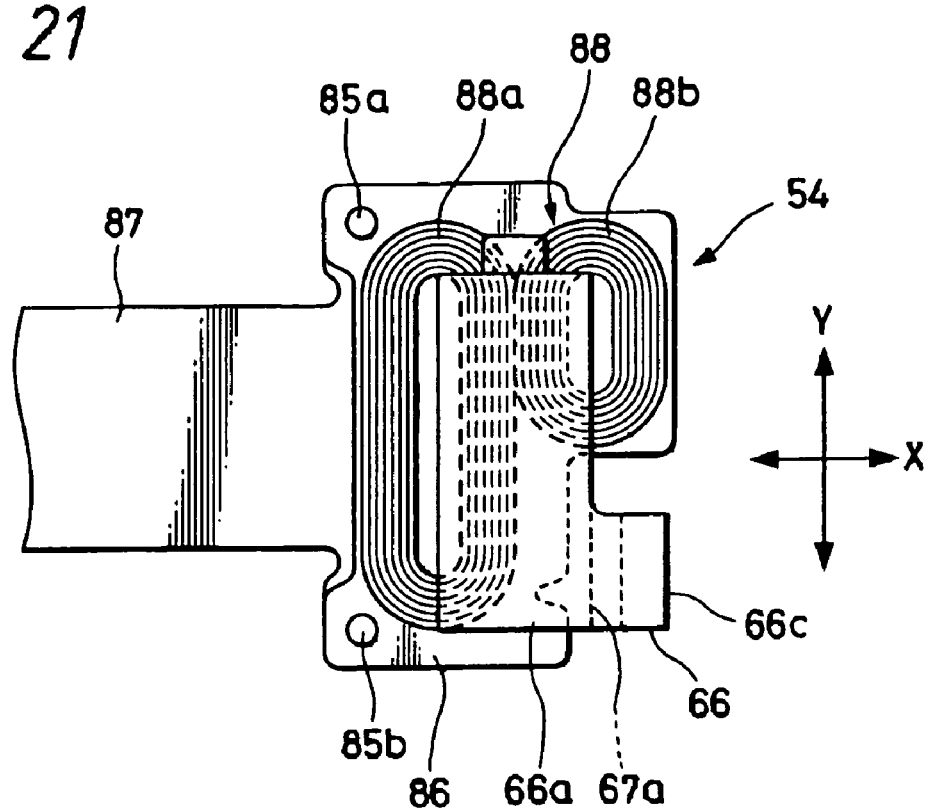
FIG. 21 is a plan view in which a coil assembly body, magnets and a yoke of the image stabilizer shown in FIG. 13 are enlarged.
Figure 22:
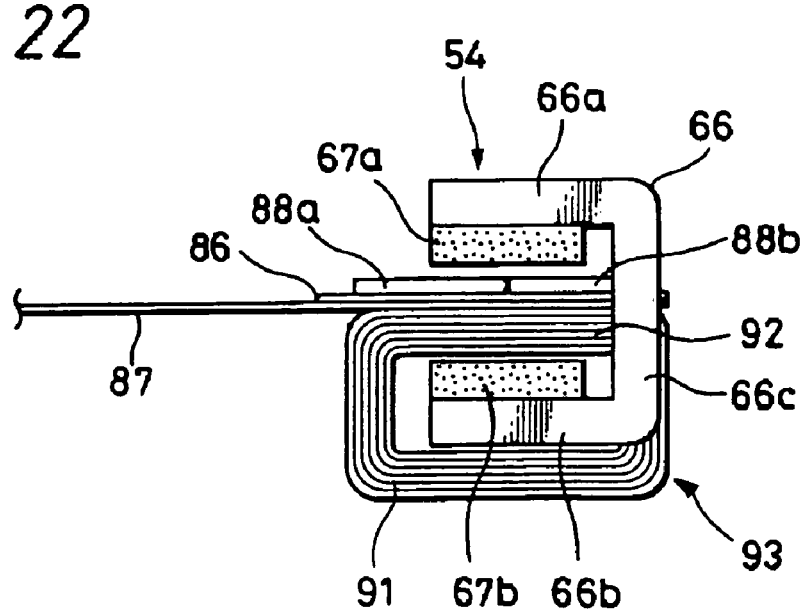
FIG. 22 is a front view in which a coil assembly body, magnets and a yoke of the image stabilizer shown in FIG. 13 are enlarged.
Figure 23:
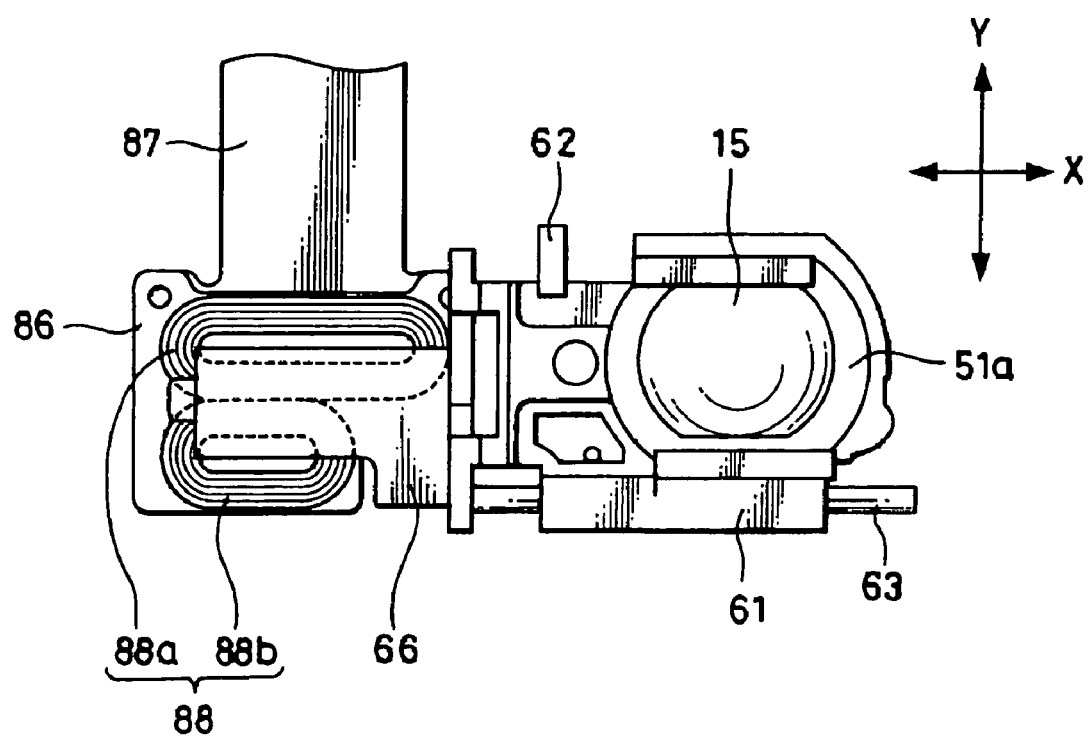
FIG. 23 is a plan view showing a second embodiment of a coil assembly body, magnets and a yoke according to an image stabilizer of the present invention.
Figure 24:
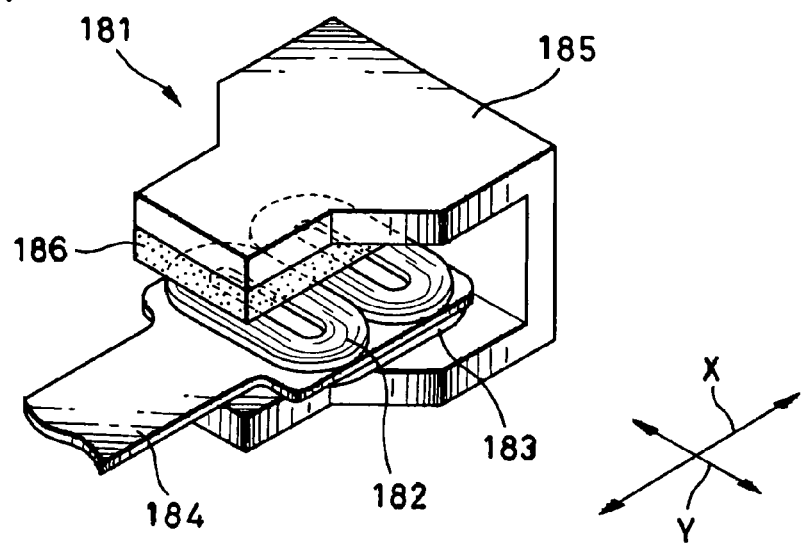
FIG. 24 is a perspective view showing a third embodiment of a coil assembly body, a magnet and a yoke according to an image stabilizer of the present invention.
Figure 25:
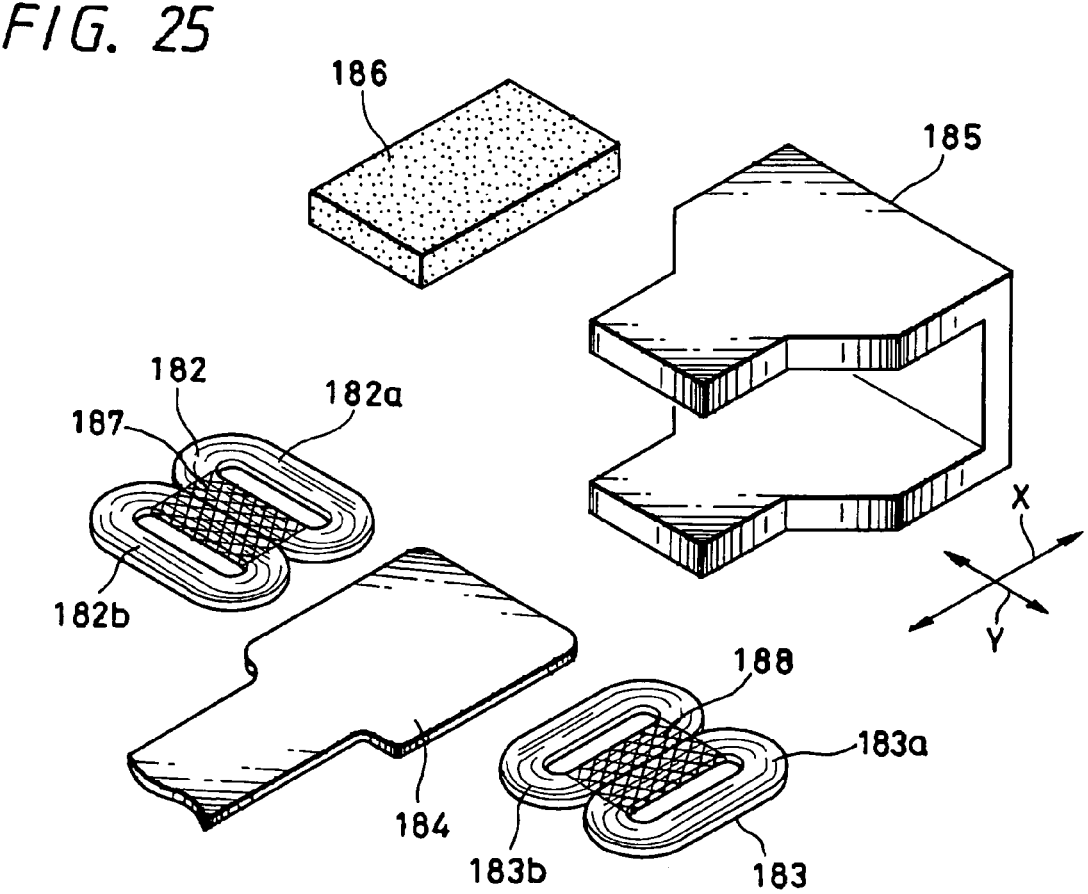
FIG. 25 is an exploded perspective view of the coil assembly body, the magnet and the yoke shown in FIG. 24.

FIGS. 13 to 25 show a first embodiment of an image stabilizer according to the present invention. FIG. 13 is a perspective view of it, as seen from in front; FIG. 14 is a perspective view of it, as seen from behind; FIG. 15 is a plan view; FIG. 16 is a front view; FIG. 17 is a rear view; and FIG. 18 is an exploded perspective view. FIG. 19 is a perspective view showing a first moving frame; FIG. 20 is an exploded perspective view showing a coil assembly body, magnets and a yoke; FIG. 21 is a plan view of a coil assembly body and the like; and FIG. 22 is likewise a front view. FIG. 23 is a plan view showing a second embodiment of a coil assembly body, magnets and a yoke; FIG. 24 is a perspective view showing a third embodiment of a coil assembly body and the like; and FIG. 25 is likewise an exploded perspective view.

Figure 26:
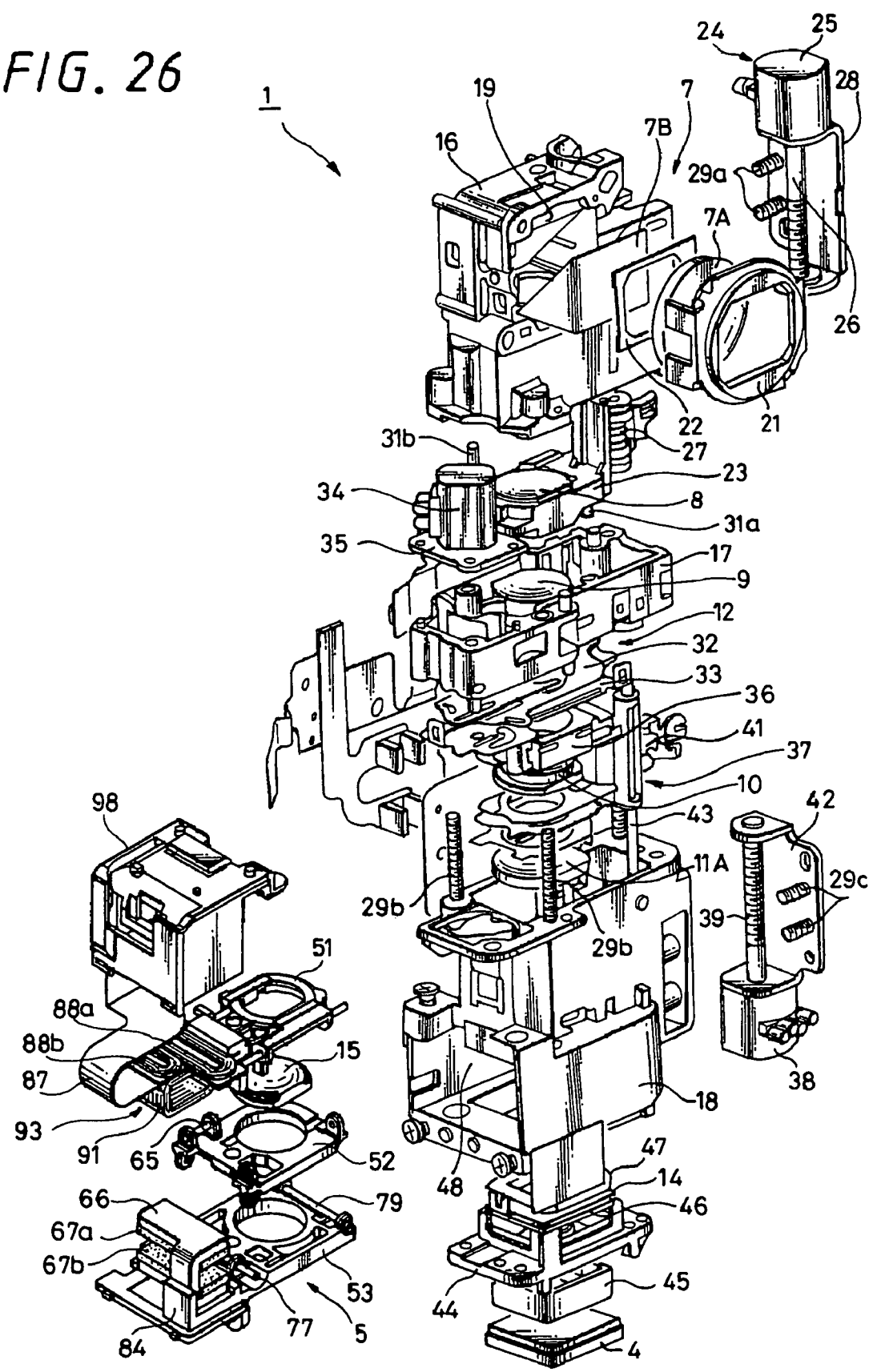
FIG. 26 is an exploded perspective view showing a second embodiment of a lens barrel according to the present invention.
Figure 27:
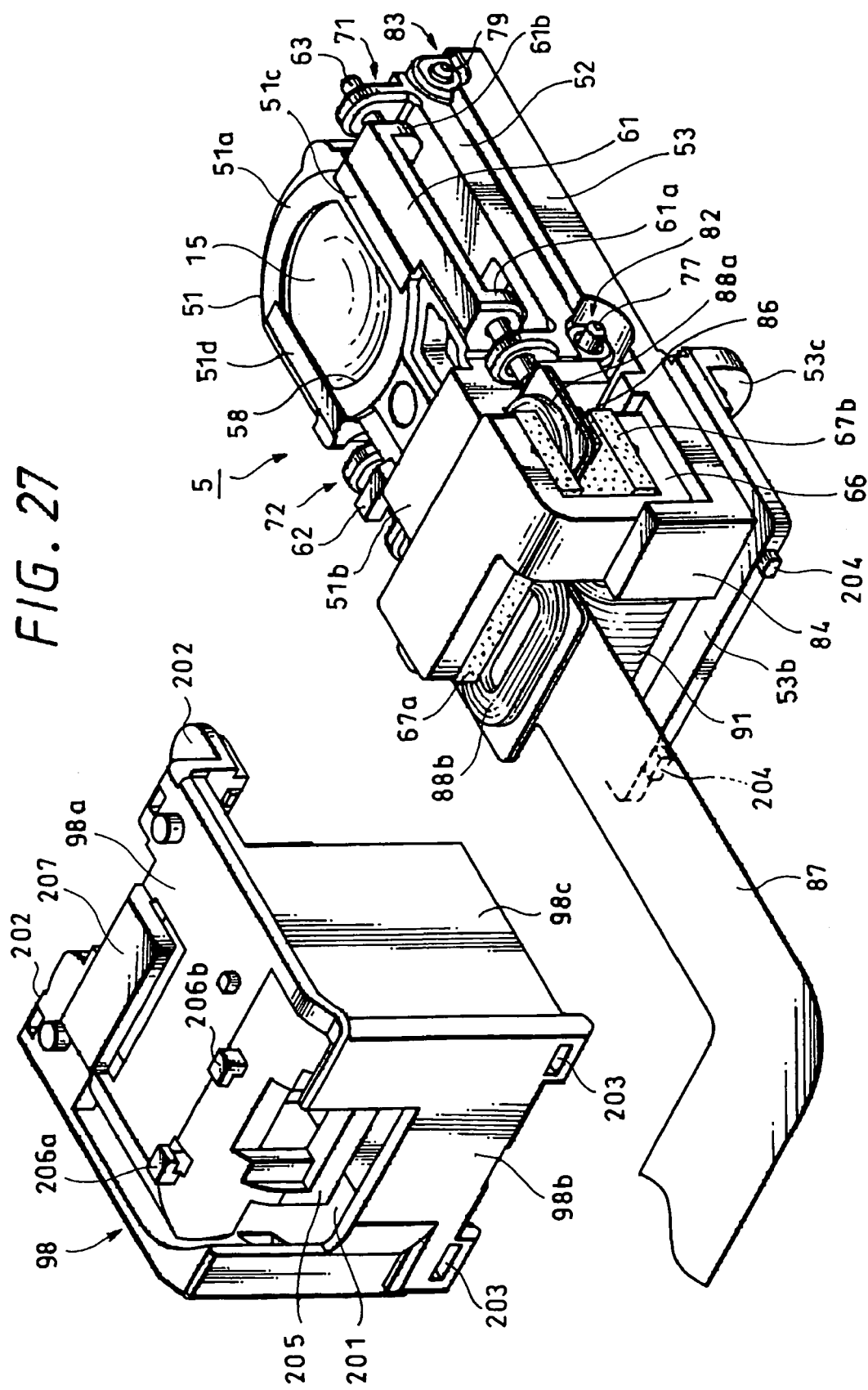
FIG. 27 is a perspective view in which a second embodiment of an image stabilizer according to the present invention and an apparatus cover thereof are seen from behind.
Figure 28:
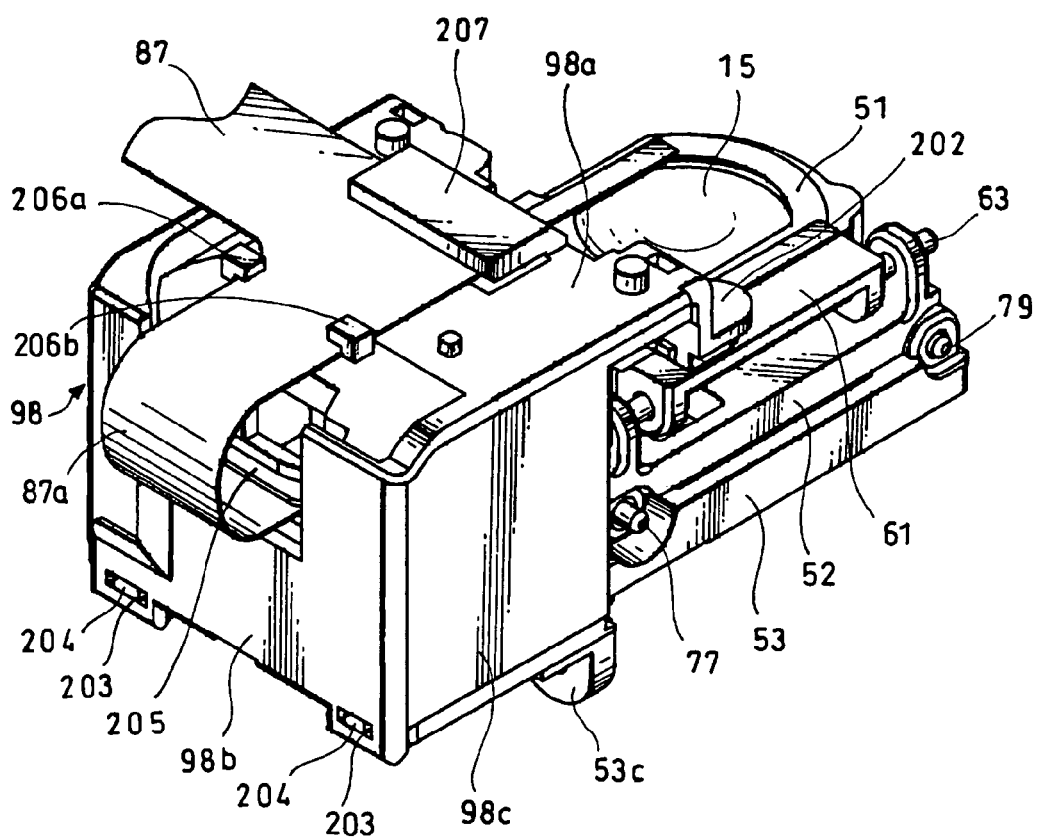
FIG. 28 is an assembled perspective view of the image stabilizer and the apparatus cover shown in FIG. 27.
Figure 29:
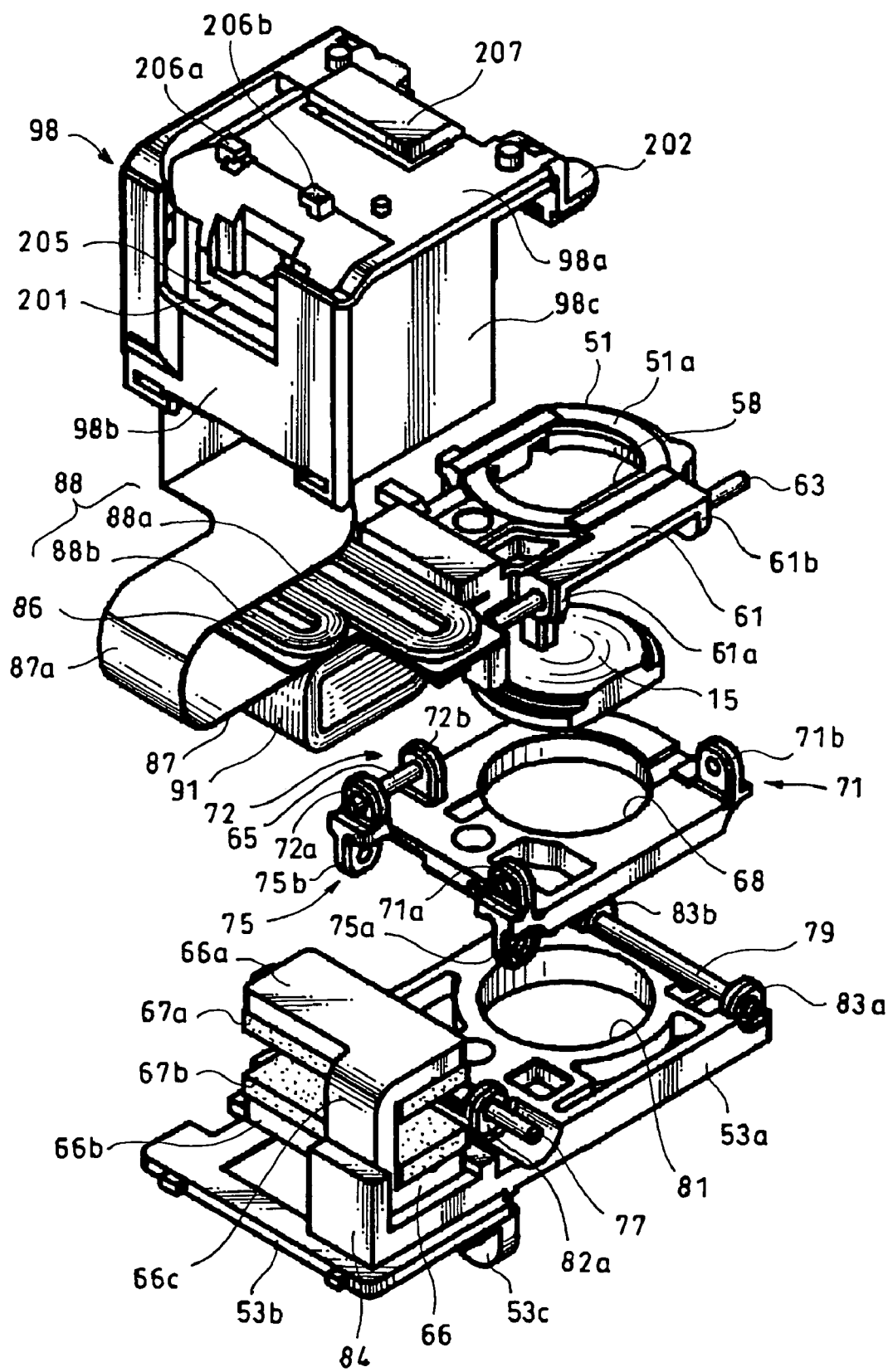
FIG. 29 is an exploded perspective view of the image stabilizer and the apparatus cover shown in FIG. 27.
Figure 30:
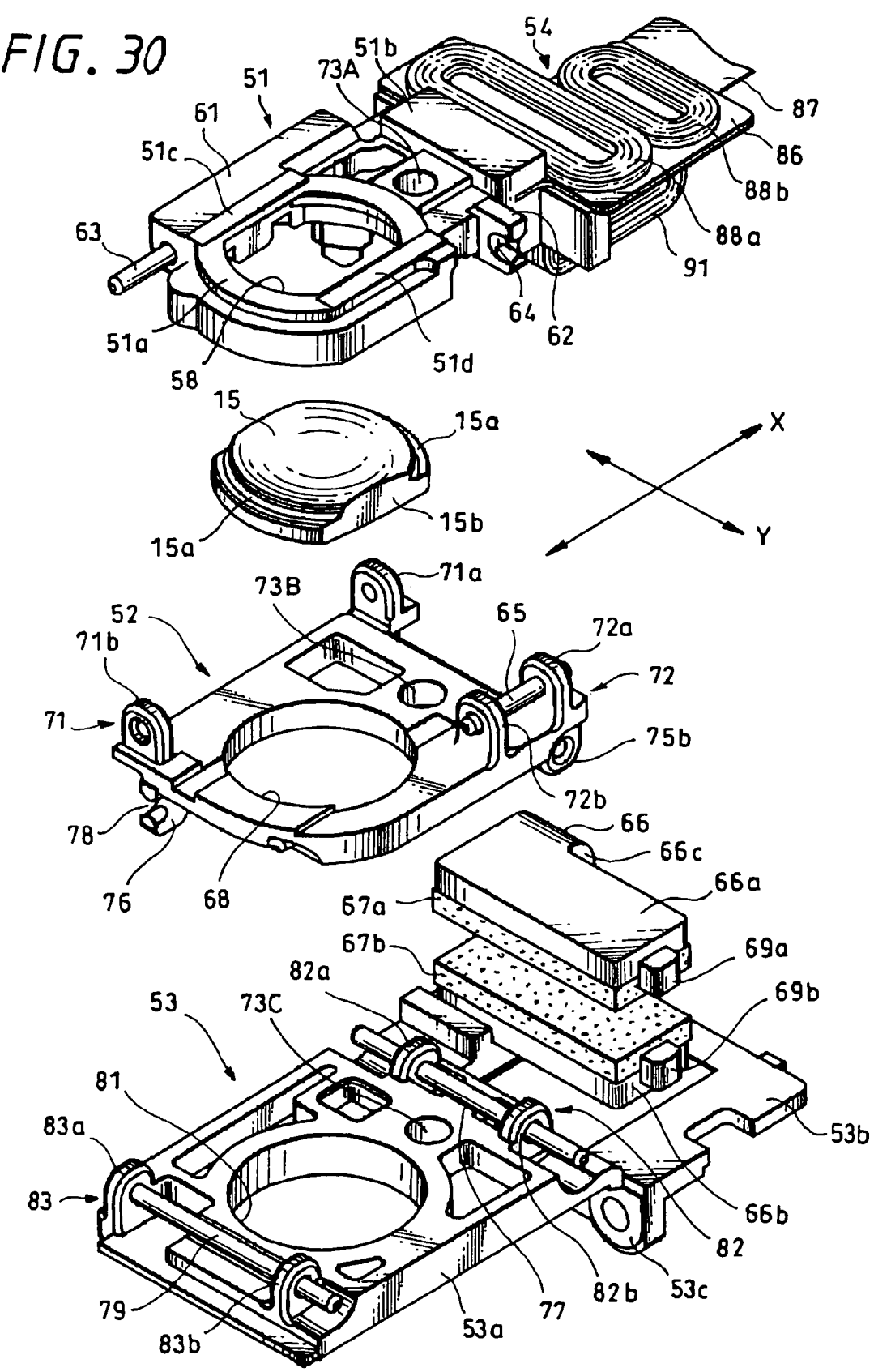
FIG. 30 is a perspective view showing in an exploded manner the image stabilizer shown in FIG. 27.
Figure 31:
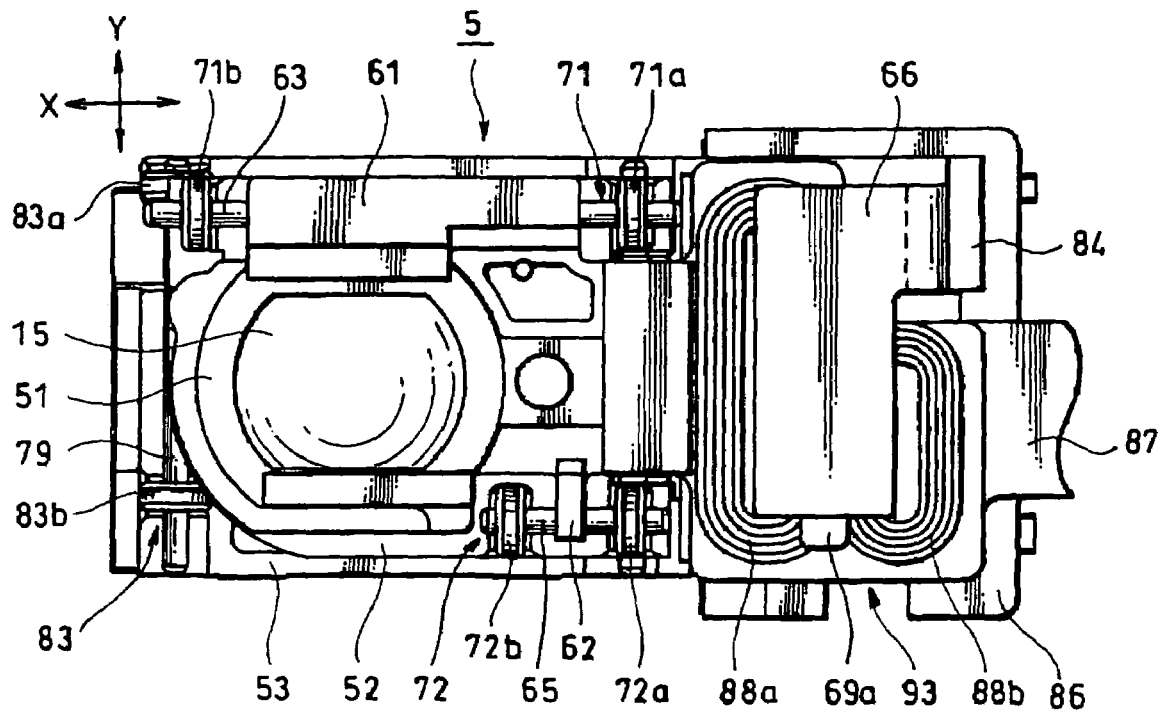
FIG. 31 is a plan view of the image stabilizer shown in FIG. 27.
Figure 32:
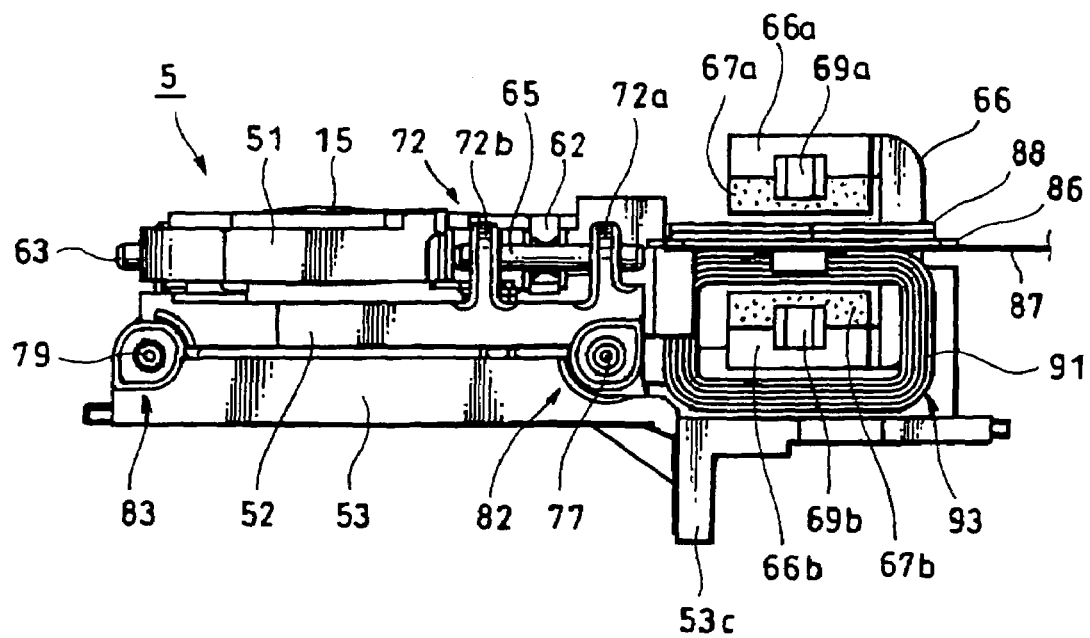
FIG. 32 is a front view of the image stabilizer shown in FIG. 27.
Figure 33:
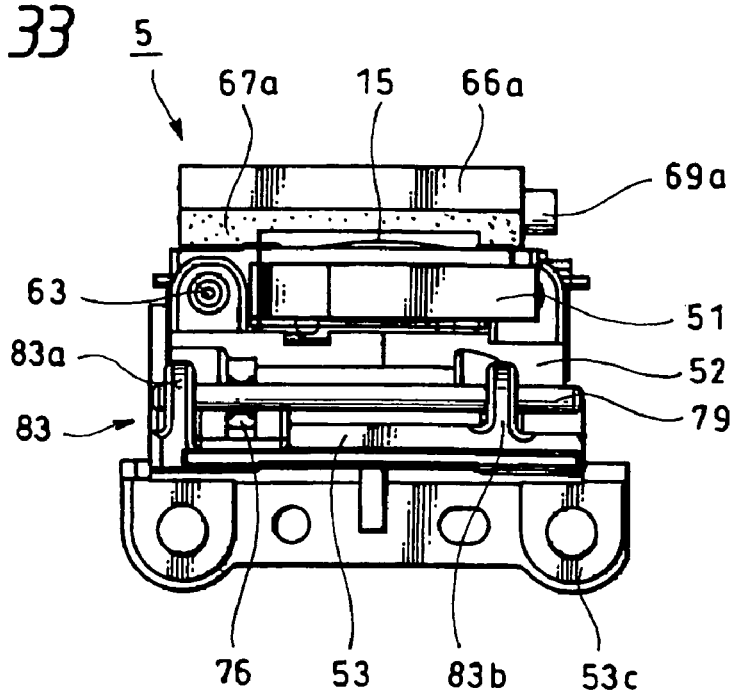
FIG. 33 is a left side elevational view of the image stabilizer shown in FIG. 27.
Figure 34:
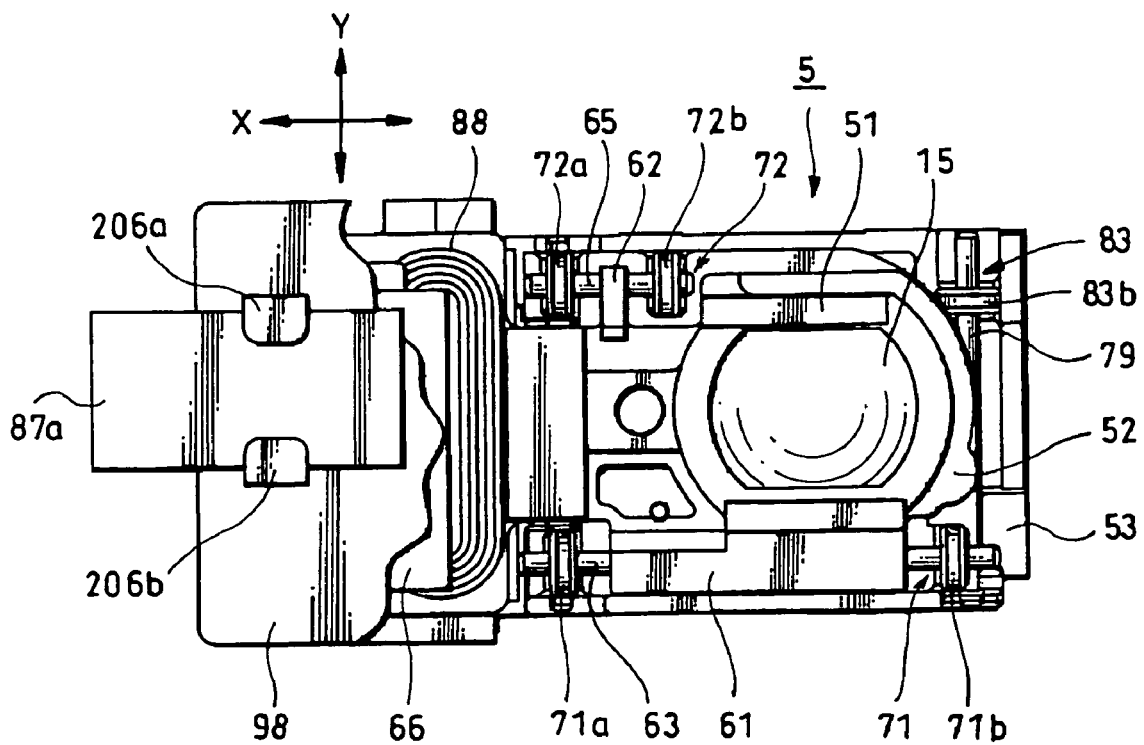
FIG. 34 is a plan view in which a flexible printed circuit board of the image stabilizer shown in FIG. 27 is bent upward.
Figure 35:
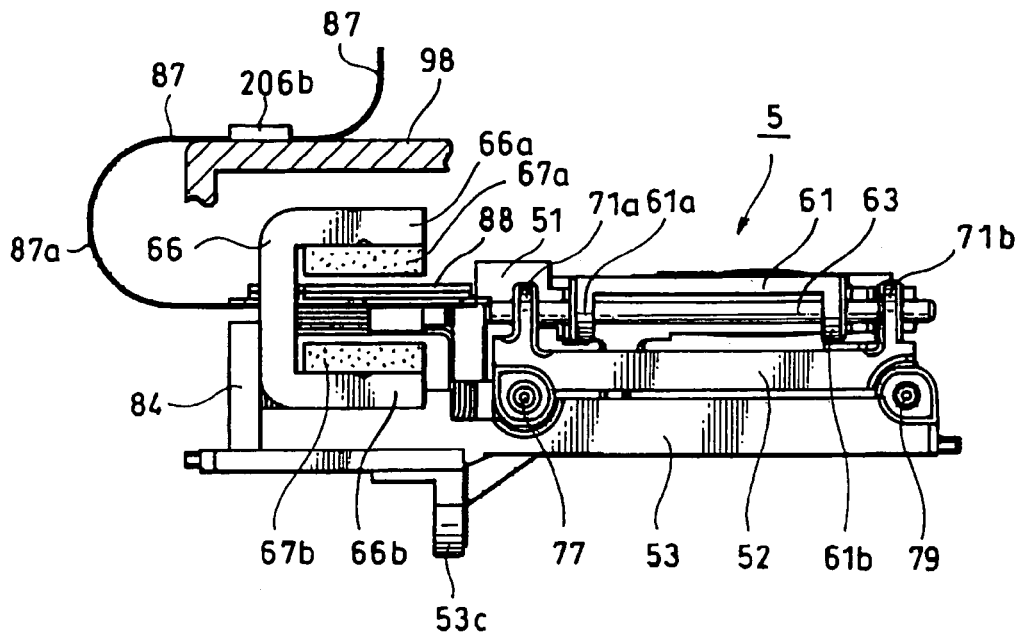
FIG. 35 is a front view in which a flexible printed circuit board of the image stabilizer shown in FIG. 27 is bent upward.
Figure 36:
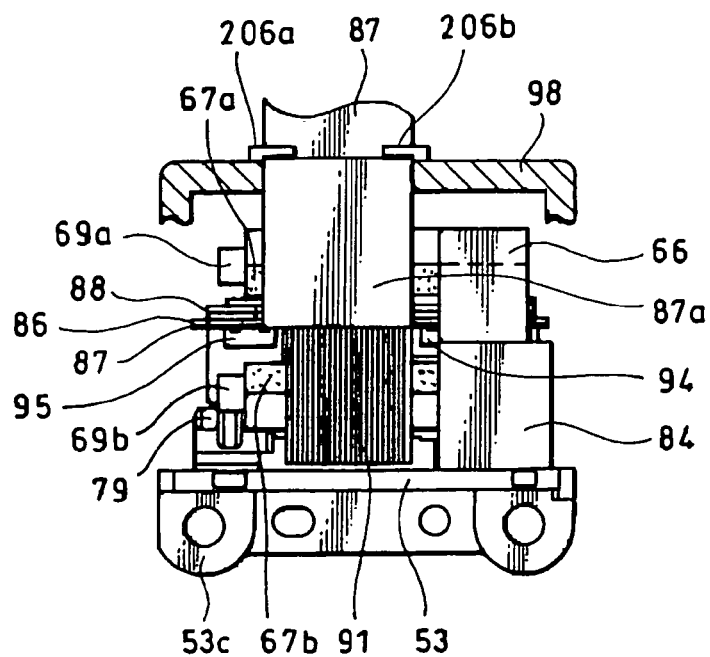
FIG. 36 is a left side elevational view in which a flexible printed circuit board of the image stabilizer shown in FIG. 27 is bent upward.
Figure 37:
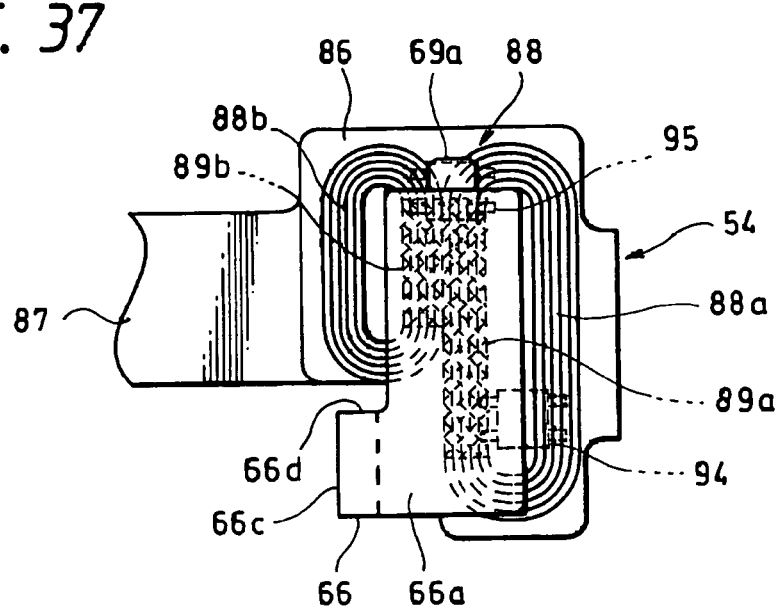
FIG. 37 is a plan view of a coil assembly body according to the image stabilizer shown in FIG. 27.
Figure 38:
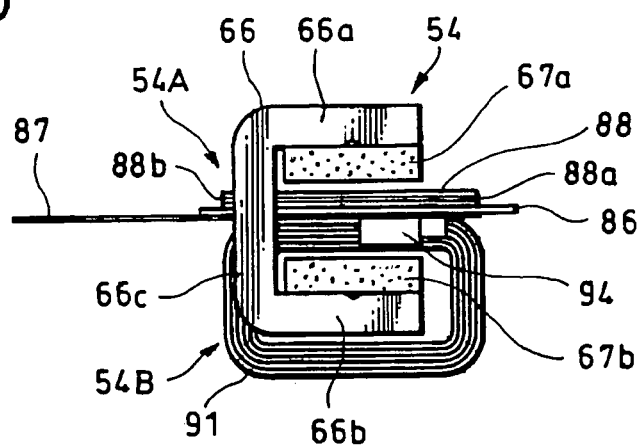
FIG. 38 is a front view of a coil assembly body according to the image stabilizer shown in FIG. 27.
Figure 39:
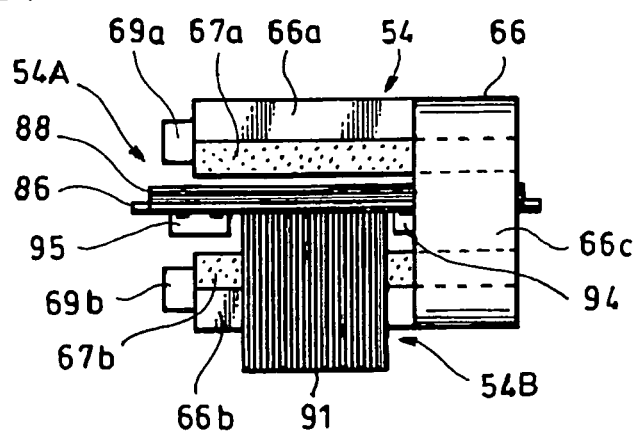
FIG. 39 is a left side elevational view of a coil assembly body according to the image stabilizer shown in FIG. 27.
Figure 40:
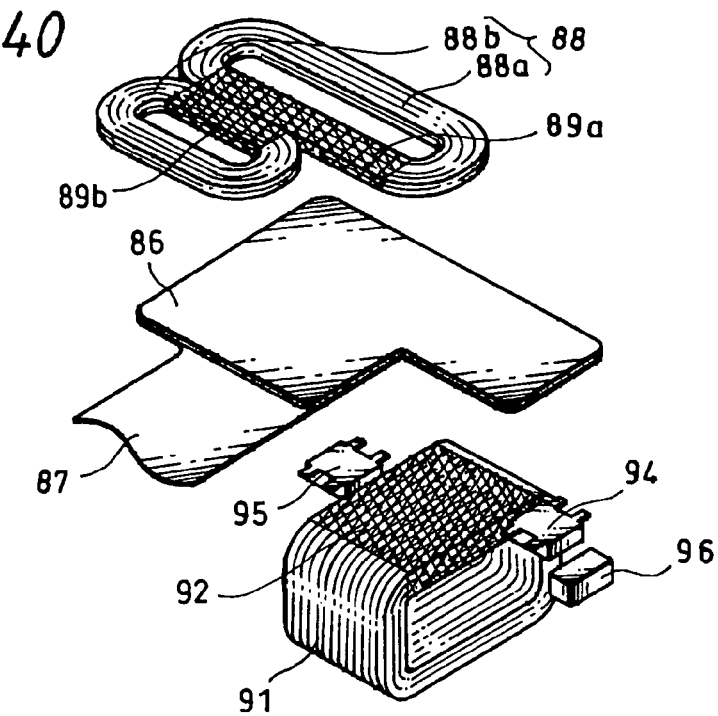
FIG. 40 is an exploded perspective view of a coil assembly body according to the image stabilizer shown in FIG. 27.
Figure 41:
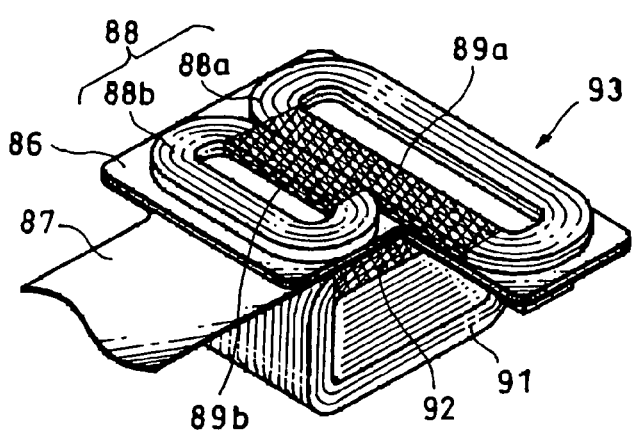
FIG. 41 is an assembled perspective view of a coil assembly body according to the image stabilizer shown in FIG. 27.
Figure 42:
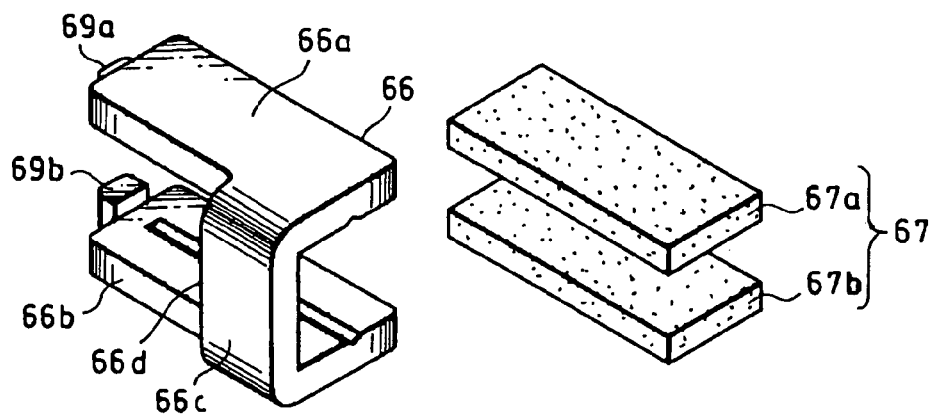
FIG. 42 is a perspective view of a yoke and magnets according to the image stabilizer shown in FIG. 27.

FIGS. 26 to 59 show other embodiments of an image stabilizer of the present invention. FIG. 26 is an exploded perspective view showing a second embodiment of an image stabilizer; FIG. 27 is a perspective view showing an image stabilizer and an apparatus cover thereof, seen from the front; FIG. 28 is an assembled perspective view of an image stabilizer and an apparatus cover; and FIG. 29 is an exploded perspective view of an image stabilizer and an apparatus cover. FIG. 30 is an exploded perspective view of an image stabilizer; FIG. 31 is a plan view thereof; FIG. 32 is a front view thereof; FIG. 33 is a left side elevational view thereof; FIG. 34 is a plan view showing a connection state of a flexible printed circuit board; FIG. 35 is a front view thereof; FIG. 36 is a left side elevational view thereof; FIG. 37 is a plan view of an electric actuator; FIG. 38 is a front view thereof; and FIG. 39 is a left side elevational view thereof. FIG. 40 is an exploded perspective view of a coil assembly body; FIG. 41 is a perspective view of a coil assembly body; and FIG. 42 is an exploded perspective view of magnets and a yoke.

Figure 43:
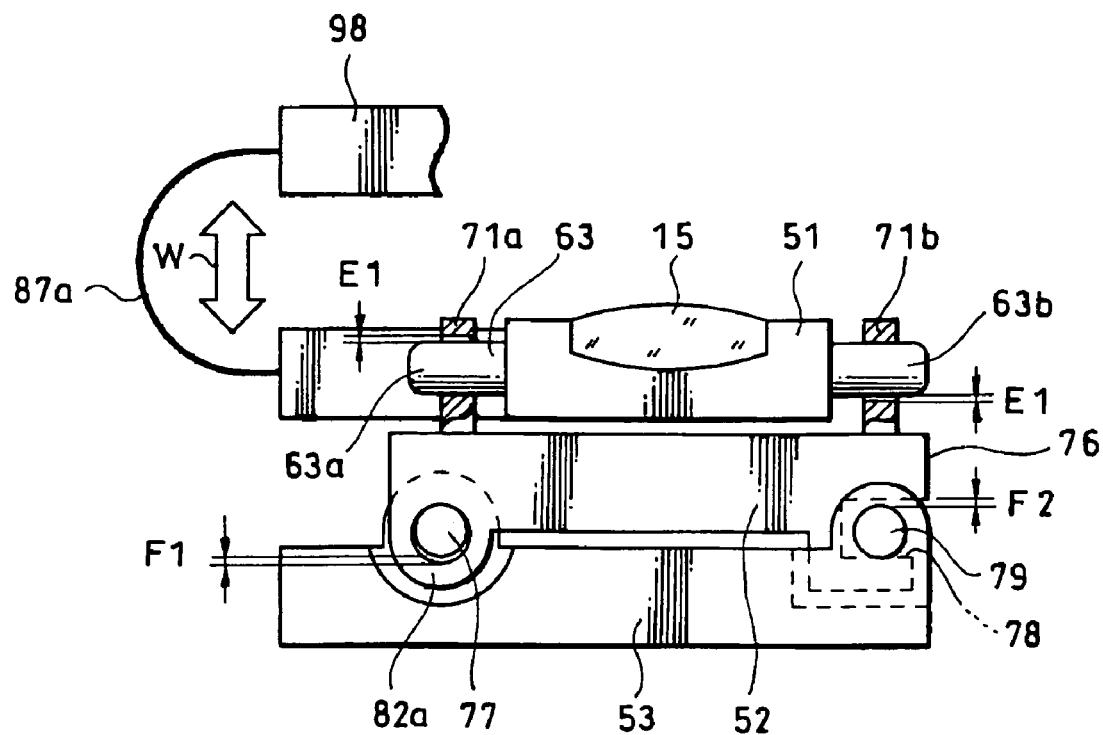
FIG. 43 is a front view schematically explaining the effects of the biasing force of a flexible printed circuit board on the image stabilizer shown in FIG. 27.
Figure 44:
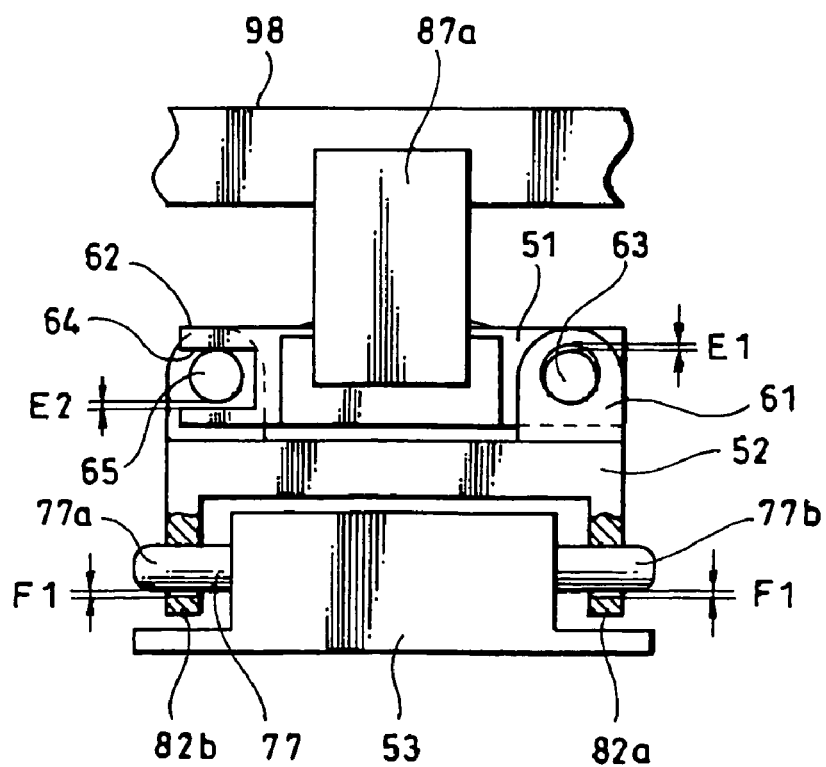
FIG. 44 is a left side elevational view schematically explaining the effects of the biasing force of a flexible printed circuit board on the images stabilizer shown in FIG. 27.
Figure 45:
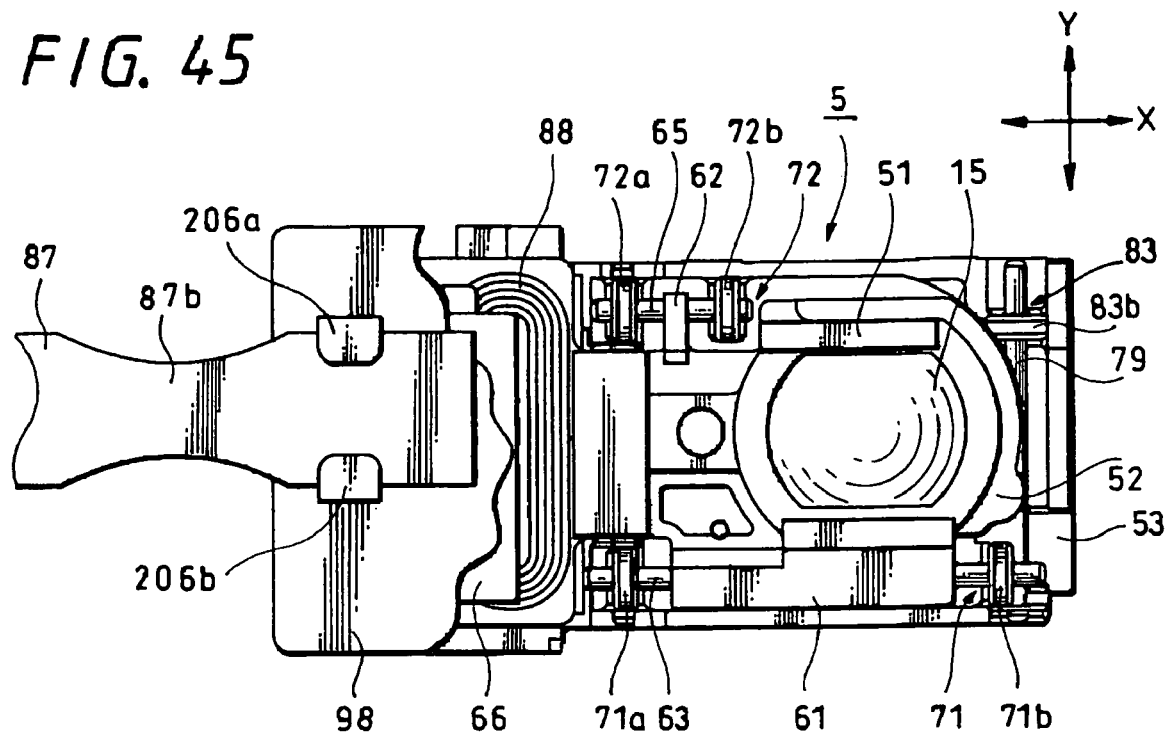
FIG. 45 is a plan view of a modified embodiment of a flexible printed circuit board according to the image stabilizer shown in FIG. 34.
Figure 46:
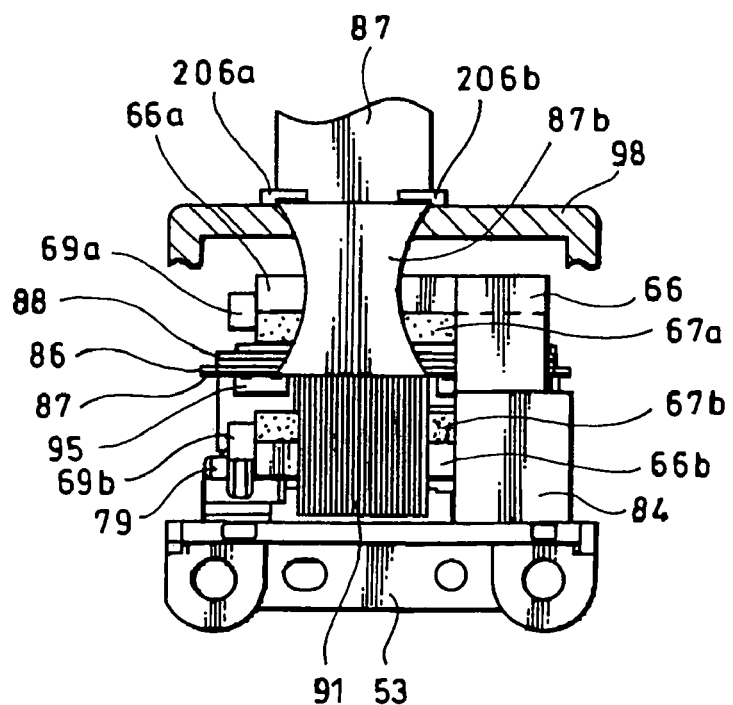
FIG. 46 is a left side elevational view of a modified embodiment of a flexible printed circuit board according to the image stabilizer shown in FIG. 34.
Figure 47:
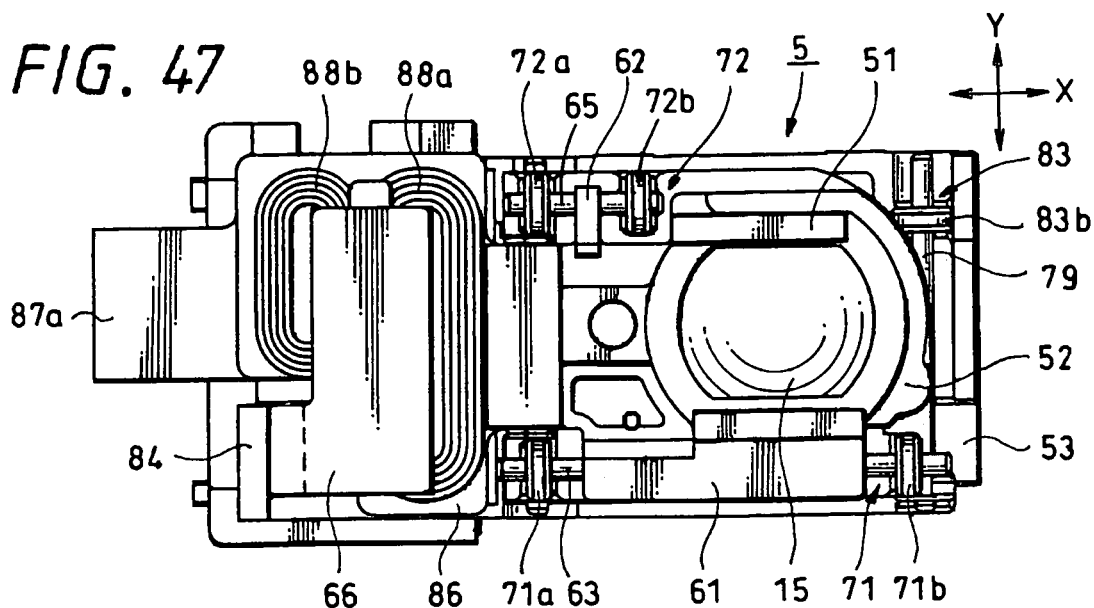
FIG. 47 is a plan view showing the image stabilizer in FIG. 31, in which a flexible printed circuit board is bent downward.
Figure 48:
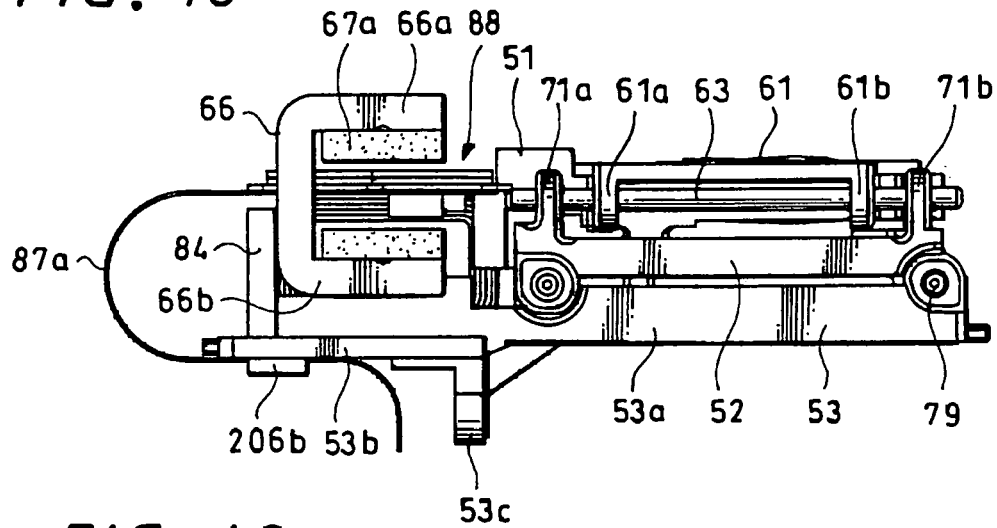
FIG. 48 is a front view showing the image stabilizer in FIG. 31, in which a flexible printed circuit board is bent downward.
Figure 49:
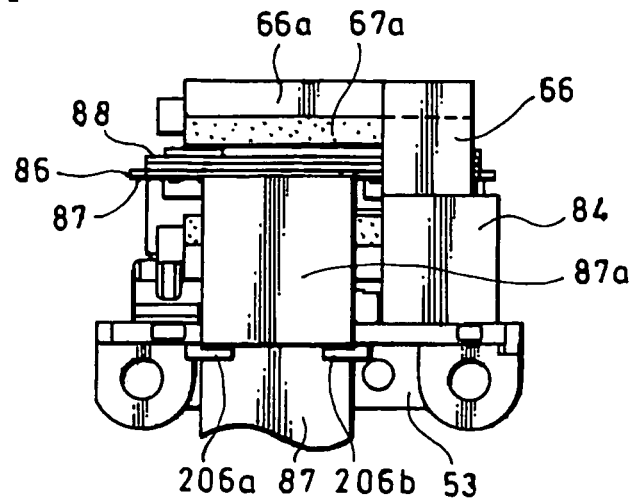
FIG. 49 is a left side elevational view showing the image stabilizer in FIG. 31, in which a flexible printed circuit board is bent downward.
Figure 50:
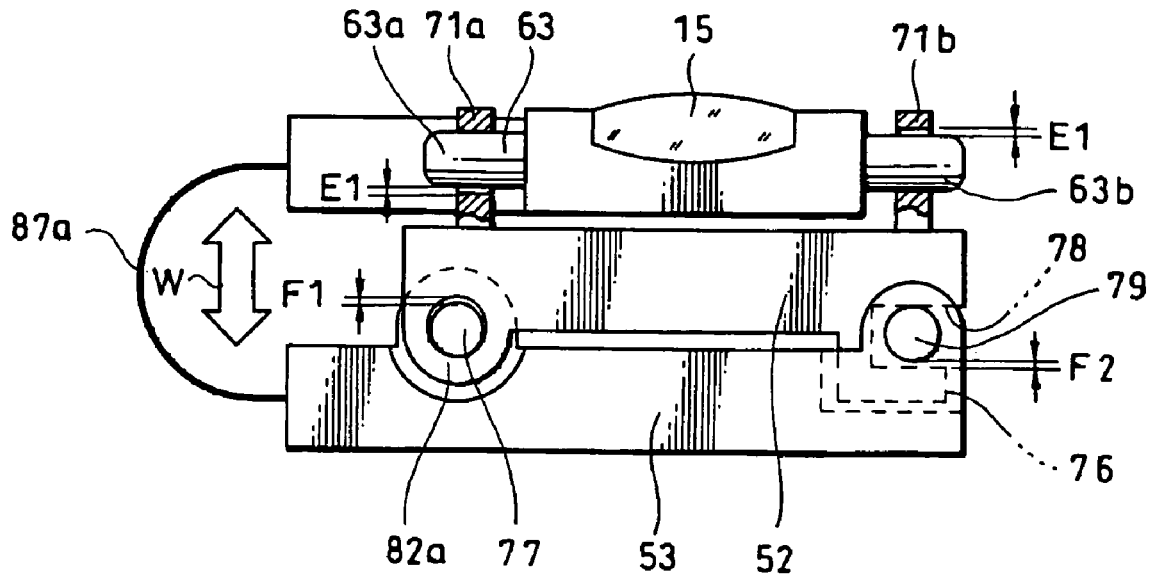
FIG. 50 is a front view schematically explaining another example of the effects of the biasing force of a flexible printed circuit board on the image stabilizer shown in FIG. 31.
Figure 51:
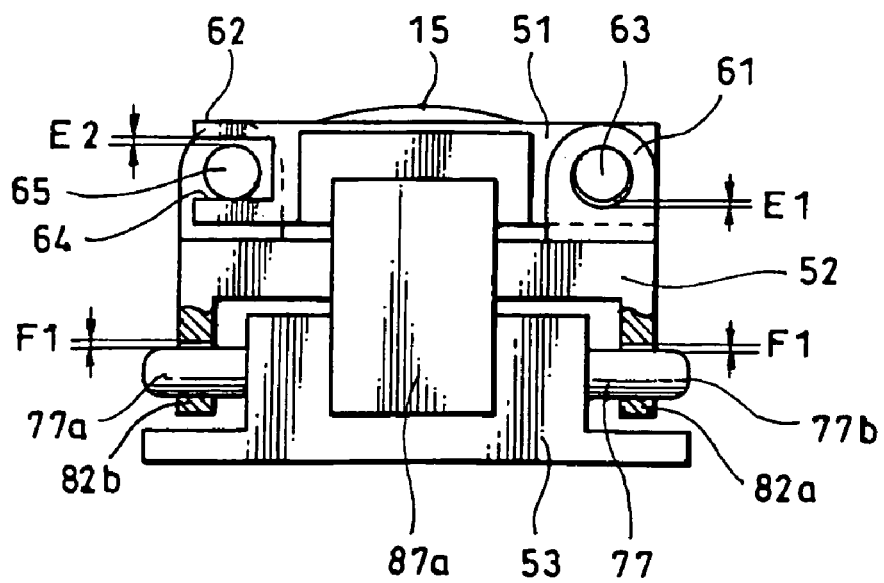
FIG. 51 is a left side elevational view schematically explaining another example of the effects of the biasing force of a flexible printed circuit board on the image stabilizer shown in FIG. 31.
Figure 52:
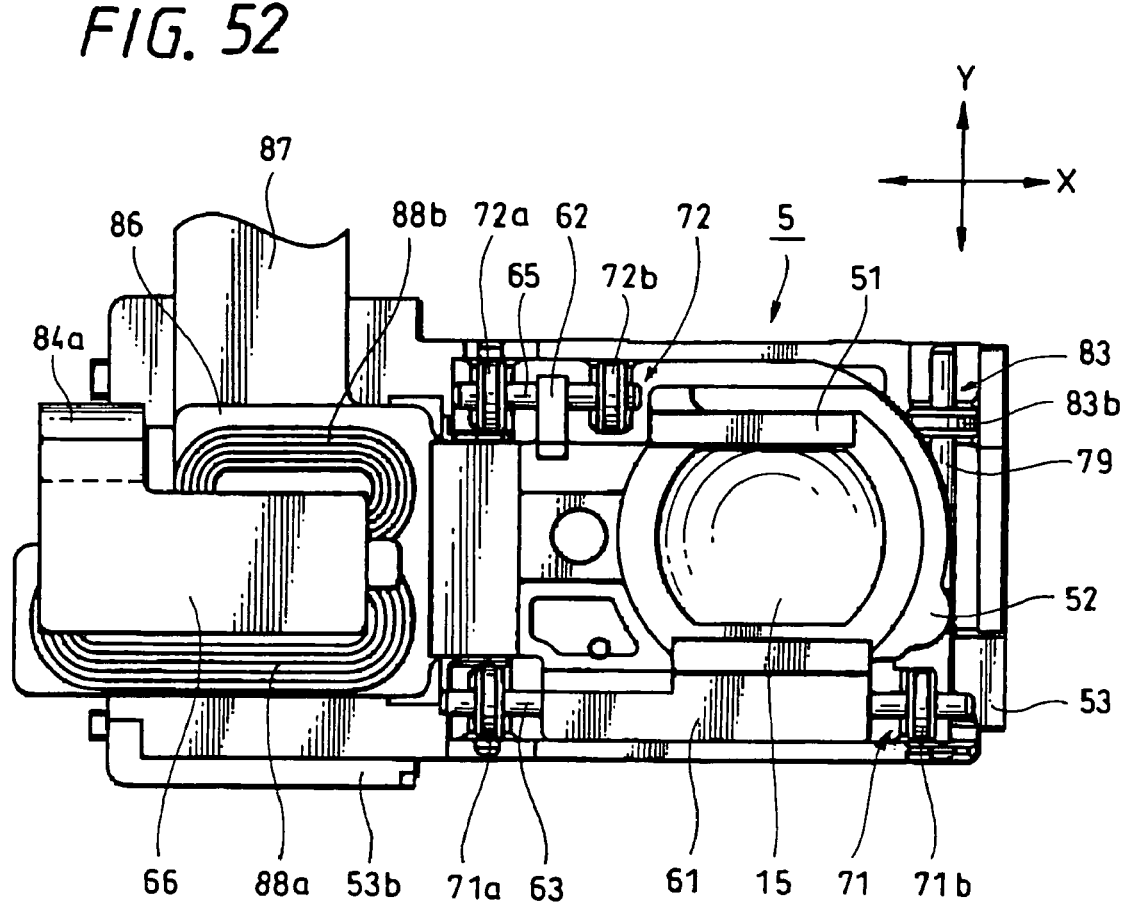
FIG. 52 is a plan view of another example of the arrangement and structure of an electric actuator according to the image stabilizer shown in FIG. 31.
Figure 53:
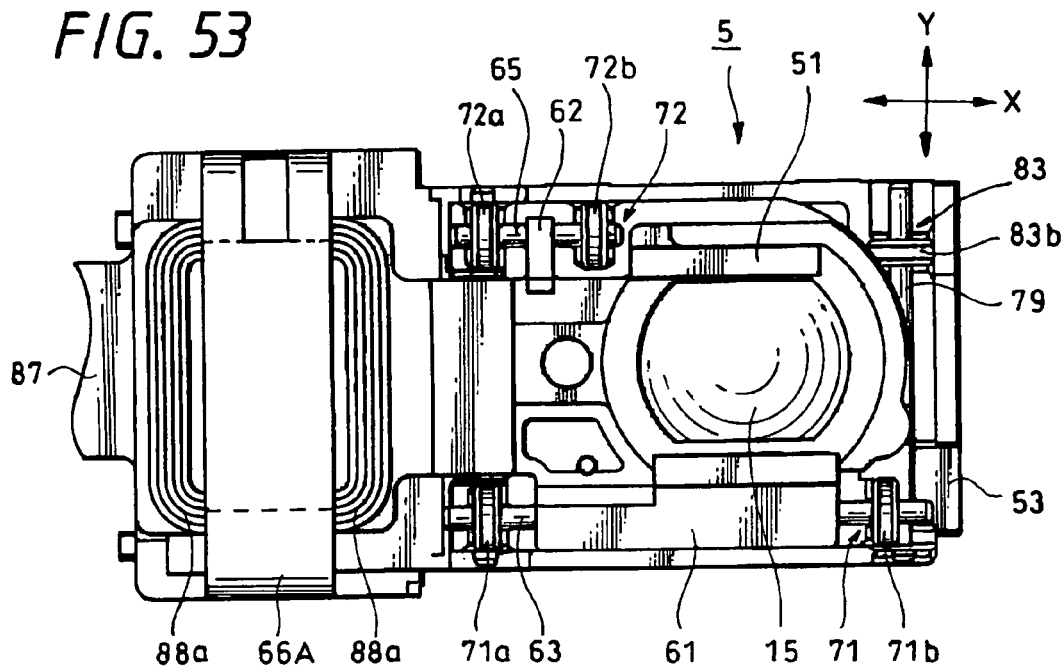
FIG. 53 is a plan view showing a third embodiment of an image stabilizer according to the present invention.
Figure 54:
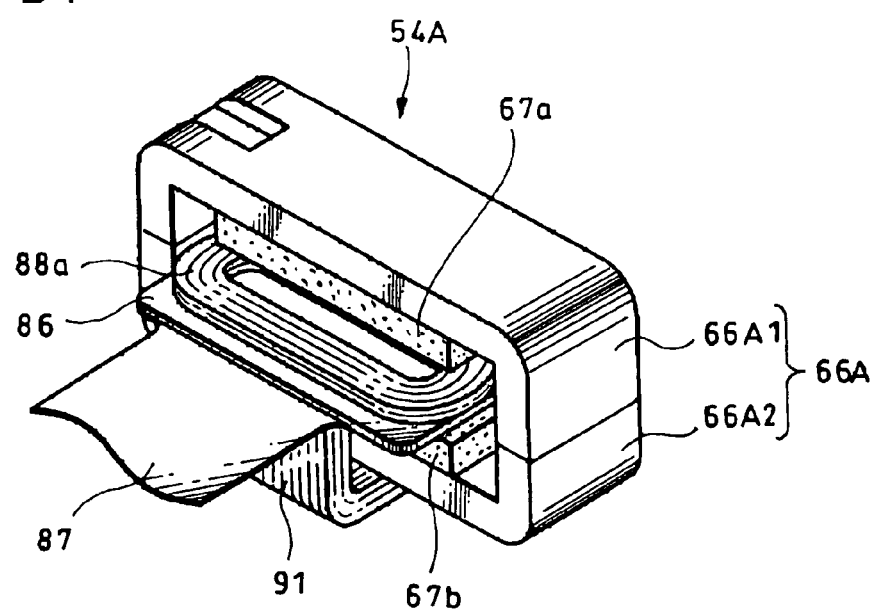
FIG. 54 is a perspective view of an electric actuator according to the image stabilizer shown in FIG. 53.
Figure 55:
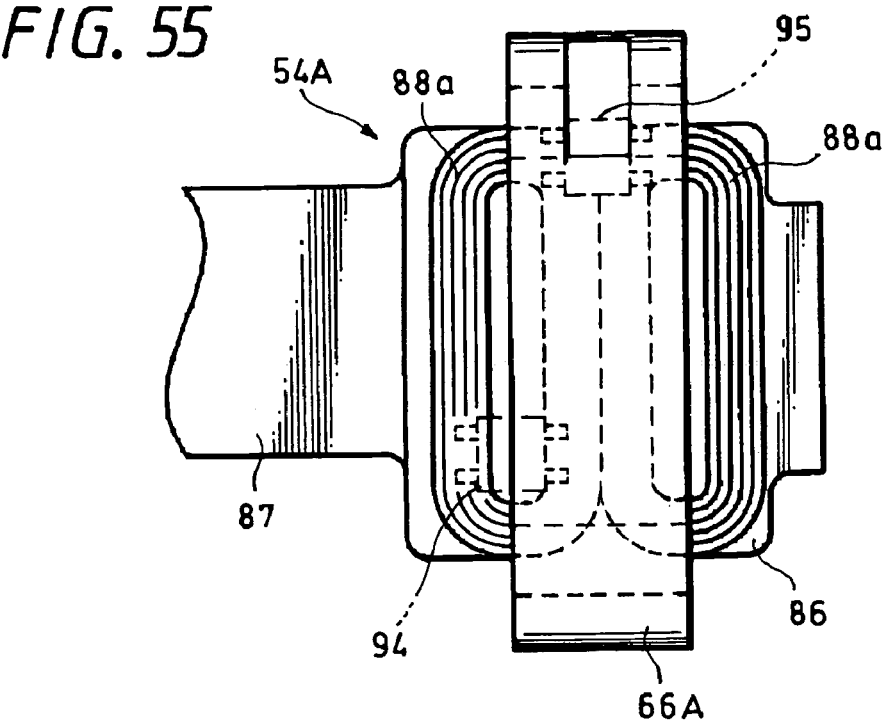
FIG. 55 is a plan view of an electric actuator according to the image stabilizer shown in FIG. 53.
Figure 56:
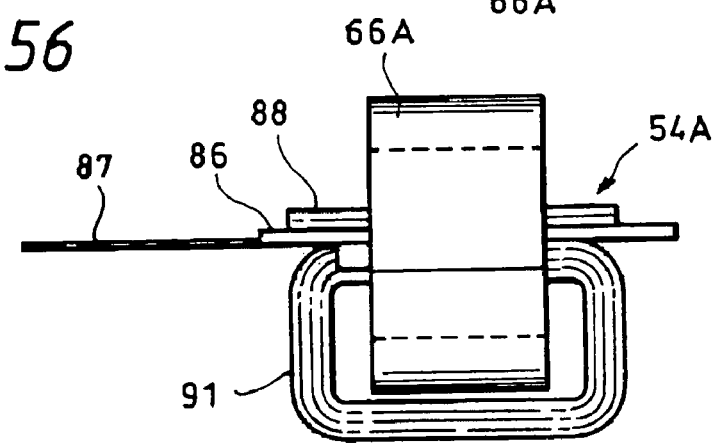
FIG. 56 is a front view of an electric actuator according to the image stabilizer shown in FIG. 53.
Figure 57:
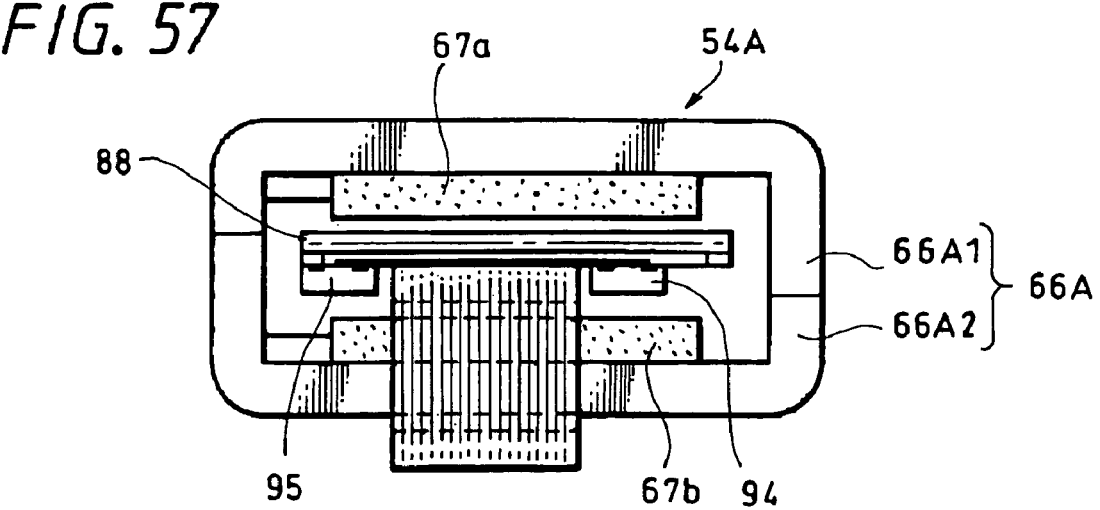
FIG. 57 is a left side elevational view of an electric actuator according to the image stabilizer shown in FIG. 53.
Figure 58:
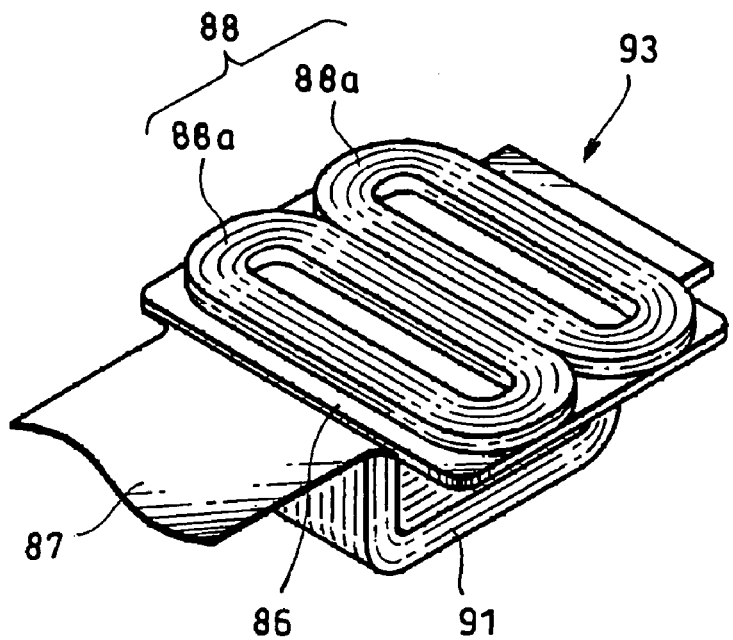
FIG. 58 is a perspective view of a coil assembly body according to the image stabilizer shown in FIG. 53.
Figure 59:
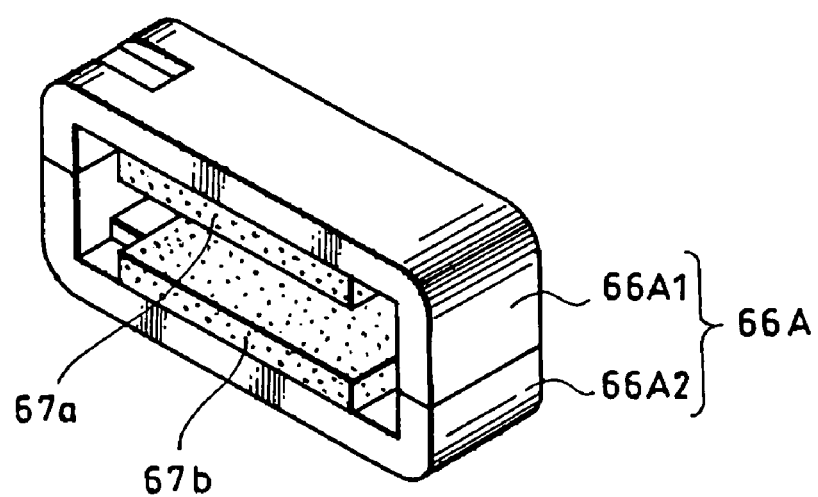
FIG. 59 is a perspective view of a yoke and magnets according to the image stabilizer shown in FIG. 53.

FIG. 43 is a front view of an image stabilizer, explaining the repulsive force of a flexible printed circuit board; and FIG. 44 is a left side elevational view thereof. FIG. 45 is a plan view showing a first connection state of a flexible printed circuit board according to an image stabilizer; and FIG. 46 is a left side elevational view thereof. FIG. 47 is a plan view similarly showing a second connection state of a flexible printed circuit board; FIG. 48 is a front view thereof; and FIG. 49 is a left side elevational view thereof. FIG. 50 is a front view similarly explaining the repulsive force of a flexible printed circuit board; and FIG. 51 is a left side elevational view thereof. FIG. 52 is a plan view showing a modified example of an installed state of an electric actuator; FIG. 53 is a plan view showing a third embodiment of an image stabilizer; FIG. 54 is a perspective view showing a second embodiment of an electric actuator; FIG. 55 is a plan view thereof; FIG. 56 is a front view thereof; and FIG. 57 is a left side elevational view thereof. FIG. 58 is a perspective view of a coil assembly body; and FIG. 59 is a perspective view of magnets and a yoke.

Figure 60:
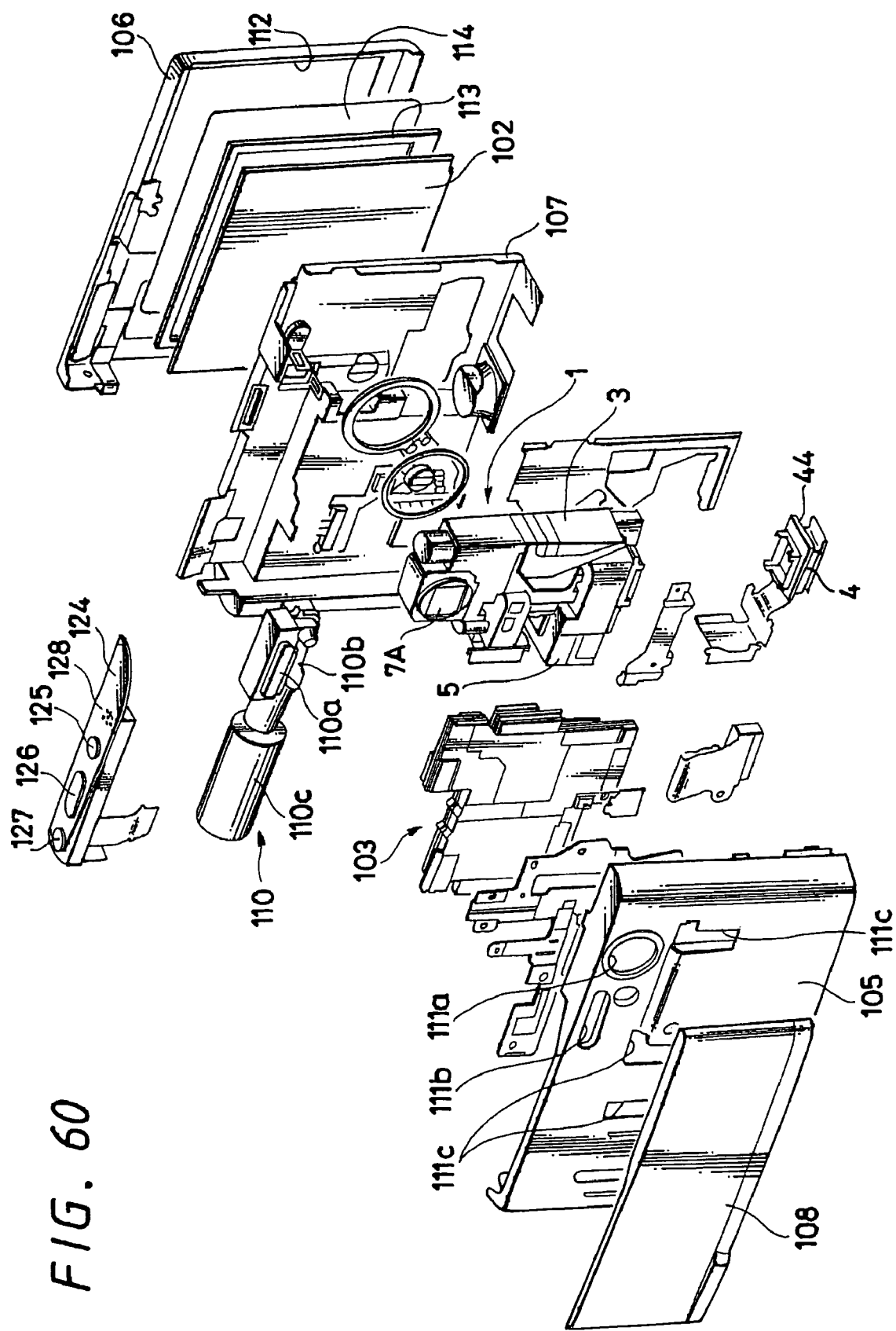
FIG. 60 is an exploded perspective view showing a first embodiment of an imager apparatus according to the present invention, applied to a digital still camera.
Figure 61:
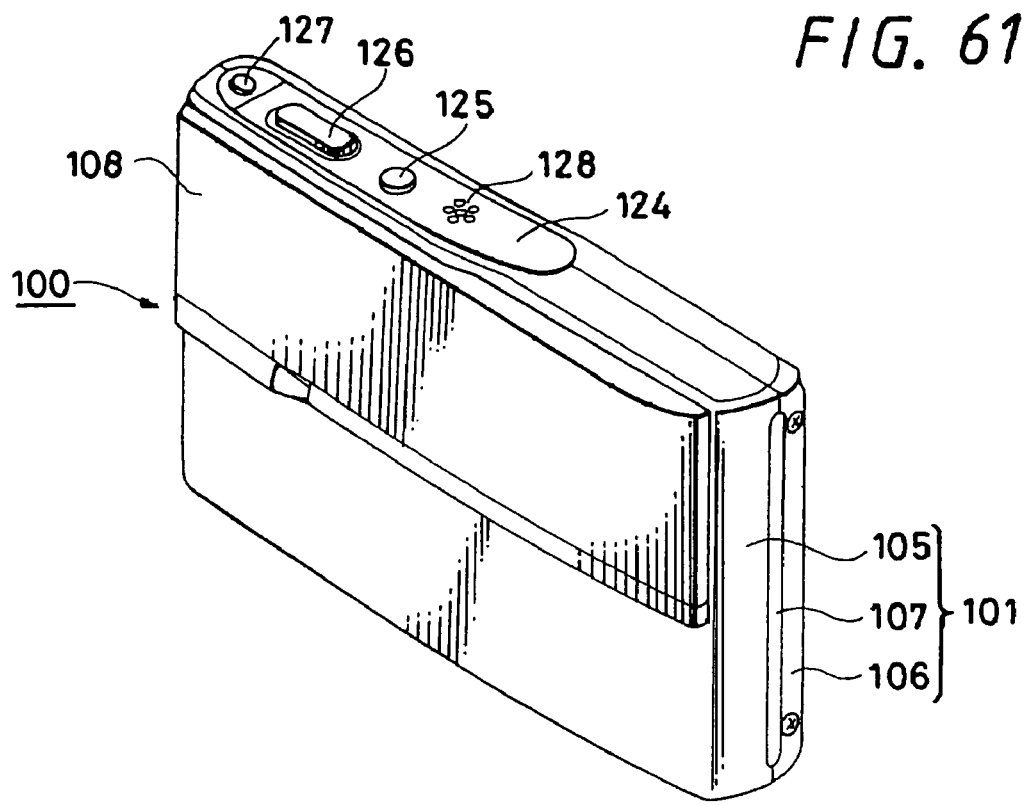
FIG. 61 is a perspective view in which a digital still camera according to a first embodiment of an imager apparatus of the present invention is seen from the front, and an objective lens has been closed by a lens cover.
Figure 62:
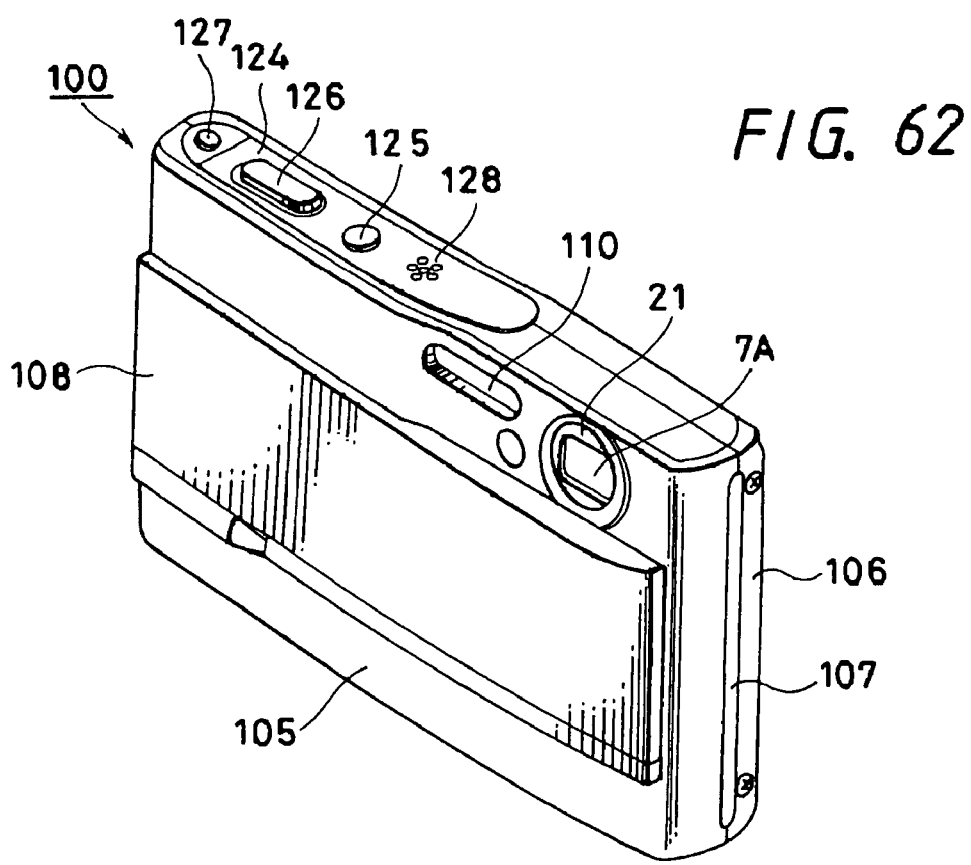
FIG. 62 is a perspective view in which a digital still camera according to a first embodiment of an imager apparatus of the present invention is seen from the front, and an objective lens has been exposed by opening a lens cover.
Figure 63:
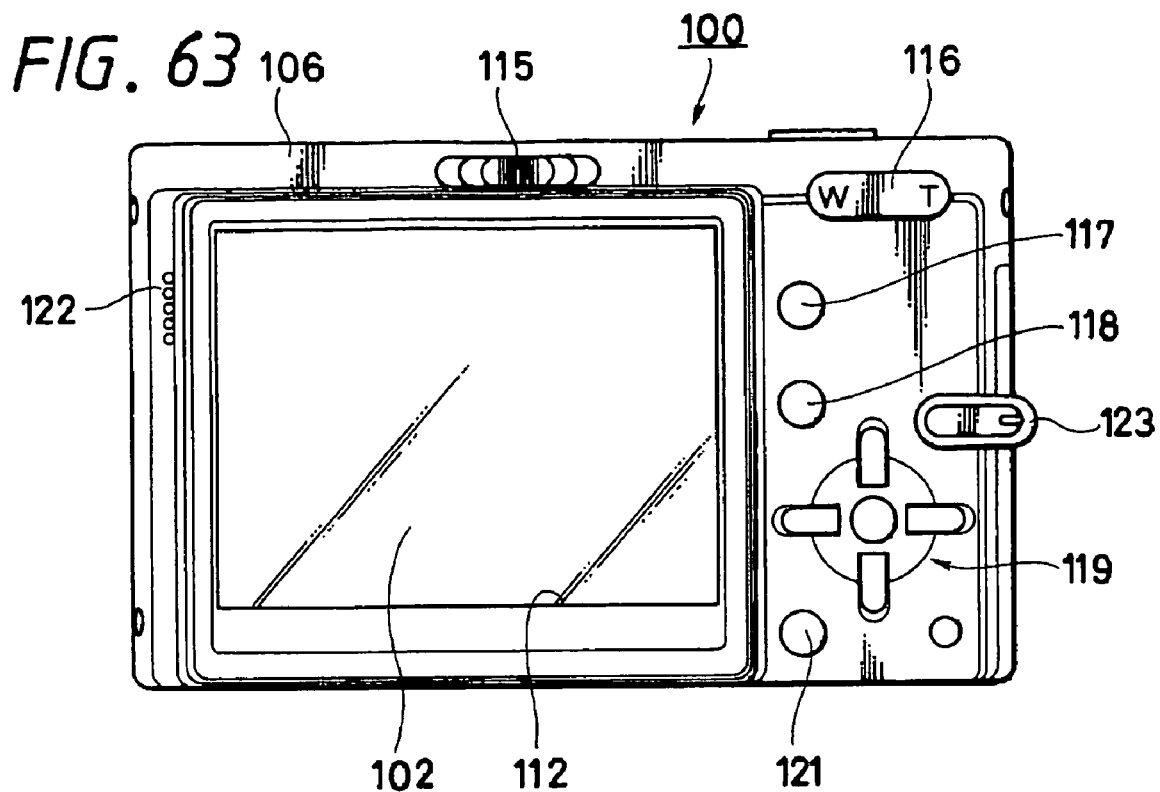
FIG. 63 is a rear view of the digital still camera shown in FIG. 61.
Figure 64:
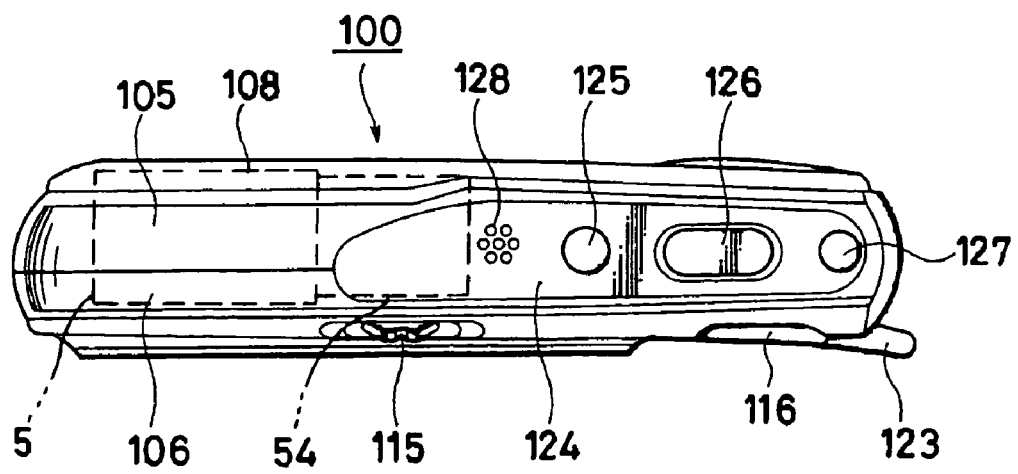
FIG. 64 is a plan view of the digital still camera shown in FIG. 61.
Figure 65:
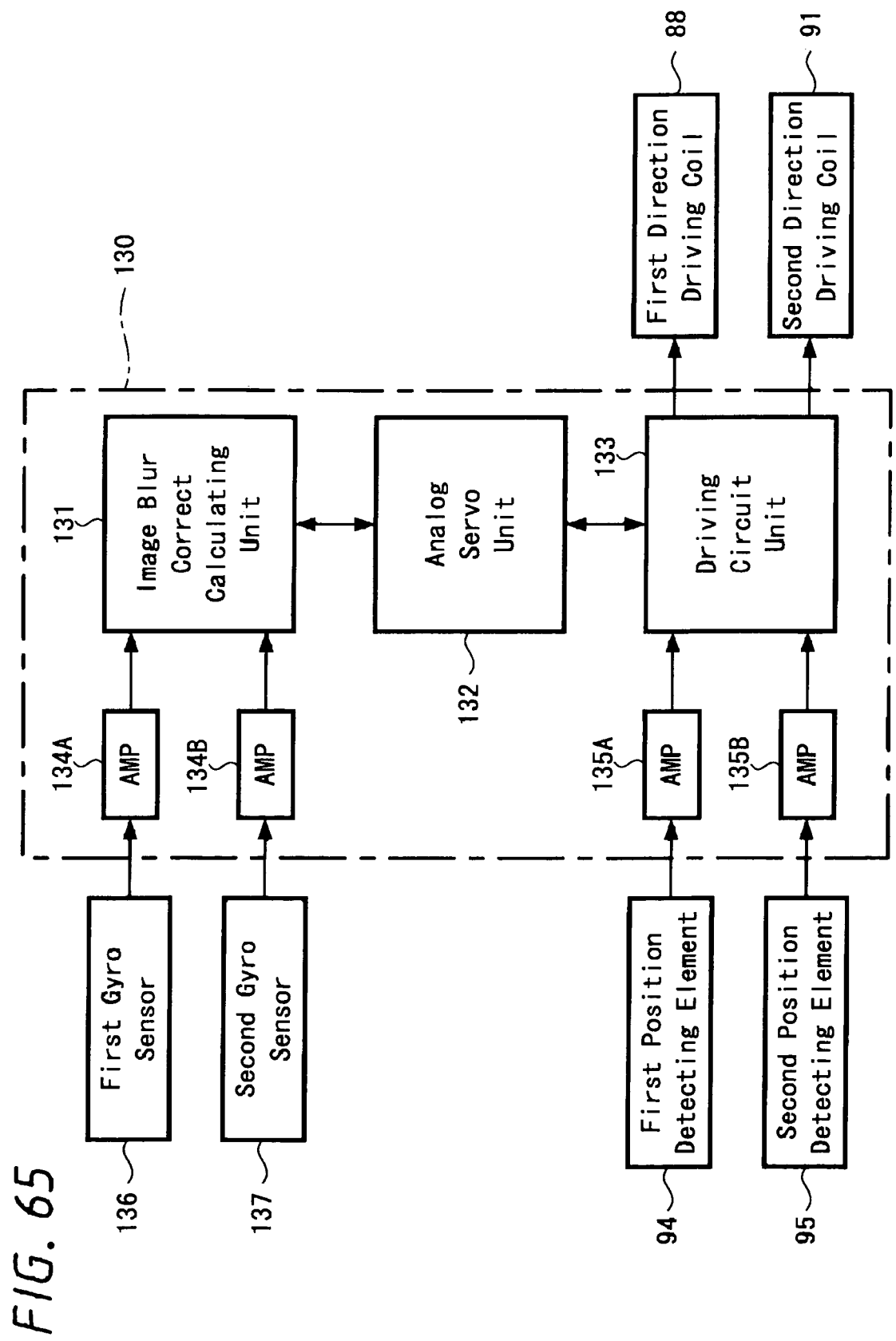
FIG. 65 is a block diagram for explaining the control concept of an image stabilizer according to an embodiment of the present invention.
Figure 66:
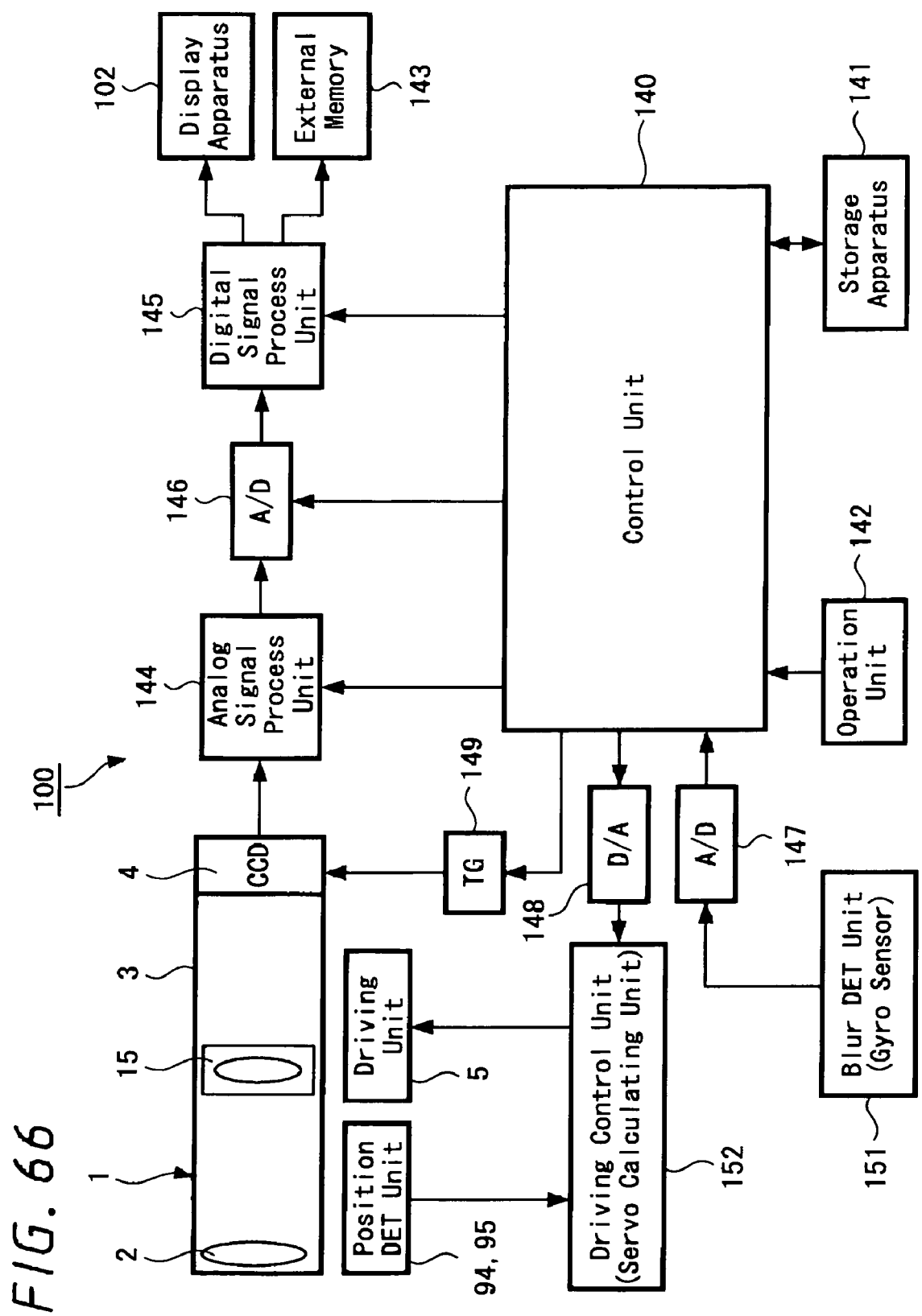
FIG. 66 is a block diagram showing a first embodiment of the schematic configuration of an imager apparatus according to the present invention.

FIG. 60 is an exploded perspective view of a digital still camera showing a first embodiment of an imager apparatus according to the present invention. FIG. 61 is a perspective view of a digital still camera, seen from the front; FIG. 62 is a perspective view in which an objective lens is exposed by moving a lens cover; FIG. 63 is a rear view of the digital still camera; and FIG. 64 is a plan view thereof. FIG. 65 is a block diagram explaining the control concept of an image stabilizer according to an embodiment of the present invention; FIG. 66 is a block diagram showing a first embodiment of the schematic configuration of an imager apparatus according to the present invention; and FIG. 67 is a block diagram similarly showing a second embodiment of the schematic configuration of an imager apparatus.

FIGS. 1 to 12 show a first embodiment of a lens barrel of the present invention. This lens barrel 1 includes a lens system 2, a barrel body 3, an imager 4, an image stabilizer 5 and the like. The lens system 2 has five-group lenses in which a plurality of lenses are disposed on the same optical axis L. The barrel body 3 supports the lenses of this lens system 2 in a fixed or movable manner. The imager 4 is formed of an imager device such as a CCD or CMOS arranged on an optical axis L of the lens system 2 and is fixed to the barrel body 3. The image stabilizer 5 is attached to the barrel body 3 and stabilizes images of the lens system 2.

As shown in FIG. 12, the lens system 2 of the lens barrel 1 is constructed as a collapsible lens having a collapsible lens system formed of five-group lenses 7 to 11 in which five lens groups are disposed on the same optical axis L. Of the five-group lenses 7 to 11, first-group lens 7 positioned at the front end includes: a first lens 7A which is an objective lens that is to face an object; a prism 7B which opposes this objective lens 7A on the opposite side to the object; and a second lens 7C which faces this prism 7B. The prism 7B is formed of a triangular prism whose cross section is shaped to be an isosceles right triangle; one of the two sides which are adjacent to each other and rotationally displaced by 90° is faced by the objective lens 7A, and the other side is faced by the second lens 7C. Specifically, regarding the collapsible lens system of this collapsible lens, the optical axis L of the lens system 2 is bent into an angle of approximately 90° by the prism 7B. Accordingly, a first optical axis L1 is set on the side of the first lens 7A that is an objective lens, and a second optical axis L2 is set on the side of the imager 4 (image focusing side) that is in a direction perpendicular to the first optical axis L1 (in a direction which intersects the first optical axis L1 at an angle of 90°).

As regards this first-group lens 7, light passing through the objective lens 7A enters the prism 7B from one surface. The light is then reflected on a reflecting surface inclined 45° regarding the first optical axis L1 and so is made to advance in a direction that is bent by 90°. Subsequently, the light passes through the second lens 7C after being emitted from the other side; and eventually advances toward a second-group lens 8 along the second optical axis L2. The second-group lens 8 is a combination of a third lens 8A and fourth lens 8B, and is constructed in such a manner as to be movable on the second optical axis L2. Light passing through the second-group lens 8 enters a third-group lens 9.

The third-group lens 9 is formed of a fifth lens fixed to the barrel body 3. Behind the third-group lens 9 is provided a fourth-group lens 10 formed of a sixth lens. Between the fourth-group lens 10 and the third-group lens 9 is provided an iris mechanism 12 capable of adjusting the amount of light which passes through the lens system 2. The fourth-group lens 10 is constructed in such a manner as to be movable on the second optical axis L2. Behind the fourth group lens 10 is provided a fifth-group lens 11 formed of a seventh lens 11A and of a correcting lens 15 described later on. Of the components of the fifth-group lens 11, the seventh lens 11A is fixed to the barrel body 3, the correcting lens 15 is provided behind this seventh lens 11A in a movable manner, and further, a CCD (imager) 4 is provided behind the correcting lens 15.

The second-group lens 8 and the fourth-group lens 10 are movable in the direction of the optical axis independently and separately along the second optical axis L2. By moving the second-group lens 8 and the fourth-group lens 10 in predetermined directions, zoom adjustment and focus adjustment can be performed. Specifically, at the time of zooming, by moving the second-group lens 8 and the fourth-group lens 10 from wide to telephoto, zoom adjustment is carried out. Also, at the time of focusing, by moving the fourth-group lens 10 from wide to telephoto, focus adjustment can be carried out.

The CCD 4 is fixed to a CCD adaptor and is attached to the barrel body 3 by means of this CCD adaptor. In front of the CCD 4 is provided an optical filter 14, and between this optical filter 14 and the seventh lens 11A is provided the image stabilizer 5 having the correcting lens 15. The image stabilizer 5 that is later described in detail is for stabilizing picked-up images (images) blurred by vibration of the lens system 2 or the like. In its normal state, the correcting lens 15 is installed such that the optical axis thereof coincides with the second optical axis L2 of the lens system 2. And when image is blurred on the focusing plane of the CCD 4 owing to vibration of a camera body or the like, the image blurring on the focusing plane is stabilized by the image stabilizer 5 which moves the correcting lens 15 in two directions (a first direction X and second direction Y) perpendicular to the second optical axis L2.

As shown in FIGS. 1 to 11, the barrel body 3 holding the lens system 2 of the above-described structure includes: an upper barrel 16, a middle barrel 17 and a lower barrel 18 which are combined and assembled by arranging one on top of the other in an up-and-down direction. The upper barrel 16 is formed of a case having an opening window 19 provided in the upper part at the front and an opening provided in its lower surface. To the opening window 19 is attached the objective lens 7A of the first-group lens 7, and by means of a panel 21 attached to the front surface thereof, the objective lens 7A is attached to the upper barrel 16. Inside the upper barrel 16 are fixed the prism 7B provided on the rear surface of the objective lens 7A with a light-shielding plate 22 in between, and the second lens 7C provided on the lower surface of this prism 7B.

Further, inside the upper barrel 16 is provided a first movable holding frame 23 which is supported in a movable manner in the direction parallel with the second optical axis L2 of the lens system 2 extended in the up-and-down direction of the barrel body 3. In the first movable holding frame 23 is provided a through-hole which penetrates in the up-and-down direction, and the second-group lens 8 is fixed to the through-hole. This first movable holding frame 23 is constructed in such a manner as to be movable back and forth in the direction of the second optical axis L2 of the lens system 2 within a predetermined range, by means of a zoom driving mechanism 24 attached to the upper barrel 16.

The zoom driving mechanism 24 includes: a zoom motor 25, a feed screw shaft 26 provided as a rotary shaft of this zoom motor 25, a feed nut 27 which engages with this feed screw shaft 26, and the like. The zoom motor 25 is fixed to a first bracket 28 which is U-shaped, and both end portions of the feed screw shaft 26 which protrudes into one end thereof are supported in a freely turnable manner by the first bracket 28. The first bracket 28 is attached to the upper barrel 16 by means of a plurality of (two in this embodiment) fixed screws 29a showing a specific example of a fastening mechanism.

In the installed state of this first bracket 28, the feed nut 27 engages with the feed screw shaft 26 in a slidable manner. The feed nut 27 is held by the first movable holding frame 23, with its movement restricted as regards the direction in which its screw grooves extend. Further, two guide shafts 31a and 31b penetrate into the first movable holding frame 23 in a direction parallel with the second optical axis L2 in a slidable manner. Ends of both the guide shafts 31a and 31b on one side are held by the upper barrel 16, and ends thereof on the other side are held by the middle barrel 17.

Thus, when the zoom motor 25 is driven, the rotating force of the feed screw shaft 26 is transmitted to the first movable holding frame 23 via the feed nut 27. At that time, the feed nut 27 is moved in the axial direction with respect to the feed screw shaft 26 driven and rotating at the predetermined position. As a result, the first movable holding frame 23 moves in combination with the feed nut 27, thereby making the second-group lens 8 selectively move either in a direction approaching the first-group lens 7 or in a direction approaching the third-group lens 9, in accordance with the rotating direction of the zoom motor 25. On this occasion, the first movable holding frame 23 holding the second-group lens 8 is guided in the direction parallel with the second optical axis L2 by the two guide shafts 31a and 31b, and therefore can be moved on the second optical axis L2 with accuracy.

The middle barrel 17 is formed of a roughly rectangular frame body which has openings in its upper and lower surfaces, and the two openings face the lower surface of the upper barrel 16 and the upper surface of the lower barrel 18, respectively. The three barrels thus arranged one on top of the other are fastened and fixed by a plurality of (three in this embodiment) fixed screws 29b which penetrate these in the up-and-down direction, and so assembled integrally, thereby constituting the barrel body 3.

The third-group lens 9 is fixed to and held by the middle barrel 17, and further, the iris mechanism 12 is provided below the third-group lens 9. This iris mechanism 12 includes: a diaphragm member 32 which freely adjusts the area of an aperture, a diaphragm supporting plate 33 which supports this diaphragm member 32 in a movable manner, a step motor 34 which opens and closes the diaphragm member 32, and the like. The step motor 34 is fixed to the side of the upper surface of the middle barrel 17, with a motor base 35 provided in between.

The lower barrel 18 is formed of a case which has openings in its upper surface, side surface and lower surface, and inside the case is supported a second movable holding frame 36 in a movable manner in the up-and-down direction which is parallel with the second optical axis L2 of the lens system 2. In the second movable holding frame 36 is provided a through-hole which penetrates in the up-and-down direction, and the fourth-group lens 10 is fixed to the through-hole. This second movable holding frame 36 is constructed in such a manner as to be movable back and forth in the direction of the second optical axis L2 of the lens system 2 within a predetermined range, by means of a focus driving mechanism 37 attached to the lower barrel 18.

The focus driving mechanism 37 includes: a focusing motor 38, a feed screw shaft 39 provided as a rotary shaft of this focus motor 38, a feed nut 41 which engages with this feed screw shaft 39, and the like. The focusing motor 38 is fixed to a second bracket 42 which is U-shaped, and both end portions of the feed screw shaft 39 which protrudes into one end thereof are supported in a freely turnable manner by the second bracket 42. The second bracket 42 is attached to the lower barrel 18 by means of a plurality of (two in this embodiment) fixed screws 29c that are a fastening mechanism.

In the installed state of this second bracket 42, the feed nut 41 engages with the feed screw shaft 39 in a slidable manner. The feed nut 41 is held by the second movable holding frame 36, with its movement restricted as regards the direction in which its screw grooves extend. Further, two guide shafts 43 (only one of which is shown in FIG. 11) penetrate into the second movable holding frame 36 in the direction parallel with the second optical axis L2 in a slidable manner. Ends of the two guide shafts 43 on one side are held by the middle barrel 17, and ends thereof on the other side are held by the lower barrel 18.

Thus, when the focusing motor 38 is driven, the rotating force of the feed screw shaft 39 is transmitted to the second movable holding frame 36 via the feed nut 41. At that time, the feed nut 41 is moved in the axial direction with respect to the feed screw shaft 39 driven and rotating at the predetermined position. As a result, the second movable holding frame 36 moves in combination with the feed nut 41, thereby making the fourth-group lens 10 selectively move either in a direction approaching the third-group lens 9 or in a direction approaching the fifth-group lens 11, in accordance with the rotation direction of the focusing motor 38. On this occasion, the second movable holding frame 36 holding the fourth-group lens 10 is guided in the a direction parallel with the second optical axis L2 by the two guide shafts 43, and therefore can be moved on the second optical axis L2 with accuracy.

The CCD 4 is attached to the lower surface of the lower barrel 18 by means of a CCD adaptor 44. The CCD adaptor 44 is formed of a plate which has a square opening in the middle; and to one surface thereof is integrally fixed the CCD 4 by a fastening mechanism such as adhesive, through a seal rubber 45 which is shaped like a square frame. On the other surface of the CCD adaptor 44 is provided a light-shielding plate 46 in which optical filters 14 are arranged on top of each other, and these are fixed, being pressed by a filter pressing plate 47. And, with the optical filters 14 provided inside, the CCD adaptor 44 is attached to the lower barrel 18 by a fastening mechanism such as fixed screws.

In an opening 48 made in a side surface of this lower barrel 18 is installed the image stabilizer 5 in a detachable manner. The image stabilizer 5 has a structure shown in FIGS. 13 to 22. This image stabilizer 5 includes the above-mentioned correcting lens 15, a first moving frame 51, a second moving frame 52, a fixed base board 53, an electric actuator 54, a position detector 55 and the like. The first moving frame 51 supports this correcting lens 15. The second moving frame 52 supports this first moving frame 51 in a movable manner in a first direction X perpendicular to the second optical axis L2 of the lens system 2. The fixed base board 53 supports this second moving frame 52 in a movable manner in the a second direction Y perpendicular to the second optical axis L2 and perpendicular to the first direction X. The electric actuator 54 showing a specific example of a driver moves the first moving frame 51 in the first direction X and moves the second moving frame 52 in the second direction Y. The position detector 55 detects the position of the correcting lens 15 with respect to the lens system 2 (as regards the first direction X and the second direction Y).

When the camera body which will be described later on is shaken or vibrated by hand-shake or the like, the correcting lens 15 stabilizes blurred image by its position being moved in the first direction X and/or in the second direction Y corresponding to the amount of image blurring at that time. As shown in FIG. 18, on the outer peripheral edge of the correcting lens 15, a stepped portion 15a which is continuous in a circumferential direction is provided on one side. Further, two-surface width portions 15b and 15b are formed on the outer peripheral edge of the correcting lens 15 by providing a recess in two positions corresponding to the diameter direction. This correcting lens 15 is fixed to the first moving frame 51.

As shown in FIGS. 18 and 19, the first moving frame 51 includes: a ring-shaped lens fixed portion 51a into which the correcting lens 15 is fitted; a yoke fixed portion 51b which is formed continuously to one side of this lens fixed portion 51a, being folded into the form of a crank, and to which a yoke 66 described later on is fixed; and the like. The lens fixed portion 51a has a shape corresponding to the shape of the correcting lens 15, and a stepped portion which engages with the stepped portion 15a of the correcting lens 15 is provided on the peripheral edge of a fitting hole 58 into which the correcting lens 15 is fitted. Further, the lens fixed portion 51a has two-surface width portions 51c and 51d corresponding to the two-surface width portions 15b of the correcting lens 15, and a yoke fixed portion 51b is continued to one side of the direction (first direction X) perpendicular to the direction (second direction Y) in which the two-surface width portions 51c and 51d are opposed.

On the outside of the two-surface width portions 51c and 51d of the lens fixed portion 51a are provided a first main bearing portion 61 and first sub bearing portion 62. The first main bearing portion 61 has two bearing pieces 61a and 61b which are provided in the first direction X with a predetermined space in between. The bearing pieces 61a and 61b are each provided with a bearing hole, and a first main guide shaft 63 penetrates into those bearing holes in the first direction X. The first main guide shaft 63 is fixed to both bearing pieces 61a and 61b with pressure, and both the ends thereof protrude from the bearing pieces 61a and 61b to the outside. The first sub bearing portion 62 is provided with a bearing groove 64 made in its side. A first sub guide shaft 65 engages with this bearing groove 64 in a slidable manner.

Also, a yoke 66 constituting a part of the electric actuator 54 is fixed to the yoke fixed portion 51b of the first moving frame 51 by a fastening mechanism such as adhesive or fixed screws. As shown in FIG. 20, the yoke 66 includes: an upper piece 66a and a lower piece 66b, which are parallel and opposed to each other with a predetermined amount of space in between, and a joint piece 66c, which joins the upper and lower pieces 66a and 66b. The joint piece 66c is provided on one side of the longitudinal direction of the upper and lower pieces 66a and 66b and a recess 66d into which a part of the yoke fixed portion 51b of the first moving frame 51 is inserted is formed from the lateral direction of the joint piece 66c.

The recess 66d of the yoke 66 is provided for the purpose of making a later-described coil assembly body 93 closer to the correcting lens 15, and with this recess 66d, the electric actuator 54 can further be small-sized. To the inner surfaces of the upper and lower pieces 66a and 66b of this yoke 66 are fixed flat magnets 67a and 67b which are formed into the shape of rectangles having approximately the same size as the inner surfaces, by a fastening mechanism such as adhesive. These two magnets 67a and 67b opposed in the upper and lower direction and the yoke 66 constitute a magnetic circuit for the electric actuator 54. Specifically, one magnetic circuit member having one yoke 66 and two magnets 67a and 67b serves as a magnetic circuit for a first electric actuator that is a first driver and also serves as a magnetic circuit for a second electric actuator that is a second driver.

In this embodiment, a magnetic circuit for the electric actuator 54 is constructed by fixing the flat magnets 67a and 67b to the inner surfaces of the upper and lower pieces 66a and 66b of the yoke 66, which is for strengthening magnetic force applied to two coils described later on. Therefore, magnets according to an embodiment of the present invention are not necessarily provided on both the inner surfaces of the upper and lower pieces 66a and 66b of the yoke 66, but by fixing a magnet either on the upper piece 66a or on the lower piece 66b, a magnetic circuit for the electric actuator 54 can be constructed as well.

As shown in FIG. 18, the second moving frame 52 is formed of a flat plate which is slightly wider than the first moving frame 51. The second moving frame 52 is assembled facing the first moving frame 51 in such a manner as to fit under it. At the position of the second moving frame 52 corresponding to the fitting hole 58 of the first moving frame 51 is provided a through-hole 68 which has approximately the same size as the fitting hole 58. On the upper surface of this second moving frame 52 is provided a second bearing portion for supporting the first moving frame 51 in a slidable manner in the first direction X.

The second bearing portion includes: a second main bearing portion 71 which supports the first main guide shaft 63 fixed to the first moving frame 51, in a freely slidable manner; and a second sub bearing portion 72 which supports the first sub guide shaft 65 in a fixed manner. In the state in which the first moving frame 51 has been fitted onto the second moving frame 52, the second main bearing portion 71 is provided in such a position as to be capable of supporting both ends of the first main guide shaft 63. Specifically, the second main bearing portion 71 includes two bearing pieces 71a and 71b which support both ends of the first main guide shaft 63, and is provided on the upper surface of the second moving frame 52 in such a manner as to protrude upward.

The two bearing pieces 71a and 71b of the second main bearing portion 71 are formed apart from each other by the distance which is the total of the length of the first main bearing portion 61 in the first direction X and the length necessary for the first moving frame 51 to move in the first direction X. The two bearing pieces 71a and 71b are each provided with a bearing hole, and both ends of the first main guide shaft 63 are inserted in those bearing holes in a slidable manner.

Also, in the state in which the first moving frame 51 has been fitted onto the second moving frame 52, the second sub bearing portion 72 is provided at such a position as to correspond to the first sub bearing portion 62. Specifically, the second sub bearing portion 72 includes two bearing pieces 72a and 72b which support both ends of the first sub guide shaft 65. The two bearing pieces 72a and 72b are each provided with a bearing hole, and both ends of the first sub guide shaft 65 are fixed to those bearing holes with pressure. This first sub guide shaft 65 is inserted in a freely slidable manner in the bearing groove 64 provided in the first sub bearing portion 62 of the first moving frame 51. The first sub guide shaft 65 and first main guide shaft 63 are so set that their shaft center lines become parallel to each other, and the first moving frame 51 is guided by both guide shafts 63 and 65 to be movable in the first direction X.

On the lower surface of the second moving frame 52 is provided a third bearing portion for supporting the second moving frame 52 in a slidable manner in the second direction Y perpendicular to the first direction X. The third bearing portion includes a third main bearing portion 75 and third sub bearing portion 76. The third main bearing portion 75 is on one end of the second moving frame 52 in the first direction X, includes two bearing pieces 75a and 75b provided with a predetermined amount of space away from each other in the second direction Y, and is provided on the lower surface of the second moving frame 52 in such a manner as to protrude downward. The two bearing pieces 75a and 75b are each provided with a bearing hole, and both ends of a second main guide shaft 77 which extends in the second direction Y are inserted in those bearing holes in a slidable manner.

Also, the third sub bearing portion 76 is provided approximately at the center of the other end of the second moving frame 52 in the first direction X. This third sub bearing portion 76 is provided with a bearing groove 78 open to the lateral direction. A second sub guide shaft 79 extending in the second direction Y perpendicular to the first direction X is engaged with this bearing groove 78 in a slidable manner. Both the second main guide shaft 77 and second sub guide shaft 79 are fixed to the fixed base board 53, respectively. The second moving frame 52 is assembled facing this fixed base board 53 in such a manner as to fit over it.

As shown in FIG. 18, the fixed base board 53 includes a moving frame supporting portion 53*a* which corresponds to the second moving frame 52 in size, a coil fixed portion 53*b* provided continuously formed as one body with this moving frame supporting portion 53*a*, and the like. The moving frame supporting portion 53*a* is formed of a flat plate which has approximately the same size as the second moving frame 52, and the coil fixed portion 53*b* is continuous to one end of this moving frame supporting portion 53*a* in the first direction X. At the position of the moving frame supporting portion 53*a* corresponding to the through-hole 68 of the second moving frame 52 is provided a through-hole 81 which has approximately the same size as the through-hole 68. A fourth bearing portion which supports the second moving frame 52 in a slidable manner in the second direction Y by means of a second guide shaft is provided at both ends of the upper surface of this moving frame supporting portion 53*a* in the first direction X.

The fourth bearing portion includes a fourth main bearing portion 82 provided on one side in the first direction X, and a fourth sub bearing portion 83 provided on the other side in the first direction X. The fourth main bearing portion 82 includes two bearing pieces 82*a* and 82*b* provided with a certain amount of space away from each other in the second direction Y, and is provided on the upper surface of the moving frame supporting portion 53*a* in such a manner as to protrude upward. The two bearing pieces 82*a* and 82*b* are each provided with a bearing hole, and two positions in the middle of the second main guide shaft 77 in its axial direction are pressed into those bearing holes to be fixed. Thus, both ends of the second main guide shaft 77 protrude to the outside of the two bearing pieces 82*a* and 82*b*, respectively.

The two bearing pieces 75*a* and 75*b* of the third main bearing portion 75 provided on the second moving frame 52 are fitted to the protruding portions at both ends of this second main guide shaft 77 in a slidable manner. The two bearing pieces 75*a* and 75*b* are apart from each other by the distance which is the total of the length between the two bearing pieces 82*a* and 82*b* and the length necessary for the second moving frame 52 to move in the second direction Y. Therefore, the third main bearing portion 75 of the second moving frame 52 is supported in a movable manner outside the two bearing pieces 82*a* and 82*b*, with respect to the second main guide shaft 77 fixed to the fourth main bearing portion 82 of the fixed base board 53.

Also, the fourth sub bearing portion 83 includes two bearing pieces 83*a* and 83*b* provided with a certain amount of space away from each other in the second direction Y, and is provided on the upper surface of the moving frame supporting portion 53*a* in such a manner as to protrude upward. The two bearing pieces 83*a* and 83*b* are each provided with a bearing hole, and the second sub guide shaft 79 is pressed into those bearing holes to be supported with both the ends thereof fixed in its axial direction. Between those two bearing pieces 83*a* and 83*b*, the bearing groove 78 of the third sub bearing portion 76 provided on the second moving frame 52 is engaged with the second sub guide shaft 79 in a slidable manner. Therefore, it is possible for the third sub bearing portion 76 to move by a predetermined distance in the second direction Y between the two bearing pieces 83*a* and 83*b*, guided by the second sub guide shaft 79.

The coil fixed portion 53*b* of the fixed base board 53 is formed of a roughly square flat part which has a supporting wall 84 protruding upward, and the supporting wall 84 is provided on one side in the second direction Y. A coil supporting stand 85 is fixed to the coil fixed portion 53*b*, and a coil assembly body 93 is attached to the coil supporting stand 85. As shown in FIG. 20, the coil supporting stand 85 is provided for keeping the coil assembly body 93 at a predetermined height, and is formed as a frame body whose plane is U-shaped. This coil supporting stand 85 is mounted on the coil fixed portion 53*b* to be set along the supporting wall 84, and integrally fixed to the fixed base board 53 by a fastening mechanism such as adhesive or fixed screws. On the lower surface of the fixed base board 53 is provided an attachment boss portion 53*c* for fixing this to the barrel body 3.

The upper surface of the coil supporting stand 85 is formed as a plane surface, and two position-deciding projections 85*a* and 85*a* for deciding the position of a coil supporting member 86 are provided on the upper surface. The two position-deciding projections 85*a* and 85*a* are disposed with a predetermined amount of space away from each other in the second direction Y, and the coil supporting member 86 also serving as a flexible reinforcing plate, whose position has been decided by both the position-deciding projections 85*a* and 85*a*, is fixed on the upper surface of the coil supporting stand 85. A flexible printed circuit board 87 with predetermined electric circuits printed on its upper and lower surfaces is fixed to the coil supporting member 86 by a fastening mechanism such as adhesive tape.

A flat coil 88 showing a specific example of a first coil is installed on the upper surface of the coil supporting member 86. As shown in FIG. 20 and other figures, the flat coil 88 is formed of two levelly-wound elliptical coil portions 88*a* and 88*b* disposed side by side. The two coil portions 88*a* and 88*b* are approximately equal in length in the widthwise direction, but are different in length in the lengthwise direction. The coil supporting member 86 having this flat coil 88 is fixed on the upper surface on one end of the flexible printed circuit board 87, with both coil portions 88*a* and 88*b* extending lengthwise in the direction substantially perpendicular to the direction in which the flexible printed circuit board 87 extends.

As shown in FIG. 21 and other figures, regarding the first coil portion 88*a* provided on the side where the flexible printed circuit board 87 extends, its length in the lengthwise direction (the second direction Y) is made within the range of the length of the coil supporting member 86 in the second direction Y. Regarding the second coil portion 88*b*, meanwhile, its length in the lengthwise direction (the second direction Y) is made short in comparison with the first coil portion 88*a*. This is because a space is provided on one side of the second coil portion 88*b* in the lengthwise direction, and the joint piece 66*c* that is a part of the yoke 66 which constitutes a part of the electric actuator 54, is provided in the space, so as to make the electric actuator 54 small-sized.

The two coil portions 88*a* and 88*b* are formed by winding one coil wire; an electric current is made to flow in the same direction at the parts extending straight in the second direction Y on the long sides adjacent to each other in the first direction X, and thrust-generating portions 89*a* and 89*b* of different lengths are thus formed. As shown in FIG. 22 and other figures, in the state in which the electric actuator 54 has been constructed, these thrust-generating portions 89*a* and 89*b* are opposed to the magnet 67*a*.

The flat coil 88 is electrically connected to a predetermined wiring pattern provided on the upper surface of the flexible printed circuit board 87. Thus, when an electric current is applied to the two coil portions 88*a* and 88*b*, magnetic force produced by the magnets 67*a* and 67*b* acts in the direction perpendicular to the thrust-generating portions 89*a* and 89*b* of the flat coil 88, so that force directed in the first direction X acts on the side of the magnets 67*a* and 67*b* according to Fleming's left-hand rule.

As described above, since the flat coil 88 is formed of the two coil portions 88*a* and 88*b* disposed side by side, large thrust-generating portions can be secured with the flat coil 88 located close to the correcting lens 15 and stored in a predetermined space. Moreover, since a predetermined space is provided by making the length of the two coil portions 88*a* and 88*b* different from each other, and the joint piece 66*c* of the yoke 66 is provided in that space, it is possible to make the whole of the electric actuator 54 small-sized.

Also, a cylindrical coil 91 showing a specific example of a second coil is installed under the flexible printed circuit board 87. Both ends of the cylindrical coil 91 are electrically connected to a predetermined wiring pattern provided on the lower surface of the flexible printed circuit board 87. As shown in FIG. 20 and other figures, the cylindrical coil 91 is provided with a rectangular space portion at its center so that it becomes a rectangular cylindrical body as a whole, and is formed into the shape of an angular cylinder by winding coil wire by a predetermined amount so that it has a predetermined thickness in the direction of a stack. Regarding this cylindrical coil 91, a thrust-generating portion 92 is fixed to the flexible printed circuit board 87 by a fastening mechanism that is adhesive, with the direction in which its coil wire extends being faced the first direction X.

The lower piece 66*b* of the yoke 66 and the lower magnet 67*b* integrally fixed thereto are inserted in the space portion at the center of the cylindrical coil 91. Thus, when an electric current is applied to the cylindrical coil 91, magnetic force produced by the magnets 67*a* and 67*b* acts in the direction perpendicular to the thrust-generating portion 92, and so force directed in the second direction Y acts on the side of the magnets 67*a* and 67*b*, according to Fleming's left-hand rule. The coil supporting member 86, the flexible printed circuit board 87, the flat coil 88 and the cylindrical coil 91 constitute the coil assembly body 93.

As described above, since one coil assembly body 93 is constructed by attaching the flat coil 88 to one surface of the coil supporting member 86 and by attaching the cylindrical coil 91 to the other surface so as to stack the two coils 88 and 91 in a direction parallel with the second optical axis L2, it is possible to reduce a space for arranging the two coils 88 and 91 in the direction perpendicular to the second optical axis L2, and thus the whole of the device can be small-sized. Further, by disposing the thrust-generating portions 89*a* and 89*b* of the flat coil 88 and the thrust-generating portion 92 of the cylindrical coil 91 such that they intersect each other at right angles, the magnetic force of the magnets 67*a* and 67*b* is applied to both the thrust-generating portions 89*a*, 89*b*, and 91 in common, which enables the number of parts of the actuator to be reduced.

FIGS. 21 and 22 show the electric actuator 54 including the coil assembly body 93, the yoke 66 and the two magnets 67*a* and 67*b* described above. Of the components of this electric actuator 54, the yoke 66, the two magnets 67*a* and 67*b* and the flat coil 88 constitute a first driver (first electric actuator) which moves the correcting lens 15 in the first direction X by means of the first moving frame 51. The first main and sub bearing portions 61 and 62 of the first moving frame 51, the first main and sub guide shafts 63 and 65, and the second main and sub bearing portions 71 and 72 constitute a first guide which guides the correcting lens 15 in the first direction X perpendicular to the second optical axis L2 of the lens barrel 1 by means of the first moving frame 51.

Further, the yoke 66, the two magnets 67*a* and 67*b* and the cylindrical coil 91 constitute a second driver (second electric actuator) which moves the correcting lens 15 in the second direction Y by means of the second moving frame 52. The third main and sub bearing portions 75 and 76 of the second moving frame 52, the second main and sub guide shafts 77 and 79, and the fourth main and sub bearing portions 82 and 83 constitute a second guide which guides the correcting lens 15 in the second direction Y perpendicular to the second optical axis L2 of the lens barrel 1 and perpendicular to the first direction X by means of the second moving frame 52.

As described above, in this embodiment, one magnetic circuit member having one yoke 66 and two magnets 67*a* and 67*b* serves as a magnetic circuit for the first driver and a magnetic circuit for the second driver. Therefore, since there is no need to provide a magnetic circuit member for each driver, the number of parts can be reduced to that extent and the whole of the device can be small-sized.

Also, as shown in FIG. 20, to the lower surface of the coil supporting member 86 are attached a first hall element 94 showing a specific example of a first position detector, a second hall element 95 showing a specific example of a second position detector, and a thermistor 96 showing a specific example of a temperature detector. The first hall element 94 detects the position of the correcting lens 15 in the first direction X, by means of the first moving frame 51. Also, the second hall element 95 detects the position of the correcting lens 15 in the second direction Y, by means of the second moving frame 52. The first hall element 94 is provided at one side of the cylindrical coil 91, and the second hall element 95 is provided at the other side of the cylindrical coil 91.

At predetermined positions the first hall element 94 and second hall element 95 detect the strength of the magnetic force of the lower magnet 67*b*, and then output detection signals in accordance with the strength of the magnetic force. Based upon the detection signals from the two hall elements 94 and 95, a control unit calculates the position of the correcting lens 15 by arithmetic operation. Further, the thermistor 96 detects the temperature in the vicinity of the coil assembly body 93, and when the temperature in the vicinity thereof has risen to a predetermined value or above, temperature correction is performed in addition to stabilizing images blurred by camera shake, a vibration or the like.

The image stabilizer 5 with the above-mentioned structure is, for example, assembled as follows. First, as shown in FIGS. 20 to 22, the flat coil 88 is fixed to one surface of the coil supporting member 86, and the cylindrical coil 91 is fixed to the opposite surface to which the flexible printed circuit board 87 is connected. Thus, the coil assembly body 93 in which the coil supporting member 86 and the two coils 88 and 91 are joined is constructed.

The lower piece 66*b* of the yoke 66 is inserted into the hole of the cylindrical coil 91 of this coil assembly body 93 from the lateral direction, and the lower magnet 67*b* fixed to the inner surface of the lower piece 66*b* is opposed to the thrust-generating portion 92 of the cylindrical coil 91. At the same time, the upper magnet 67*a* is opposed to the upper surface of the flat coil 88. Thus, the thrust-generating portions 89*a* and 89*b* of the flat coil 88 and the thrust-generating portion 92 of the cylindrical coil 91 are held between the upper and lower magnets 67*a* and 67*b*, thereby constituting the electric actuator 54. The coil supporting member 86 of this electric actuator 54 is mounted on the upper surface of the coil supporting stand 85, and is positioned by the two position-deciding projections 85a and 85a. Then, the coil supporting member 86 is fixed on the coil supporting stand 85 by a fastening mechanism such as adhesive.

Next, the second moving frame 52 faces the moving frame supporting portion 53a of the fixed base board 53 from above, and the two bearing pieces 82a and 82b of the fourth main bearing portion 82 are positioned between the two bearing pieces 75a and 75b of the third main bearing portion 75. And the third sub bearing portion 76 is positioned between the two bearing-pieces 83a and 83b of the fourth sub bearing portion 83. Subsequently, the second main guide shaft 77 is made to penetrate the bearing holes of the four bearing pieces 75a, 75b, 82a and 82b of the third main bearing portion 75 and fourth main bearing portion 82. On this occasion, the second main guide shaft 77 is pressed into the fourth main bearing portion 82 to be fixed, but is made slidable regarding the third main bearing portion 75.

Further, the second sub guide shaft 79 is made to penetrate the bearing holes of the two bearing pieces 83a and 83b of the fourth sub bearing portion 83 and the bearing groove 78 of the third sub bearing portion 76. On this occasion, the second sub guide shaft 79 is pressed into the fourth sub bearing portion 83 to be fixed, but is made slidable regarding the third sub bearing portion 76. Thus, the second moving frame 52 can move with respect to the fixed base board 53 by a predetermined distance in the second direction Y, namely, can move by the length obtained by subtracting the distance between the outer surfaces of the two bearing pieces 82a and 82b of the fourth main bearing portion 82 from the distance between the inner surfaces of the two bearing pieces 75a and 75b of the third main bearing portion 75.

Next, the lens fixed portion 51a of the first moving frame 51 faces the second moving frame 52 from above, and the two bearing pieces 61a and 61b of the first main bearing portion 61 are positioned between the two bearing pieces 71a and 71b of the second main bearing portion 71. Then, the first sub bearing portion 62 is positioned between the two bearing pieces 72a and 72b of the second sub bearing portion 72. Subsequently, the first main guide shaft 63 is made to penetrate the bearing holes of the four bearing pieces 61a, 61b, 71a and 71b of the first main bearing portion 61 and second main bearing portion 71. On this occasion, the first main guide shaft 63 is pressed into the first main bearing portion 61 to be fixed, but is made slidable regarding the second main bearing portion 71.

Further, the first sub guide shaft 65 is made to penetrate the bearing holes of the two bearing pieces 72a and 72b of the second sub bearing portion 72 and the bearing groove 64 of the first sub bearing portion 62. On this occasion, the first sub guide shaft 65 is pressed into the second sub bearing portion 72 to be fixed, but is made slidable regarding the first sub bearing portion 62. Thus, the first moving frame 51 can move with respect to the second moving frame 52 by a predetermined distance in the first direction X, namely, can move by the length obtained by subtracting the distance between the outer surfaces of the two bearing pieces 61a and 61b of the first main bearing portion 61 from the distance between the inner surfaces of the two bearing pieces 71a and 71b of the second main bearing portion 71.

Next, the yoke 66 to which the two magnets 67a and 67b are fixed is attached to the first moving frame 51. Regarding this installation of the yoke 66, the yoke 66 may be attached to the first moving frame 51 in advance, before the first moving frame 51 is attached to the second moving frame 52. Subsequently, the coil supporting stand 85 to which the coil assembly body 93 is attached is attached to the coil fixed portion 53b of the fixed base board 53. On this occasion, the cylindrical coil 91 is fitted from the lateral direction, and the lower piece 66b of the yoke 66 and the lower magnet 67b are inserted into the hole thereof. Then the coil supporting stand 85 is fixed to the fixed base board 53, using a fastening mechanism such as adhesive. By doing so, the assembly of the image stabilizer 5 is completed, and the image stabilizer 5 with a structure shown in FIGS. 13 to 17 is obtained.

The functions of the image stabilizer 5 with the above-described structure are as follows. The movement of the correcting lens 15 of this image stabilizer 5 is performed by selectively or simultaneously supplying a driving current of an appropriate value to the flat coil 88 and the cylindrical coil 91 of the electric actuator 54 via the flexible printed circuit board 87.

The flat coil 88 and the cylindrical coil 91 of this image stabilizer 5 are fixed to the coil supporting stand 85 by means of the coil supporting member 86, and further, are fixed to the fixed base board 53 by means of the coil supporting stand 85. On this occasion, the thrust-generating portions 89a and 89b of the flat coil 88 are extended in the second direction Y, and the thrust-generating portion 92 of the cylindrical coil 91 is extended in the first direction X. Also, since the two magnets 67a and 67b fixed to both ends of the yoke 66 are provided above and below both the coils 88 and 91, the magnetic flux of a magnetic circuit formed by the yoke 66 and the two magnets 67a and 67b acts in such a manner as to vertically pass through the thrust-generating portions 89a and 89b of the flat coil 88 and the thrust-generating portion 92 of the cylindrical coil 91.

Meanwhile, the yoke 66 and the two magnets 67a and 67b are fixed to the first moving frame 51 holding the correcting lens 15. The correcting lens 15 is supported by the first guide, which has the first moving frame 51, in a movable manner in the first direction X with respect to the second moving frame 52. Further, the correcting lens 15 is supported by the second guide, which has the second moving frame 52, in a movable manner in the second direction Y with respect to the fixed base board 53. Therefore, with the action of the first guide and second guide, the correcting lens 15 is freely movable both in the first direction X and second direction Y within a predetermined range.

If an electric current is applied to the flat coil 88 at present, the electric current flows in the second direction Y at the thrust-generating portions 89a and 89b because the thrust-generating portions 89a and 89b are extended in the second direction Y. On this occasion, since the magnetic flux of the magnetic circuit acts in the up-and-down direction vertical to the thrust-generating portions 89a and 89b, force directed in the first direction X acts on the magnets 67a and 67b and the yoke 66 according to Fleming's left-hand rule. Thus, the first moving frame 51, to which the yoke 66 and the like are fixed, moves in the first direction X. As a result, the correcting lens 15 held by the first moving frame 51 moves in the first direction X, guided by the first guide, in accordance with the magnitude of the electric current applied to the flat coil 88.

On the other hand, if an electric current is applied to the cylindrical coil 91, the electric current flows in the first direction X at the thrust-generating portion 92 because the thrust-generating portion 92 is extended in the first direction X. On this occasion, since the magnetic flux of the magnetic circuit acts in the up-and-down direction vertical to the thrust-generating portion 92, force directed in the second direction Y acts on the magnets 67a and 67b and the yoke 66 according to Fleming's left-hand rule. Thus, the second moving frame 52 moves in the second direction Y by means of the first moving frame 51 to which the yoke 66 and the like are fixed. As a result, the correcting lens 15 moves in the second direction Y, with the first moving frame 51 and second moving frame 52 guided by the second guide, in accordance with the magnitude of the electric current applied to the cylindrical coil 91.

Also, if electric currents are simultaneously applied to the flat coil 88 and the cylindrical coil 91, the movement by the flat coil 88 and the movement by the cylindrical coil 91, both of which have been mentioned above, are performed in a combined manner. Specifically, the correcting lens 15 moves in the first direction X due to the action of the electric current which flows through the flat coil 88, and at the same time, the correcting lens 15 moves in the second direction Y due to the action of the electric current which flows through the cylindrical coil 91. As a result, the correcting lens 15 moves in a diagonal direction, thereby stabilizing images of the lens system 2.

FIG. 23 shows another embodiment of the above-described electric actuator 54. In this electric actuator 54A, a coil assembly body 93 is assembled in a different direction, and its components are similar to those in the above-described embodiment. In this embodiment, the coil assembly body 93 is attached to a fixed base board 53, with the lengthwise direction (direction in which a thrust-generating portion extends) of a flat coil 88 being directed in the first direction X. And a yoke 66 to which magnets 67a and 67b are fixed is attached to a first moving frame 51 such that the lengthwise direction of the yoke 66 (the magnets 67a and 67b as well) corresponds with the lengthwise direction of the flat coil 88. Therefore, a thrust-generating portion of a cylindrical coil 91 is extended in the second direction Y perpendicular to the first direction X.

In the case of this embodiment, when an electric current is applied to the flat coil 88, the force with which a second moving frame 52 moves in the second direction Y is generated. Also, when an electric current is applied to the cylindrical coil 91, the force with which the first moving frame 51 moves in the first direction X is generated.

FIGS. 24 and 25 show another embodiment of the above-described coil assembly body 93. A coil assembly body 181 shown in this embodiment uses a first flat coil 182 as a coil constituting part of a first driver, and similarly uses a second flat coil 183 as a coil constituting part of a second driver. The first flat coil 182 is formed of two elliptical coil portions 182a and 182b disposed side by side, and these two coil portions 182a and 182b are equal in size and shape. And, similarly to the flat coil 88 in the first embodiment, the part where the two coil portions 182a and 182b are adjacent to each other in their widthwise direction (the first direction X) is a thrust-generating portion 187.

The second flat coil 183 has the same structure as the first flat coil 182, includes two coil portions 183a and 183b, and has a thrust-generating portion 188. These two flat coils 182 and 183 are disposed such that their thrust-generating portions 187 and 188 intersect each other at right angles, and the coil assembly body 181 is constructed by the first flat coil 182 being fixed to one surface of a flexible printed circuit board 184, which serves as a coil supporting member, and the second flat coil 183 being fixed to the other surface thereof.

Further, in this embodiment, one magnet 186 is attached to the upper piece of a U-shaped yoke 185, thereby constructing a magnetic circuit. Regarding the magnet 186, its lengthwise direction is set in a direction perpendicular to the thrust-generating portion of the first flat coil 182 (the first direction X). The coil assembly body 181 with the above-described structure, similarly to the above described embodiments, makes it possible to secure large thrust-generating portions, in addition to storing the flat coils 182 and 183 within a predetermined space, and the whole of the device can be small-sized. Moreover, in the case of this embodiment, it is possible to make the coil assembly body 181 considerably thin in comparison with the above-described coil assembly body 93 and thus the whole of the device can be made thin.

It should be noted that a coil assembly body of an image stabilizer according to an embodiment of the present invention can be constructed by combining two cylindrical coils together. In this case, the two cylindrical coils are disposed such that their thrust-generating portions intersect each other at right angles and face each other. And by applying the magnetic force of a magnet to both the thrust-generating portions in common, it is possible to apply thrust to the side of the magnet and thus to move a correcting lens in a first direction and second direction. Also, as opposed to the above-described first embodiment, a cylindrical coil can be fixed to the upper surface of a coil supporting member 86, being used as a first coil, and a flat coil can be fixed to the lower surface of a flexible printed circuit board 87, being used as a second coil.

The above-described embodiments employ what is called a moving magnet method, in which the coil assembly body 93 provided with the two coils 88, 91 and the like is fixed to the fixed base board 53; the yoke 66 and the magnets 67a and 67b are fixed to the first moving frame 51; and thrust generated by applying electric currents to the coils 88 and 91, is applied to the side of the yoke 66 and the magnets 67a and 67b so as to move the correcting lens 15. However, an image stabilizer according to an embodiment of the present invention can also employ what is called a moving coil method, as opposed to the above-mentioned moving magnet method, in which the yoke 66 and the magnets 67a and 67b are fixed to the fixed base board 53, and the coil assembly body 93 is fixed to the first moving frame 51.

It should be noted that according to what is called a moving magnet method as shown in those embodiments, the flexible printed circuit board 87 of the coil assembly body 93 can be fixed to a predetermined place, because the coil assembly body 93 is fixed to the fixed base board 53. As a result, since it is not necessary to secure a space for allowing the movement of the flexible printed circuit board 87, a device can be small-sized. Further, since it is not necessary for the flexible printed circuit board 87 to move, increase in resistance owing to flexural deformation of the flexible printed circuit board 87 is not caused. Therefore, the load of the electric actuator 54 does not increase, the correcting lens 15 can surely be moved by small thrust, and power consumption can be reduced by lowering electric currents applied to the coils 88 and 91.

The image stabilizer 5 having the above-described structure and functions is attached to the lens barrel 1, as shown in FIGS. 1 to 11. The image stabilizer 5 is inserted into and pulled out of the opening 48, provided in the lower barrel 18 of the barrel body 3, from the lateral direction; and is attached to the lower barrel 18 in a detachable manner. In this case, the image stabilizer 5 according to an embodiment of the present invention is constructed as a unit to be one device, and so can be attached and detached easily and swiftly. The numeral 98 shown in FIG. 11 and other figures denotes a cover member which covers the image stabilizer 5. This cover member 98 is attached to the lower barrel 18 of the barrel body 3 in a detachable manner by a fastening mechanism such as fixed screws.

Next, operation of the lens system 2 of the lens barrel 1 in which the image stabilizer 5 has been installed is explained, referring to FIG. 12. When the objective lens 7A of the lens barrel 1 is aimed at an object, light from the object goes along the first optical axis L1 and is input from the objective lens 7A to the inside of the lens system 2. On this occasion, light passed through the objective lens 7A is bent by 90° in the prism 7B, and after that, moves toward the CCD 4 along the second optical axis L2. Specifically, light which has been reflected in the prism 7B and which has passed through the second lens 7C of the first-group lens 7 passes through the second-group lens 8, the third-group lens 9 and the fourth-group lens 10, passes through the seventh lens 11A and the correcting lens 15 of the fifth-group lens 11, and passes through the optical filter 14, thereby forming an image corresponding to the object on the focal plane of the CCD 4.

In this case, at the time of shooting, when camera shake and vibration are not applied to the lens barrel 1, light from the object moves through each center portion of the first-group to fifth-group lenses along the optical axis L (first optical axis L1 and second optical axis L2) as shown by the solid line of light 6A, and so an image is formed at a predetermined position on the focal plane of the CCD 4, and an excellent image can therefore be obtained without image blurring being caused.

On the other hand, at the time of shooting, when camera shake or vibration is applied to the lens barrel 1, light from the object is input to the first-group lens in a inclined state as shown by the chain line of light 6B or shown by the broken line of light 6C. At each of the first-group to fifth-group lenses, the incident lights 6B, 6C pass through the lenses, deviating from the second optical axis L2; however, it is possible to correct the camera shake or the like by moving the correcting lens 15 by a predetermined amount in accordance with the camera shake or the like. This makes it possible to form an image at a predetermined position on the focal plane of the CCD 4, and an excellent image can be obtained by eliminating image blurring.

Camera shake, vibration or the like regarding this lens barrel 1 is detected by means of a blur detector. As this blur detector, a gyro sensor can be used, for example. This gyro sensor is installed in a camera body along with the lens barrel 1, and acceleration, angular velocity, angular acceleration and the like which act on the lens barrel 1 caused by a vibration, camera shake and the like of a photographer's hands are detected. Information detected by this gyro sensor, such as acceleration and angular velocity, is supplied to a control device, and the electric actuator 54 is driven and controlled such that the first moving frame 51 is moved in the first direction X in response to a shake in the first direction X, and the second moving frame 52 is moved in the second direction Y in response to a shake in the second direction Y, thus allowing an image to be formed at a predetermined position on the focal plane of the CCD 4.

FIG. 26 shows a second embodiment of a lens barrel according to the present invention, and its structure is substantially similar to the above-described embodiment. Specifically, a lens barrel 1 includes a lens system 2, a barrel body 3, an imager 4, an image stabilizer 5 and the like. The lens system 2 has five-group lenses in which a plurality of lenses are disposed on the same optical axis L. The barrel body 3 supports the lenses of this lens system 2 in a fixed or movable manner. The imager 4 such as a CCD or CMOS showing a specific example of an imager is disposed on an optical axis L of the lens system 2 and is also fixed to the barrel body 3. The image stabilizer 5 is attached to the barrel body 3 and also stabilizes images of the lens system 2.

As shown in FIG. 12, the lens system 2 of the lens barrel 1 is constructed as a collapsible lens including five group lenses 7 to 11 in which five lens groups are disposed on the same optical axis L. Specifically, similarly to the above-described embodiment, regarding the collapsible lens system of this collapsible lens, the optical axis L of the lens system 2 is bent into an angle of approximately 90° by the prism 7B. Accordingly, a first optical axis L1 is set on the side of the first lens 7A that is an objective lens, and a second optical axis L2 is set on the side of the imager 4 (image focusing side) that is in a direction perpendicular to the first optical axis L1 (in a direction which intersects the first optical axis L1 at an angle of 90°).

As shown in FIGS. 26 to 29 and other figures, since the structure of the five group lenses 7 to 11 forming the lens system 2 is similar to the above-described first embodiment, duplicate explanations thereof are omitted. Similarly, the structure of the lens barrel 3 holding this lens system 2 is similar to the above-described embodiment, and so explanations thereof are omitted as well.

Regarding the lens barrel 1 according to this second embodiment, the image stabilizer 5 is greatly different from that of the above-described lens barrel 1. The image stabilizer 5 according to this second embodiment is greatly different from the image stabilizer 5 according to the above-described embodiment, in that the drive system of the image stabilizer 5 in the second embodiment is constructed as a coil moving system, whereas the drive system of the image stabilizer 5 in the above-described embodiment is constructed as a magnet moving system. Here, the magnet moving system is a system in which a magnet moves in combination with a correcting lens 15, and a coil is fixed. On the other hand, the coil moving system is a system in which a coil moves in combination with a correcting lens 15, and a magnet is fixed.

As shown in FIGS. 30 to 42 and other figures, on the outer peripheral edge of a correcting lens 15, a stepped portion 15a which is extended in a circumferential direction is provided on one side. Further, two-surface width portions 15b and 15b are formed on the outer peripheral edge of the correcting lens 15 by providing a recess in two positions corresponding to a diameter direction. This correcting lens 15 is fixed to a first moving frame 51.

The first moving frame 51 includes: a ring-shaped lens fixed portion 51a into which the correcting lens 15 is fitted; a coil fixed portion 51b which is formed continuously to one side of this lens fixed portion 51a, being folded into the form of a crank and to which a coil assembly body 93 is fixed; and the like. The lens fixed portion 51a has a shape corresponding to the shape of the correcting lens 15, and has a fitting hole 58 into which the correcting lens 15 is fitted. A stepped portion which engages with the stepped portion 15a of the correcting lens 15 is provided on the peripheral edge of the fitting hole 58 of the lens fixed portion 51a. Further, the lens fixed portion 51a has two-surface width portions 51c and 51c corresponding to the two-surface width portions 15b of the correcting lens 15. And the yoke fixed portion 51b is continuous with the lens fixed portion 51a at one side in the direction (first direction X) perpendicular to the direction (second direction Y) in which the two-surface width portions 51c and 51c are opposed to each other.

On the outside of the two-surface width portions 51c and 51c of the lens fixed portion 51a are provided a first main bearing portion 61 and first sub bearing portion 62. The first main bearing portion 61 has two bearing pieces 61a and 61b provided with a predetermined amount of space in between in the first direction X, and a first main guide shaft 63 penetrates both the bearing pieces 61a and 61b in the first direction X. The first main guide shaft 63 is fixed to both bearing pieces 61a and 61b with pressure, and both ends thereof protrude from the bearing pieces 61a and 61b to the outside. The first sub bearing portion 62 is provided with a bearing groove 64 open to the lateral direction. A first sub guide shaft 65 engages with this bearing groove 64 in a slidable manner.

The coil assembly body 93 constituting part of an electric actuator 54 that is a driver which moves the correcting lens 15 in the first direction X and the second direction Y is integrally attached to the coil fixed portion 51b of the first moving frame 51. As shown in FIGS. 40 and 41, the coil assembly body 93 includes a magnetic plate 86 having a magnetic material in the form of a thin plate, a flat coil (first coil) 88 fixed to the upper surface that is one surface of this magnetic plate 86, and a cylindrical coil (second coil) 91 fixed to the lower surface that is the other surface of the magnetic plate 86. One end of a flexible printed circuit board 87 is positioned between the magnetic plate 86 and the cylindrical coil 91. The magnetic plate 86 is formed of a printed circuit board with predetermined wiring circuits printed on its upper and lower surfaces, and is electrically connected to wiring circuits of the flexible printed circuit board 87. This magnetic plate 86 has a function of reinforcing the flexible printed circuit board 87 and a function of serving as a coil supporting member which prevents the part that supports the first moving frame 51 from rattle.

The flat coil 88 levely-wound is installed on the upper surface of this magnetic plate 86, thus being electrically connected to a predetermined wiring pattern provided on the flexible printed circuit board 87. The flat coil 88 is formed of two elliptical coil portions 88a and 88b disposed side by side. The two coil portions 88a and 88b are approximately equal in length in their widthwise direction, but different in length in their lengthwise direction. The reason why the length of two coil portions 88a and 88b are different is as follows. By enabling a joint piece 66c of a yoke 66 to be disposed on the outside of the short coil portion 88b, the area of the flat coil 88 on the flat surface side is kept large and the electric actuator 54 is situated close to the correcting lens 15, and so the whole of the electric actuator 54 can be small-sized.

The two coil portions 88a and 88b are formed by winding one coil wire. Also, the direction in which the coil wire is wound is set such that, when the power is supplied, an electric current is made to flow in the same direction at thrust-generating portions 89a and 89b which extend straight in the lengthwise direction and are adjacent to each other in their widthwise direction. Regarding this flat coil 88, each of the coil portions 88a and 88b is fixed to the magnetic plate 86 by a fastening mechanism which is adhesive, with the lengthwise direction of the two coil portions 88a and 88b being directed in the second direction Y.

The cylindrical coil 91 is attached to the lower surface of the flexible printed circuit board 87 fixed to the lower surface of this magnetic plate 86, and both ends of the cylindrical coil 91 are electrically connected to a predetermined wiring pattern provided on the flexible printed circuit board 87. As shown in FIGS. 40 and 41 and other figures, the cylindrical coil 91 is provided with a rectangular space portion at its center so as to become a rectangular cylindrical body as a whole, and is formed into the shape of an angular cylinder by being wound by a predetermined amount so as to have a predetermined thickness in the direction of a stack. Regarding this cylindrical coil 91, a thrust-generating portion 92 is fixed to the flexible printed circuit board 87 by a fastening mechanism which is adhesive, with the direction in which its coil wire extends being directed in the first direction X.

A lower piece 66b of the yoke 66 and a lower magnet 67b integrally fixed thereto are inserted in the space portion at the center of the cylindrical coil 91. As shown in FIGS. 30, 42 and other figures, the yoke 66 includes an upper piece 66a and a lower piece 66b, which are parallel and opposed to each other with a predetermined amount of space in between, and a joint piece 66c, which joins the upper and lower pieces 66a and 66b. The joint piece 66c is provided at one side of the upper and lower pieces 66a and 66b in a lengthwise direction, thereby forming a recess 66d for inserting part of the yoke fixed portion 51b of the first moving frame 51, in the lateral direction of the joint piece 66c. The recess 66d of the yoke 66 is provided for the purpose of bringing the coil assembly body 93 closer to the correcting lens 15, and this recess 66d enables the electric actuator 54 to be further small-sized.

To the inner surfaces of the upper and lower pieces 66a and 66b of the yoke 66 are fixed flat magnets 67a and 67b having the shape of rectangles of approximately the same size as the pieces, by a fastening mechanism such as adhesive. These two magnets 67a and 67b vertically opposed to each other and the yoke 66 constitute a magnetic circuit for the electric actuator 54. Specifically, one magnetic circuit member including one yoke 66 and two magnets 67a and 67b serves as a magnetic circuit for a first electric actuator 54A formed by the flat coil 88, and as a magnetic circuit for a second electric actuator 54B formed by the cylindrical coil 91.

Further, projected portions 69a and 69b which project in the direction in which the magnets 67a and 67b are extended are provided on ends of the upper and lower pieces 66a and 66b of the yoke 66. These projected portions 69a and 69b are provided mainly for the purpose of actively deflecting the magnetic force of the magnets 67a and 67b toward the yoke 66 side. Specifically, actively deflecting the magnetic force of the magnets 67a and 67b toward the yoke 66 side makes the magnetic field at the ends of the magnets 67a and 67b further equal to the magnetic field at the centers thereof (uniformity of the magnetic field), and thus, interference between the first direction X and the second direction Y can be reduced regarding position detection. Also, two flat surfaces of the magnets 67a and 67b developed in the direction perpendicular to each other are brought in contact with or adjacent to the inner surfaces of the projected portions 69a and 69b. These projected portions 69a and 69b can be shaped to be rectangles or squares as in this embodiment, but may be formed into other shapes such as semicircles, semiellipses and triangles, of course.

Thus, when an electric current is applied to the two coil portions 88a and 88b of the first electric actuator 54A, magnetic force produced by the magnets 67a and 67b acts in a direction perpendicular to the flat coil 88, so that force directed in the first direction X acts on the side of the magnets 67a and 67b according to Fleming's left-hand rule. Also, when an electric current is applied to the cylindrical coil 91 of the second electric actuator 54B, magnetic force produced by the magnets 67a and 67b acts in a direction perpendicular to the thrust-generating portion 92, so that force which directed in the second direction Y acts on the side of the magnets 67a and 67b according to Fleming's left-hand rule.

The magnetic plate 86, the flexible printed circuit board 87, the flat coil 88 and the cylindrical coil 91, which have been mentioned earlier, constitute the coil assembly body 93. This coil assembly body 93, the yoke 66 and the two magnets 67a and 67b constitute the electric actuator 54. The first electric actuator 54A is constructed of a combination of the flat coil 88 including the two coil portions 88a and 88b, the yoke 66, and the magnets 67a and 67b; and the second electric actuator 54B is constructed of a combination of the cylindrical coil 91, the yoke 66, and the magnets 67a and 67b. Note that, the yoke 66 is fixed to a yoke fixed portion 53b of a later-mentioned fixed base board 53 by a fastening mechanism such as adhesive or fixed screws.

As shown in FIGS. 29 and 30, a second moving frame 52 is formed of a flat board which is slightly wider than the first moving frame 51. The second moving frame 52 is assembled facing the first moving frame 51 in such a manner as to fit under it. At the position of the second moving frame 52 corresponding to the fitting hole 58 of the first moving frame 51 is provided a through-hole 68 which has approximately the same size as the fitting hole. On the upper surface of this second moving frame 52 is provided a second bearing portion for supporting the first moving frame 51 in a slidable manner in the first direction X.

The second bearing portion includes: a second main bearing portion 71 which supports the first main guide shaft 63, fixed to the first moving frame 51, in a freely slidable manner; and a second sub bearing portion 72 which supports the first sub guide shaft 65 in a fixed manner. In the state in which the first moving frame 51 has been fitted onto the second moving frame 52, the second main bearing portion 71 is provided in such a position as to be able to support both ends of the first main guide shaft 63. Specifically, the second main bearing portion 71 includes two bearing pieces 71a and 71b which support both ends of the first main guide shaft 63, and is provided on the upper surface of the second moving frame 52 in such a manner as to protrude upward.

The two bearing pieces 71a and 71b of the second main bearing portion 71 are formed apart from each other by the distance which is the total of the length of the first main bearing portion 61 in the first direction X and the length necessary for the first moving frame 51 to move in the first direction X. The two bearing pieces 71a and 71b are each provided with a bearing hole, and both ends of the first main guide shaft 63 are inserted in those bearing holes in a slidable manner.

Also, in the state in which the first moving frame 51 has been fitted onto the second moving frame 52, the second sub bearing portion 72 is provided in a position corresponding to the first sub bearing portion 62. Specifically, the second sub bearing portion 72 includes two bearing pieces 72a and 72b which support both ends of the first sub guide shaft 65. The two bearing pieces 72a and 72b are each provided with a bearing hole, and both ends of the first sub guide shaft 65 are fixed to those bearing holes with pressure. This first sub guide shaft 65 is inserted in a freely slidable manner in the bearing groove 64 provided in the first sub bearing portion 62 of the first moving frame 51. The first sub guide shaft 65 and first main guide shaft 63 are set such that their shaft center lines become parallel to each other, and the first moving frame 51 is movable in the first direction X, guided by both guide shafts 63 and 65.

On the lower surface of the second moving frame 52 is provided a third bearing portion for supporting the second moving frame 52 in a slidable manner in the second direction Y perpendicular to the first direction X. The third bearing portion includes a third main bearing portion 75 and third sub bearing portion 76. The third main bearing portion 75, which is one end of the second moving frame 52 in the first direction X, includes two bearing pieces 75a and 75b provided with a predetermined amount of space away from each other in the second direction Y, and is provided on the lower surface of the second moving frame 52 in such a manner as to protrude downward. The two bearing pieces 75a and 75b are each provided with a bearing hole, and both ends of a second main guide shaft 77 which is extended in the second direction Y are inserted in those bearing holes in a slidable manner.

Also, the third sub bearing portion 76 is provided approximately at the center of the other end of the second moving frame 52 in the first direction X. This third sub bearing portion 76 is provided with a bearing groove 78 made in the lateral direction. A second sub guide shaft 79 extended in the second direction Y perpendicular to the first direction X engages with this bearing groove 78 in a slidable manner. The second main guide shaft 77 and second sub guide shaft 79 are fixed to the fixed base board 53, respectively. The second moving frame 52 is assembled facing this fixed base board 53 in such a manner as to fit over it.

As shown in FIGS. 29, 30 and other figures, the fixed base board 53 includes a moving frame supporting portion 53a which corresponds to the second moving frame 52 in size, a yoke fixed portion 53b provided integrally and continuously with this moving frame supporting portion 53a, and the like. The moving frame supporting portion 53a of the fixed base board 53 is formed of a flat board which has approximately the same size as the second moving frame 52, and the yoke fixed portion 53b is continuous to one end of this moving frame supporting portion 53a in the first direction X. At the position of the moving frame supporting portion 53a corresponding to the through-hole 68 of the second moving frame 52 is provided a through-hole 81 which has approximately the same size as the through-hole 68. A fourth bearing portion, which supports the second moving frame 52 in a slidable manner in the second direction Y by means of the second main and sub guide shafts 77 and 79, is provided at both ends of the upper surface of this moving frame supporting portion 53a in the first direction X.

The fourth bearing portion includes a fourth main bearing portion 82 disposed on one side in the first direction X, and a fourth sub bearing portion 83 disposed on the other side in the first direction X. The fourth main bearing portion 82 includes two bearing pieces 82a and 82b provided with a certain amount of space away from each other in the second direction Y, and is provided on the upper surface of the moving frame supporting portion 53a in such a manner as to protrude upward. The two bearing pieces 82a and 82b are each provided with a bearing hole, and two positions in the middle of the second main guide shaft 77 in its axial direction are pressed into those bearing holes to be fixed. Thus, both ends of the second main guide shaft 77 protrude to the outside of the two bearing pieces 82a and 82b.

The bearing holes of the two bearing pieces 75a and 75b of the third main bearing portion 75 provided on the second moving frame 52 are fitted to the protruding portions at both ends of this second main guide shaft 77 in a slidable manner. The two bearing pieces 75a and 75b are apart from each other by the distance which is the total of the length between the two bearing pieces 82a and 82b and the length necessary for the second moving frame 52 to move in the second direction Y. Therefore, the third main bearing portion 75 of the second moving frame 52 is supported in a movable manner outside the two bearing pieces 82a and 82b, with respect to the second main guide shaft 77 fixed to the fourth main bearing portion 82 of the fixed base board 53.

Also, the fourth sub bearing portion 83 includes two bearing pieces 83a and 83b provided with a certain amount of space away from each other in the second direction Y, and is provided on the upper surface of the moving frame supporting portion 53a in such a manner as to protrude upward. The two bearing pieces 83a and 83b are each provided with a bearing hole, and the second sub guide shaft 79 is pressed into those bearing holes and supported with both ends fixed in its axial direction. Between these two bearing pieces 83a and 83b, the bearing groove 78 of the third sub bearing portion 76 provided on the second moving frame 52 engages with the second sub guide shaft 79 in a slidable manner. Therefore, it is possible for the third sub bearing portion 76 to move by a predetermined distance in the second direction Y, guided by the second sub guide shaft 79 between the two bearing pieces 83a and 83b.

The yoke fixed portion 53b of the fixed base board 53 is formed of a roughly square flat part which has a supporting portion 84 protruding upward, and the supporting portion 84 is disposed on one side in the second direction Y. The lower piece 66b of the yoke 66 is engaged and held by means of this supporting portion 84. Thus, the yoke 66 is fixed to the fixed base board 53, with the upper and lower pieces 66a and 66b and the two magnets 67a and 67b opposing the direction of the optical axis. In this case, the yoke 66 may be held by means of the holding force of the supporting portion 84, or may be fastened and fixed using a fastening mechanism such as fixed screws. Further, on the lower surface of the fixed base board 53 is provided an attachment boss portion 53c for fixing this board to the lens barrel 3.

Also, positioning holes 73A, 73B and 73C are provided in the first and second moving frames 51 and 52, and in the fixed base board 53, at positions which make the centers of the fitting hole 58 and through-holes 68 and 81 approximately equal when the first and second moving frames 51 and 52 and the fixed base board 53 have been fitted together. These positioning holes 73A, 73B and 73C are provided to improve efficiency of an assembly process and the like, by positioning the first and second moving frames 52 and the fixed base board 53 in accordance with a predetermined positional relationship, when the image stabilizer 5 is being assembled.

The first main and sub bearing portions 61 and 62 of the first moving frame 51, the first main and sub guide shafts 63 and 65, and the second main and sub bearing portions 71 and 72, which have been mentioned above, constitute a first guide which guides the correcting lens 15 in the first direction X perpendicular to the second optical axis L2 of the lens barrel 1 by means of the first moving frame 51. The third main and sub bearing portions 75 and 76 of the second moving frame 52, the second main and sub guide shafts 77 and 79, and the fourth main and sub bearing portions 82 and 83 constitute a second guide which guides the correcting lens 15 in the second direction Y perpendicular to the second optical axis L2 of the lens barrel 1 and also perpendicular to the first direction X by means of the second moving frame 52.

As described above, in this embodiment, one magnetic circuit member including one yoke 66 and two magnets 67a and 67b serves as a magnetic circuit for the first electric actuator 54A and a magnetic circuit for the second electric actuator 54B. Therefore, since there is no need to provide a magnetic circuit member for each driver, the number of components can be reduced to that extent, and the whole of the apparatus can be small-sized.

Further, as shown in FIGS. 37 to 41, to the lower surface of the magnetic plate 86 are attached: two hall elements 94 and 95 that are position detectors for detecting the position of the correcting lens 15 as regards the first direction X and the second direction Y; and a temperature detector 96 that detects the temperature in the vicinity thereof. A thermistor 96, for example, can be used as the temperature detector. This thermistor 96 detects the temperature in the vicinity of the coil assembly body 93 and, when the temperature in the vicinity has risen to a predetermined value or above, a temperature correction is performed in addition to stabilizing images blurred by a hand shake, vibration or the like.

The first hall element 94 showing a specific example of a first position detector detects the position of the correcting lens 15 in the first direction X by means of the first moving frame 51. Also, the second hall element 95 showing a specific example of a second position detector detects the position of the correcting lens 15 in the second direction Y by means of the second moving frame 52. The first hall element 94 is disposed at one side of the cylindrical coil 91, and the second hall element 95 is disposed at the other side of the cylindrical coil 91. In predetermined positions the first hall element 94 and the second hall element 95 detect the strength of the magnetic force of the lower magnet 67b, and then output detection signals in accordance with the strength of the magnetic force. Based upon the detection signals from these two hall elements 94 and 95, a control apparatus calculates the position of the correcting lens 15.

The image stabilizer 5 with the above-described structure can be assembled, for example, as follows. First, as shown in FIGS. 40 and 41, the flat coil 88 is fixed to one surface of the magnetic plate 86, and the cylindrical coil 91 is fixed to the opposite surface to which the flexible printed circuit board 87 is connected. Thus, the coil assembly body 93 in which the magnetic plate 86, the flexible printed circuit board 87, the two flat coils 88 and the cylindrical coil 91 are joined is constructed.

Next, the magnets 67a and 67b are disposed and fixed on the inside of the upper piece 66a and lower piece 66b of the yoke 66, respectively. The lower piece 66b of this yoke 66 and the magnet 67b are inserted into the hole of the cylindrical coil 91 of the coil assembly body 93 from the lateral direction. Then, the lower magnet 67b is made to face the lower surface of the thrust-generating portion 92 of the cylindrical coil 91, and the upper magnet 67a is made to face the upper surface of the flat coil 88. Thus, the thrust-generating portions 89a and 89b of the flat coil 88 and the thrust-generating portion 92 of the cylindrical coil 91 are held between the upper and lower magnets 67a and 67b, thereby constituting the electric actuator 54. The magnetic plate (flexible reinforcing plate) 86 of this electric actuator 54 is fixed to the coil fixed portion 53b of the first moving frame 51.

Next, the second moving frame 52 is disposed facing the moving frame supporting portion 53a of the fixed base board 53 from above, and the two bearing pieces 82a and 82b of the fourth main bearing portion 82 are positioned between the two bearing pieces 75a and 75b of the third main bearing portion 75. And the third sub bearing portion 76 is positioned between the two bearing pieces 83a and 83b of the fourth sub bearing portion 83. Subsequently, the second main guide shaft 77 penetrates through the bearing holes of the four bearing pieces 75a, 75b, 82a and 82b of the third main bearing portion 75 and fourth main bearing portion 82. On this occasion, the second main guide shaft 77 is pressed into the fourth main bearing portion 82 to be fixed, but is made slidable with respect to the third main bearing portion 75.

Further, the second sub guide shaft 79 penetrates through the bearing holes of the two bearing pieces 83a and 83b of the fourth sub bearing portion 83 and the bearing groove 78 of the third sub bearing portion 76. On this occasion, the second sub guide shaft 79 is pressed into the fourth sub bearing portion 83 to be fixed, but is made slidable with respect to the third sub bearing portion 76. Thus, the second moving frame 52 can move with respect to the fixed base board 53 by a predetermined distance in the second direction Y, namely, by the length obtained by subtracting the distance between the outer surfaces of the two bearing pieces 82a and 82b of the fourth main bearing portion 82 from the distance between the inner surfaces of the two bearing pieces 75a and 75b of the third main bearing portion 75.

Next, the lens fixed portion 51a of the first moving frame 51 is disposed facing the second moving frame 52 from above, and the two bearing pieces 61a and 61b of the first main bearing portion 61 are positioned between the two bearing pieces 71a and 71b of the second main bearing portion 71. And the first sub bearing portion 62 is positioned between the two bearing pieces 72a and 72b of the second sub bearing portion 72. Subsequently, the first main guide shaft 63 penetrates the bearing holes of the four bearing pieces 61a, 61b, 71a and 71b of the first main bearing portion 61 and second main bearing portion 71. On this occasion, the first main guide shaft 63 is pressed into the first main bearing portion 61 to be fixed, but is made slidable with respect to the second main bearing portion 71.

Further, the first sub guide shaft 65 penetrates through the bearing holes of the two bearing pieces 72a and 72b of the second sub bearing portion 72 and the bearing groove 64 of the first sub bearing portion 62. On this occasion, the first sub guide shaft 65 is pressed into the second sub bearing portion 72 to be fixed, but is made slidable with respect to the first sub bearing portion 62. Thus, the first moving frame 51 can move with respect to the second moving frame 52 by a predetermined distance in the first direction X, namely, by the length obtained by subtracting the distance between the outer surfaces of the two bearing pieces 61a and 61b of the first main bearing portion 61 from the distance between the inner surfaces of the two bearing pieces 71a and 71b of the second main bearing portion 71.

Next, the yoke 66 to which the two magnets 67a and 67b are fixed is attached to the fixed base board 53. Regarding this installation of the yoke 66, the yoke 66 may be attached to the fixed base board 53 in advance, that is, before the first moving frame 51 is attached to the second moving frame 52. Subsequently, the coil assembly body 93 is attached to the coil fixed portion 51b of the first moving frame 51. On this occasion, the cylindrical coil 91 is fitted from the lateral direction, and the lower piece 66b of the yoke 66 and the lower magnet 67b are inserted into the hole thereof. Then the coil assembly body 93 is fixed to the coil fixed portion 51b of the first moving frame 51, using a fastening mechanism such as adhesive. By doing so, the assembly of the image stabilizer 5 is completed, and the image stabilizer 5 with a structure shown in FIGS. 30 to 42 is obtained.

The functions of the image stabilizer 5 of a moving coil system, having the above-described structure are as follows. The movement of the correcting lens 15 of this image stabilizer 5 is performed by selectively or simultaneously supplying driving currents of an appropriate value to the flat coil 88 and the cylindrical coil 91 of the electric actuator 54 via the flexible printed circuit board 87.

The flat coil 88 and the cylindrical coil 91 of this image stabilizer 5 are fixed to the first moving frame 51 as a unit of the coil assembly body 93. On this occasion, the thrust-generating portions 89a and 89b of the flat coil 88 are extended in the second direction Y, and the thrust-generating portion 92 of the cylindrical coil 91 is extended in the first direction X. Also, since the two magnets 67a and 67b fixed to both ends of the yoke 66 are disposed above and below both the coils 88 and 91, the magnetic flux of a magnetic circuit formed by the yoke 66 and the two magnets 67a and 67b acts in such a manner as to be transmitted through the thrust-generating portions 89a and 89b of the flat coil 88 and the thrust-generating portion 92 of the cylindrical coil 91 vertically.

Also, the correcting lens 15 of the image stabilizer 5 is supported in a movable manner by the first guide, which has the first moving frame 51, in the first direction X with respect to the second moving frame 52. Further, the correcting lens 15 is supported in a movable manner by the second guide, which has the second moving frame 52, in the second direction Y with respect to the fixed base board 53. Therefore, with the action of the first guide and the second guide, the correcting lens 15 is freely movable both in the first direction X and the second direction Y within a predetermined range.

If an electric current is applied to the flat coil 88, the electric current flows in the second direction Y at its thrust-generating portions 89a and 89b because the thrust-generating portions 89a and 89b are extended in the second direction Y. On this occasion, since the magnetic flux of the magnetic circuit acts in the up-and-down direction which is vertical to the thrust-generating portions 89a and 89b, force directed in the first direction X acts on the two coils 88 and 91 in accordance with Fleming's left-hand rule. Thus, the first moving frame 51 to which the coil assembly body 93 and the like are fixed moves in the first direction X. As a result, the correcting lens 15 held by the first moving frame 51 moves in the first direction X, guided by the first guide, in accordance with the magnitude of the electric current applied to the flat coil 88.

On the other hand, if an electric current is applied to the cylindrical coil 91, the electric current flows in the first direction X at its thrust-generating portion 92 because the thrust-generating portion 92 is extended in the first direction X. On this occasion, since the magnetic flux of the magnetic circuit acts in the up-and-down direction which is vertical to the thrust-generating portion 92, force directed in the second direction Y acts on the two coils 88 and 91 according to Fleming's left-hand rule. Thus, the second moving frame 52 moves in the second direction Y by means of the first moving frame 51 to which the coil assembly body 93 and the like are fixed. As a result, the correcting lens 15 moves in the second direction Y, with the first moving frame 51 and the second moving frame 52 guided by the second guide, in accordance with the magnitude of the electric current applied to the cylindrical coil 91.

Further, if electric currents are simultaneously applied to the flat coil 88 and the cylindrical coil 91, the movement by the flat coil 88 and the movement by the cylindrical coil 91, both of which have been mentioned above, are performed in a combined manner. Specifically, the correcting lens 15 moves in the first direction X due to the action of the electric current which flows through the flat coil 88, and at the same time the correcting lens 15 moves in the second direction Y due to the action of the electric current which flows through the cylindrical coil 91. As a result, the correcting lens 15 moves in a diagonal direction, thereby stabilizing images of the lens system 2.

A cover member 98 is installed on the image stabilizer 5 with the above-mentioned structure in a detachable manner, as shown in FIGS. 27 to 29. Having an upper surface portion 98a, a front surface portion 98b, and left and right side surface portions 98c (one of the side surface portions is not shown in the figures), the cover member 98 is formed of a case roughly shaped like a rectangular parallelepiped with openings made in its rear and lower surfaces. A pullout opening 201 from which the flexible printed circuit board 87, whose one end is connected to the coil assembly body 93, is pulled out is provided in a part where the upper surface portion 98a is continuous with the front surface portion 98b.

The cover member 98 covers the electric actuator 54 of the image stabilizer 5 to be protected, and is constructed in a detachable manner from the yoke fixed portion 53b of the fixed base board 53. For that reason, a plurality of (two in this embodiment) attachment brackets 202 and 202 formed in such a manner as to be continuous to the rear surface side of the upper surface portion 98 and protrude downward, and a plurality of (two in this embodiment) attachment holes 203 and 203 formed in lower parts of the front surface portion 98b are provided in the cover member 98. On the yoke fixed portion 53b of the fixed base board 53 are provided the same number of attachment convex portions 204 which protrude in the lateral direction, corresponding to these attachment holes 203.

By fitting the attachment holes 203 to the two attachment convex portions 204, the cover member 98 is installed on the fixed base board 53. On this occasion, the two attachment brackets 202 and 202 are constructed in such a manner as to elastically engage with a lower barrel 18 of the barrel body 3 or the like, for example. This makes it possible for the cover member 98 to be attached to the barrel body 3 in a freely detachable manner due to the structure of the cover member 98 itself, without using a fastening mechanism such as fixed screws.

Also, in the pullout opening 201 of the cover member 98 is provided a flexible pressing portion 205 which prevents the pulled-out flexible printed circuit board 87 from being lifted up. And a pair of locking projections 206a and 206b which support both sides of the pulled-out flexible printed circuit board 87 in its widthwise direction are provided at the front of the upper surface portion 98a at the top of the pullout opening 201 in such a manner as to project upward. And a locking protrusive side 207 which supports a certain area of the flexible printed circuit board 87 is provided at the rear of the upper surface portion 98a. Although not shown in the figures, parts of the flexible printed circuit board 87 extending ahead are electrically connected to a power source or a member on the power source side connected to the power source.

The locking projections 206a and 206b and the locking protrusive side 207 are used as shown in FIG. 28 and FIGS. 34 to 36. Specifically, the pair of locking projections 206a and 206b lock the starting portion of a flat surface portion 87b which is continuous to a curved portion 87a curved according to a certain curvature radius after pulled out of the pullout opening 201, at both sides of the starting portion in a widthwise direction. This makes the curved portion 87a elastic, and the first moving frame 51 can be biased toward the side of the second moving frame 52 by means of the elastic force.

The effects brought about by biasing force W generated by the curved portion 87a of this flexible printed circuit board 87 are explained, referring to FIGS. 43 and 44. FIGS. 43 and 44 are explanatory diagrams schematically showing the biasing force W generated in the curved portion 87a, the first moving frame 51, the second moving frame 52 and the fixed base board 53 to explain relationships between them. Since one end of the flexible printed circuit board 87 is fixed to the cover member 98 fixed to the barrel body 3, this cover member 98 is a fixed part.

In FIG. 43, when the biasing force W is given to the flexible printed circuit board 87 by the curved portion 87a, the biasing force W causes force which pushes the left part downward and pushes the right part upward in reaction thereto to act on the first moving frame 51. Thus, regarding the first main guide shaft 63 fixed to the first moving frame 51, a left protrusive portion 63a is pushed downward, and a right protrusive portion 63b is pushed upward. As a result, between the first main guide shaft 63 and the bearing piece 71a which supports the left protrusive portion 63a of the first main guide shaft 63, a gap E1 according to the fitting error is oriented only upward. On the other hand, between the first main guide shaft 63 and the bearing piece 71b which supports the right protrusive portion 63b of the first main guide shaft 63, a gap E1 according to the fitting error is oriented only downward. Also, in FIG. 44, regarding the first sub bearing portion 62 provided on the first moving frame 51, force which pushes downward makes the upper surface of the bearing groove 64 pressed from above by the first sub guide shaft 65 fixed to the second moving frame 52, and a gap E2 according to the measurement error is oriented only downward.

At the same time, in FIGS. 43 and 44, force which pushes the left part downward and pushes the right part upward in reaction to that acts on the second moving frame 52. Thus, regarding the second moving frame 52, the left part is pushed downward, and the right part is pushed upward. As a result, between the fourth main bearing portion 82 and the second main guide shaft 77, gaps F1 according to the fitting error are both oriented only downward at the bearing portions 82a and 82b on both sides. Between the third sub bearing portion 76 and the second sub guide shaft 79, meanwhile, force which pushes upward makes the lower surface of the bearing groove 78 pressed from below by the second sub guide shaft 79 fixed to the fixed base board 53, and a gap F2 according to the measurement error is oriented only upward.

Thus, it is possible to keep the posture of the correcting lens 15 invariable, by keeping the posture of the second moving frame 52 and first moving frame 51 fixed with respect to the fixed base board 53, based upon the biasing force W generated by the curved portion 87a of the flexible printed circuit board 87. Moreover, since a typically-used flexible printed circuit board 87 is used as it is, and no parts, mechanisms or the like are newly required for the posture control; therefore, the posture control can be performed without increasing costs. Also, with the magnetic plate 86 being close to the magnet 67b, attracting force according to the magnetic force of the magnetic plate 86 and the magnet 67b is generated; and the biasing force W becomes stronger by combining this attracting force with the biasing force W generated in the curved portion 87a of the flexible printed circuit board 87.

FIGS. 45 and 46 show an embodiment in which a biasing force W generated by a curved portion 87a of a flexible printed circuit board 87 can be altered. In this embodiment, only the shape of a flexible printed circuit board 87 is different from that of the above-described embodiment. Therefore, only the flexible printed circuit board 87 will be explained here and the same reference numerals are given to the same parts to omit duplicate explanations. A curved portion 87b of the flexible printed circuit board 87 is made thinner than the other part thereof by cutting both sides in the form of circular arcs in the widthwise direction, and so the rigidity (strength) of the curved portion 87b is set weaker than that of the other part. This construction makes it possible to arbitrarily set the rigidity (strength) of the curved portion 87b weaker than that of the other part.

It should be noted that the shape of the curved portion 87b of the flexible printed circuit board 87 is not limited to the circular arcs shown in this embodiment; for example, triangles, squares, semiellipses and various other shapes can be employed. Also, a recess for the curved portion 87b may be provided only on one side. Further, the curved portion 87b can be constructed as a curved portion, not by providing a recess on the outer edge of the flexible printed circuit board 87, but by making circular, elliptical, rhombic or other holes inside thereof and thus making the rigidity (strength) of the portion lower than that of the other part.

FIGS. 47 to 49 show a structure in which the part ahead of a curved portion 87a of a flexible printed circuit board 87 is not supported by a cover member 98 but supported by a fixed base board 53. Therefore, on the lower surface of a yoke fixed portion 53b of the fixed base board 53, a pair of locking projections 206a and 206b which support both sides of the part ahead of the curved portion 87a in the widthwise direction are provided to project downward. Similar effectiveness to the above-described embodiment can be obtained by employing such supporting structure as well.

The effects brought about by a biasing force W generated by the curved portion 87a of this flexible printed circuit board 87 are explained, referring to FIGS. 50 and 51. FIGS. 50 and 51 are explanatory diagrams schematically showing the biasing force W generated in the curved portion 87a, a first moving frame 51, a second moving frame 52 and the fixed base board 53 to explain relationships between them. Since one end of the flexible printed circuit board 87 is fixed to the fixed base board 53 fixed to the barrel body 3, this fixed base board 53 is a fixed part.

In FIG. 50, when the biasing force W is given to the flexible printed circuit board 87 by the curved portion 87a, force which pushes the left part upward and pushes the right part downward in reaction to that acts on the first moving frame 51 by means of the biasing force W. Thus, regarding a first main guide shaft 63 fixed to the first moving frame 51, a left protrusive portion 63a is pushed upward, and a right protrusive portion 63b is pushed downward. As a result, between the first main guide shaft 63 and a bearing piece 71a which supports the left protrusive portion 63a of the first main guide shaft 63, a gap E1 according to the fitting error is oriented only downward. Meanwhile, between the first main guide shaft 63 and a bearing piece 71b which supports the right protrusive portion 63b of the first main guide shaft 63, a gap E1 according to the fitting error is oriented only upward. Also, in FIG. 51, regarding a first sub bearing portion 62 provided on the first moving frame 51, force which pushes upward makes the lower surface of a bearing groove 64 pressed from below by a first sub guide shaft 65 fixed to the second moving frame 52, and a gap E2 according to the measurement error is oriented only upward.

At the same time as this, in FIGS. 50 and 51, force which pushes the left part upward and pushes the right part downward in reaction to that acts on the second moving frame 52. Thus, regarding the second moving frame 52, the left part is pushed upward, and the right part is pushed downward. As a result, between a fourth main bearing portion 82 and a second main guide shaft 77, gaps F1 according to the fitting error are both oriented only upward at bearing portions 82a and 82b on both sides. Between a third sub bearing portion 76 and a second sub guide shaft 79, meanwhile, force which pushes downward makes the upper surface of a bearing groove 78 pressed from above by the second sub guide shaft 79 fixed to the fixed base board 53, and a gap F2 according to the measurement error is oriented only downward.

Thus, it is possible to keep the posture of a correcting lens 15 invariable, by keeping the posture of the second moving frame 52 and first moving frame 51 fixed with respect to the fixed base board 53, based upon the biasing force W generated by the curved portion 87a of the flexible printed circuit board 87. Moreover, since a typically-used flexible printed circuit board 87 is used as it is, and no parts, mechanisms or the like are newly required for the posture control, the posture control can be performed without increasing costs. Also, attracting force according to the magnetic force of a magnetic plate 86 and a magnet 67b is generated by making the magnetic plate 86 close to the magnet 67b; and therefore it is possible to make the biasing force W stronger by combining the attracting force with the biasing force W generated in the curved portion 87a of the flexible printed circuit board 87.

FIG. 52 shows another embodiment of an attached state of an electric actuator 54. In this embodiment, the attached angle of the electric actuator 54 is shifted by 90° from the above-described embodiment, and as regards the components only the position of a supporting portion 84 of a fixed base board 53 supporting a coil assembly body 93 is different from that in the above-described embodiments. Therefore, the same reference numerals as in the above-described embodiment are given and duplicate explanations thereof will be omitted.

In this embodiment, the electric actuator 54 is attached to a first moving frame 51, rotationally shifted by 90°. Specifically, a flat coil 88 is attached to the first moving frame 51 such that a thrust-generating portion extends in the direction in which the first moving frame 51 moves. Correspondingly, in a yoke fixed portion 53b of the fixed base board 53, upper and lower pieces 66a and 66b of a yoke 66 and upper and lower magnets 67a and 67b are disposed such that the lengthwise direction thereof extends in the direction in which the first moving frame 51 moves. Similar effectiveness to the above-described embodiment can be obtained by employing such structure as well.

FIGS. 53 to 59 show further another (third) embodiment of an image stabilizer according to the present invention. This embodiment shows a modified example of the flat coil 88 in the above-described embodiment: two coil portions are constructed of the same coil portions 88a and 88a. And the magnetic force of magnets 67a and 67b is strengthened by constructing a yoke with a circular member. Regarding an electric actuator 54A shown in this embodiment, the same parts as those of the electric actuator 54 shown in the above-described embodiment are given the same reference numerals, and duplicate explanations thereof are omitted.

Two coil portions 88a of a flat coil 88 of the electric actuator 54A have the same shape and structure, and the relationship regarding arrangement between the flat coil 88, a cylindrical coil 91 and a magnetic plate 86 is the same. Also, a yoke 66A is a combination of two divided pieces 66A1 and 66A2 having the same shape, and is formed into a rectangular frame body as a whole. The cylindrical coil 91 is wound around one side of this yoke 66A, and the yoke 66A and the cylindrical coil 91 are joined together like a chain. Similar effectiveness to the above-described embodiments can be obtained by employing such structure as well. In particular, according to this embodiment, since the yoke 66A is circularly formed, there is an advantage of enhancing magnetic efficiency by the magnets 67a and 67b.

An image stabilizer 5 with the above-described structure and functions is attached to a lens barrel 1, as shown in FIGS. 1 to 11. This image stabilizer 5 is inserted into and pulled out of an opening portion 48, provided in a lower barrel 18 of a barrel body 3, from the lateral direction; and attached to the lower barrel 18 in a detachable manner. In this case, the image stabilizer 5 is constructed as a unit of one apparatus, so that it can be attached and detached particularly easily and swiftly. Note that, a cover member 98 is attached to the lower barrel 18 of the barrel body 3 in a detachable manner by a fastening mechanism such as fixed screws.

FIGS. 60 to 64 are figures showing a digital still camera 100 which is a first embodiment of an imager apparatus provided with a lens barrel 1 having the above-described structure. This digital still camera 100 uses a semiconductor recording medium as an information recording medium, and an optical image from an object is converted to an electric signal in a CCD (imager) so as to be recorded in the semiconductor recording medium and displayed on a display apparatus such as a liquid crystal display.

As shown in FIG. 60 and other figures, this digital still camera 100 includes: a camera body 101, a lens barrel 1, a display apparatus 102, a control unit 103, a battery power not shown in the figures and the like. The camera body 1 shows a specific example of an imager apparatus body. The lens barrel 1 captures an image of an object as light and leads it to a CCD 4 functioning as an imager. The display apparatus 102 is formed of a liquid crystal display which displays an image based upon a image signal that is output from the CCD 4, and the like. The control unit 103 controls the action of the lens barrel 1, the display of the liquid crystal display 102 and the like.

The camera body 101 is formed of a wide flat case, including: a front case 105 and a rear case 106 fitted together in an anteroposterior direction; a main frame 107 which divides a space portion formed by the front and rear cases 105 and 106 into front and rear portions; a lens cover 108 which is attached to the front surface of the front case 105 in a slidable manner in the up-and-down direction; and the like. An objective lens 7A of the lens barrel 1 is disposed facing the front surface (first main surface) of the main frame 107, and the objective lens 7A can be opened and closed by the lens cover 108.

The objective lens 7A is disposed at an upper part on one side of the main frame 107, and the lens barrel 1 is attached to the camera body 101 with the CCD 4 disposed below and the second optical axis L2 directed in the up-and-down direction. And the first optical axis L1 of the lens system 2 is extended in the anteroposterior direction which is a widthwise direction of the camera body 101. Thus, the electric actuator 54 that is a driver of the image stabilizer 5 is disposed at one side in the direction which is perpendicular to the second optical axis L2 and which is parallel to the first main surface, inside the camera body 101. Note that, the control device 103 formed by installing a predetermined microcomputer, resistance, capacitor, other electronic parts and the like on a wiring substrate; a flash apparatus 110; and the like are attached to the main frame 107.

The control unit 103 is provided side by side with the lens barrel 1, and the flash device 110 is provided above. The flash device 110 includes: a light-emitting portion 110a which is exposed on the front surface of the front case 105; a drive portion 10b which drives and controls the light-emitting portion 110a; a capacitor 110c which supplies predetermined electric power to the drive portion 110b; and the like. In order to expose the light-emitting portion 110a of this flash device 110 and an objective lens 7A of the lens barrel 1, a lens fitting hole 111a and a flash fitting hole 111b are provided at corresponding positions of the front case 105. The objective lens 7A is fitted into the lens fitting hole 111a along with a panel 21, and the light-emitting portion 110a is fitted into the flash fitting hole 111b.

Further, a plurality of openings 111c through which a plurality of leg pieces provided on the lens cover 108 are inserted are provided in the front case 105. The lens cover 108 is prevented from falling off the front case 105 by providing the plurality of leg pieces with detachment-preventing portions. This lens cover 108 can be moved in the up-and-down direction by the plurality of openings 111c, and can be locked at the top and bottom by a locking mechanism not shown in the figures. As shown in FIG. 61, when the lens cover 108 is at the top, the objective lens 7A is completely closed, thereby protecting the objective lens 7A. On the other hand, as shown in FIG. 62, when the lens cover 108 has moved to the bottom, the objective lens 7A is completely opened and the power switch is turned on, thereby making shooting possible.

As shown in FIGS. 60 and 63, a square opening window 112 for exposing the display surface of the display apparatus 102 is provided in the rear case 106. The opening window 112 is provided, with a large opening made in the back surface, which is a second main surface, of the rear case 106, and the display apparatus 102 is provided inside thereof. The display apparatus 102 is a combination of a liquid crystal display having a size corresponding to the opening window 112 and a back light fitted onto the inner surface of this liquid crystal display. A protective plate 114 is provided on the liquid crystal display side of the display apparatus 102 with a seal frame 113 in between, and the peripheral edge of this protective plate 114 is brought in contact with the inner surface of the opening window 112.

Further, various operational switches are provided in the rear case 106. As the operational switches, there are provided in appropriate positions a mode selection knob 115, a zoom button 116, a screen display button 117, a menu button 118, a direction key 119, a screen button 121 and the like. The mode selection knob 115 selects a function mode (still image, moving image, playback and the like). The zoom button 116 performs zooming operation. The screen display button 117 performs screen display. The menu button 118 selects various menus. The direction key 119 moves a menu-selecting cursor and the like. The screen button 121 switches screen sizes and deletes a screen. A speaker hole 122 is made at an end of the rear case 106 on the side of the display apparatus 102, in which a loudspeaker is incorporated, and a strap supporting metal piece 123 is attached to an end on the opposite side thereof.

Also, as shown in FIG. 64 and other figures, on the upper surface of the camera body 101 are provided: a power button 125 with which to turn the power on/off; a shooting button 126 with which to start and end shooting; a camera shake setting button 127 with which to stabilize image by operating an image stabilizer 5 when a camera shake occurs; and the like. Further, a microphone hole 128 is made approximately at the center of the upper surface of the camera body 101, in which a microphone is incorporated.

The power button 125, the shooting button 126 and the camera shake setting button 127 are all attached to a switch holder 124 installed in the camera body 101. Further, the microphone hole 128 is also made in the switch holder 124, and the built-in microphone is fixed to this switch holder 124. And the switch holder 124 is held by the camera body 101 in such a manner that part of the switch holder 124 is held between the front case 105 and rear case 106.

FIG. 65 is a block diagram explaining the control concept of the above-described image stabilizer 5. A control unit 130 includes: an image stabilization calculating unit 131; an analog servo unit 132; a driving circuit unit 133; four amplifiers (AMP) 134A, 134B, 135A and 135B; and the like. To the image stabilization calculating unit 131 are connected a first gyro sensor 136 via the first amplifier (AMP) 134A, and a second gyro sensor 137 via the second amplifier (AMP) 134B.

The first gyro sensor 136 detects the amount of displacement in the first direction X caused by a camera shake or the like applied to the camera body 101, and the second gyro sensor 137 detects the amount of displacement in the second direction Y caused by a camera shake or the like applied to the camera body 101. Although an example in which the amount of displacement in the first direction X and the amount of displacement in the second direction Y are separately detected by providing two gyro sensors has been explained in this embodiment, needless to say, the amount of displacement in the two directions, the first direction X and second direction Y, may be detected by one gyro sensor.

The analog servo unit 132 is connected to the image stabilization calculating unit 131. The analog servo unit 132 converts a value calculated by the image stabilization calculating unit 131 from a digital value to an analog value, and outputs a control signal corresponding to the analog value. The driving circuit unit 133 is connected to the analog servo unit 132. To the driving circuit unit 133 are connected: the first hall element 94, which is a first position-detecting element, via the third amplifier (AMP) 135A; and the second hall element 95, which is a second position-detecting element, via the fourth amplifier (AMP) 135B. Further, to the driving circuit unit 133 are connected: the flat coil 88, which is a first coil; and the cylindrical coil 91, which is a second drive coil.

The amount of displacement of the first moving frame 51 in the first direction X, detected by the first hall element 94, is input to the driving circuit unit 133 via the third amplifier 135A. Also, the amount of displacement of the second moving frame 52 in the second direction Y, detected by the second hall element 95, is input to the driving circuit unit 133 via the fourth amplifier 135B. Based upon the input signals and the control signal from the analog servo unit 132, the driving circuit unit 133 outputs a predetermined control signal to either the flat coil 88 or the cylindrical coil 91 or to both of them, in order to move the correcting lens 15 for stabilizing images.

FIG. 66 is a block diagram showing a first embodiment of a schematic configuration of a digital still camera 100 provided with an image stabilizer 5 having the above-described structure and functions. This digital still camera 100 includes a lens barrel 1, a control unit 140, a storage apparatus 141, an operation unit 142, a display apparatus 102, an external memory 143 and the like. The lens barrel 1 has an image stabilizer 5. The control unit 140 plays a central role in a control apparatus. The storage apparatus 141 has a program memory, data memory, other RAM/ROM or the like for driving the control unit 140. The operation unit 142 inputs various instruction signals or the like for turning the power on/off, selecting a shooting mode, performing shooting or the like. The display apparatus 102 displays a captured image or the like. The external memory 143 enlarges storage capacity.

The control unit 140 includes an operational circuit having a microcomputer (CPU); and the like, for example. The storage apparatus 141, the operation unit 142, an analog signal processing unit 144, a digital signal processing unit 145, two A/D converters 146 and 147, a D/A converter 148, and a timing generator (TG) 149 are connected to this control unit 140. The analog signal processing unit 144 is connected to a CCD 4 attached to the lens barrel 1, and performs predetermined signal processing by means of an analog signal corresponding to a captured image output from the CCD4. This analog signal processing unit 144 is connected to the first A/D converter 146, and an output thereof is converted to a digital signal by this A/D converter 146.

To the first A/D converter 146 is connected the digital signal processing unit 145 which performs predetermined signal processing by means of a digital signal supplied from the first A/D converter 146. To this digital signal processing unit 145 are connected the display apparatus 102 and the external memory 143, and an image corresponding to an object is displayed on the display apparatus 102 or stored in the external memory 143, based upon a digital signal that is an output signal of the digital signal processing unit 145. Also, to the second A/D converter 147 is connected a gyro sensor 151 showing a specific example of a blur-detecting unit. A vibration, shake or the like of a camera body 101 is detected by this gyro sensor 151, and image stabilization is performed according to the detected result.

To the D/A converter 148 is connected a driving control unit 152 which is a servo calculating unit for image stabilization. The driving control unit 152 stabilizes images by driving and controlling the image stabilizer 5 in accordance with the position of a correcting lens 15. To the driving control unit 152 are connected the image stabilizer 5, and a first position detector 94 and second position detector 95 which are position-detecting units that detect the position of the correcting lens 15 by detecting the positions of two moving frames 51 and 52. In addition, the timing generator (TG) 149 is connected to the CCD 4.

Thus, when an image of an object has been input to a lens system 2 of the lens barrel 1 and then an image has been formed on the focal plane of the CCD 4, an image signal thereof is output as an analog signal to which predetermined processing is carried out at the analog signal processing unit 144 and after that which is converted to a digital signal by the first A/D converter 146. After predetermined processing is carried out at the digital signal processing unit 145, an output from the first A/D converter 146 is displayed on the display apparatus 102 as an image corresponding to the object, or is stored in an external memory as memory information.

In the above-described shooting state, when a vibration, shake or the like is applied to the camera body 101 with the image stabilizer 5 in the operational state, the gyro sensor 151 detects the vibration, shake or the like and then outputs a detection signal thereof to the control unit 140. On receipt of this, the control unit 140 performs predetermined calculation processing, and outputs a control signal which controls the action of the image stabilizer 5 to the driving control unit 152. The driving control unit 152 outputs a predetermined driving signal to the image stabilizer 5 based upon the control signal from the control unit 140, thereby moving the first moving frame 51 in the first direction X by a predetermined amount and moving the second moving frame 52 in the second direction Y by a predetermined amount. This makes it possible to stabilize images by means of the movement of the correcting lens 15 and thus to obtain an excellent image.

FIG. 67 is a block diagram showing a second embodiment of the schematic configuration of a digital still camera provided with an image stabilizer 5 having the above-described structure and functions. This digital still camera 100A includes a lens barrel 1, a video recording/reproducing circuit unit 160, an internal memory 161, a video signal processing unit 162, a display apparatus 163, an external memory 164, a correcting lens control unit 165 and the like. The lens barrel 1 has an image stabilizer 5. The video recording/reproducing circuit unit 160 plays a central role in a control device. The internal memory 161 has a program memory, data memory, other RAM/ROM or the like for driving the video recording/reproducing circuit unit 160. The video signal processing unit 162 processes a captured image or the like into a predetermined signal. The display apparatus 163 displays a captured image or the like. The external memory 164 enlarges storage capacity. The correcting lens control unit 165 drives and controls the image stabilizer 5.

The video recording/reproducing circuit unit 160 includes: an operational circuit having a microcomputer (CPU); and the like, for example. The internal memory 161, the video signal processing unit 162, the correcting lens control unit 165, a monitor driving unit 166, an amplifier 167 and three interfaces (I/F) 171, 172 and 173 are connected to this video recording/reproducing circuit unit 160. The video signal processing unit 162 is connected to a CCD 4 attached to the lens barrel 1, via the amplifier 167, and a signal which has been processed into a predetermined video signal is input to the video recording/reproducing circuit unit 160.

The display apparatus 163 is connected to the video recording/reproducing circuit unit 160 via the monitor driving unit 166. Also, a connector 168 is connected to the first interface (I/F) 171, and the external memory 164 can be connected to this connector 168 in a freely detachable manner. A connecting terminal 174 provided in a camera body 101 is connected to the second interface (I/F) 172.

An acceleration sensor 175, which is a blur-detecting unit, is connected to the correcting lens control unit 165 via the third interface (I/F) 173. This acceleration sensor 175 detects displacement applied to the camera body 101 due to vibration, shake or the like, as acceleration, and a gyro sensor can be used as this acceleration sensor 175. To the correcting lens control unit 165 are connected: a lens driving unit of the image stabilizer 5, which drives and controls a correcting lens 15; and two position-detecting sensors 94 and 95 which detect the position of the correcting lens 15.

Thus, when an image of an object has been input to a lens system 2 of the lens barrel 1 and then an image has been formed on the focal plane of the CCD 4, an image signal thereof is input to the video signal processing unit 162 via the amplifier 167. A signal which has been processed into a predetermined video signal at this video signal processing unit 162 is input to the video recording/reproducing circuit unit 160. Thus, a signal corresponding to the image of the object is output from the video recording/reproducing circuit unit 160 to the monitor driving unit 166, and the internal memory 161 or the external memory 164. As a result, an image corresponding to the image of the object is displayed on the display apparatus 163 via the monitor driving unit 166, or is recorded in the internal memory 161 or in the external memory 164 as an information signal, according to need.

In the above shooting state, when a vibration, shake or the like is applied to the camera body 101 with the image stabilizer 5 in the operational state, the acceleration sensor 175 detects the vibration, shake or the like and then outputs a detection signal thereof to the video recording/reproducing circuit unit 160 via the correcting lens control unit 165. On receipt of this, the video recording/reproducing circuit unit 160 performs predetermined calculation processing, and outputs a control signal, which controls the action of the image stabilizer 5, to the correcting lens control unit 165. This correcting lens control unit 165 outputs a predetermined driving signal to the image stabilizer 5 based upon the control signal from the video recording/reproducing circuit unit 160, thereby moving a first moving frame 51 in the first direction X by a predetermined amount and moving a second moving frame 52 in the second direction Y by a predetermined amount. This makes it possible to stabilize images by means of the movement of the correcting lens 15 and thus to obtain an excellent image.

As explained above, according to an embodiment of an image stabilizer of the present invention, since a driver is disposed at one side of a correcting lens, the image stabilizer can be small-sized and light in weight. Further, since one magnetic circuit member including a magnet and a yoke serves as a magnetic circuit for a first driver and a magnetic circuit for a second driver, the number of components can be reduced and an apparatus itself can be small-sized and light in weight. As a result, a lens barrel in which an image stabilizer according to an embodiment of the present invention is installed, and the whole of an imager apparatus incorporating the lens barrel can be small-sized and light in weight.

Also, since a magnet used for constructing a magnetic circuit member serves as a magnet for a first position detector and second position detector which detect the positions of a first guide (a first moving frame 51) and second guide (second moving frame 52) respectively, further the number of components can be reduced. Further, it is possible to eliminate rattle caused by a gap between a shaft and bearing portion, because a flexible printed circuit board is bent to be U-shaped, and repulsive force is applied between the first guide and a fixed base board or fixed portion, to which a fixed base board such as a barrel is fixed, and forces the relevant part in an optical axis direction, and so a correcting lens is forced toward the optical axis direction. As a result, a moving frame which holds the correcting lens can be moved smoothly, and the posture of the correcting lens is kept invariable, thereby preventing deterioration in optical performance caused by fluctuation of the posture of the correcting lens.

Further, in the case where a lens barrel is constructed as a collapsible lens and light which has penetrated through an objective lens is led to a correcting lens of an image stabilizer after being bent by 90° in a prism, the correcting lens becomes parallel with the ground when the posture of an imager apparatus is correct, and a first direction and a second direction, which are the moving directions of the correcting lens, are perpendicular to the direction in which gravity acts. Thus, the first and second moving frames which hold the correcting lens in a freely movable manner are not pulled toward the first direction or second direction by gravity, and it is not necessary to leave the image stabilizer power-on all the time in order to hold up the first and second moving frames in a direction opposed to gravity. As a result, power consumption can be reduced greatly when capturing images with the posture of the imager apparatus correct, and the length of time for which the imager apparatus can be used can be made long. Moreover, it is possible to reduce the thrust with which to move the correcting lens, and so an allowance for the weight of the first and second moving frames, namely a hand shake acceleration of approximately 1 G, is made possible, and a shake of a camera such as considerable hand shake can be coped with. However, the present invention is not limited to a collapsible lens system, and needless to say the present invention can be applied to a linear-type lens in which an optical axis is kept straight all the way.

The present invention is not limited to the embodiments described earlier and shown in the drawings, but various modifications are possible without deviating from the gist of the present invention. For example, although examples in which a digital still camera is used as an imager apparatus have been explained in the above-described embodiments, the present invention can be applied to digital video cameras, camera-equipped personal computers, mobile phone with a built-in camera and other imager apparatuses as well. Further, although examples in which five-group lenses are used as a lens barrel 1 have been explained, needless to say, the present invention can be applied to four-group lenses or fewer and also can be applied to six-group lenses or more as well.

It should be understood by those skilled in the art that various modifications, combinations, sub-combinations and alterations may occur depending on design requirements and other factors insofar as they are within the scope of the appended claims or the equivalents thereof.

What is claimed is:

1. An image stabilizer that stabilizes images by moving a correcting lens of a lens system in a first direction perpendicular to an optical axis of the lens system and in a second direction perpendicular to the optical axis of the lens system and to the first direction, the image stabilizer comprising:
   a driver positioned at one side of the correcting lens which moves the correcting lens in the first direction and in the second direction, the driver comprising:
      a first flat coil comprising first adjacent linear thrust-generating coil portions of different lengths that generate thrust for moving the correcting lens in the first direction;
      a second flat coil comprising second adjacent linear thrust-generating coil portions that generate thrust for moving the correcting lens in the second direction;

magnets that apply magnetic force to the first coil and to the second coil; and a yoke supporting the magnets and having a protrusion positioned on a side of the shorter of the first thrust-generating portions and in a region where the longer of the first thrust-generating portions extends beyond the shorter of the thrust-generating portions, wherein the first coil and the second coil are positioned such that the first thrust-generating portions overlap the second thrust-generating portions at substantially a right angle, an electric current is made to flow in the same direction in the first thrust-generating portions and in the second thrust-generating portions, and the magnetic force is applied in common to the overlap.

2. An image stabilizer according to claim 1, further comprising:

a first guide that guides the correcting lens in the first direction; and a second guide that guides the correcting lens in the second direction, wherein the driver further comprises:

a first driver that moves the correcting lens in the first direction along the first guide; and a second driver that moves the correcting lens in the second direction along the second guide, the first driver includes the first coil, the magnets, and the yoke, and the second driver includes the second coil, the magnets, and the yoke.

3. An image stabilizer according to claim 2, wherein the first coil and the second coil are fixed to a base that supports the correcting lens in a movable manner by the first guide and the second guide, and the magnets and the yoke are fixed to a moving frame that holds the correcting lens.

4. An image stabilizer according to claim 2, wherein the first coil and the second coil are fixed to a moving frame that holds the correcting lens, and the magnets and the yoke are fixed to a base that supports the correcting lens in a movable manner by the first guide and the second guide.

5. An image stabilizer according to claim 1, wherein the magnets generate thrust by applying magnetic force to the first coil and to the second coil, and the magnets are used by a first position detector and a second position detector to detect the position of the correcting lens in the first direction and in the second direction, respectively.

6. An image stabilizer according to claim 5, wherein the first position detector and the second position detector have a first hall element and a second hall element, respectively, that detect the position of the correcting lens based on the position of the magnets, and the first hall element and the second hall element are mounted on a substrate.

7. A lens barrel, comprising:

an image stabilizer that stabilizes images by moving a correcting lens of a lens system in a first direction perpendicular to an optical axis of the lens system and in a second direction e perpendicular to the optical axis of the lens system and to the first direction, the image stabilizer having a driver positioned at one side of the correcting lens which moves the correcting lens in the first direction and in the second direction, the driver comprising:

a first flat coil comprising first adjacent linear thrust-generating coil portions of different lengths that generate thrust for moving the correcting lens in the first direction;

a second coil comprising second adjacent linear thrust-generating coil portions that generate thrust for moving the correcting lens in the second direction;

magnets that apply magnetic force to the first coil and to the second coil; and a yoke supporting the magnets and having a protrusion positioned on a side of the shorter of the first thrust-generating portions and in a region where the longer of the first thrust-generating portions extends beyond the shorter of the thrust-generating portions, wherein the first coil and the second coil are positioned such that the first thrust-generating portions overlap the second thrust-generating portions at substantially a right angle, an electric current is made to flow in the same direction in the first thrust-generating portions and in the second thrust-generating portions, and the magnetic force is applied in common to the overlap.

8. A lens barrel according to claim 7, wherein the lens system is collapsible, and a middle part of the optical axis is bent by approximately 90°, and the driver is positioned at a side perpendicular to a plane formed by a first optical axis on an objective lens side of the lens system and a second optical axis on an image formation side of the lens system.

9. An imager apparatus, comprising:

a lens barrel including an image stabilizer that stabilizes images by moving a correcting lens of a lens system in a first direction perpendicular to an optical axis of the lens system and in a second direction perpendicular to the optical axis of the lens system and to the first direction; and an imager apparatus case containing the lens barrel, wherein the image stabilizer has a driver positioned at a side of the correcting lens which moves the correcting lens in the first direction and in the second direction, the driver comprising:

a first flat coil comprising first adjacent linear thrust-generating coil portions that generate thrust for moving the correcting lens in the first direction;

a second coil comprising second adjacent linear thrust-generating coil portions that generate generates thrust for moving the correcting lens in the second direction;

magnets that apply magnetic force to the first coil and to the second coil; and a yoke supporting the magnets and having a protrusion positioned on a side of the shorter of the first thrust-generating portions and in a region where the longer of the first thrust-generating portions extends beyond the shorter of the thrust-generating portions, wherein the first coil and the second coil are positioned such that the first thrust-generating portions overlap the second thrust-generating portions at substantially a right angle, an electric current is made to flow in the same direction in the first thrust-generating portions and in the second thrust-generating portions, and the magnetic force is applied in common to the overlap.

10. An imager apparatus according to claim 9, wherein the lens system is collapsible, and a middle part of the optical axis is bent by approximately 90°, and the driver is positioned at a side perpendicular to a plane formed by a first optical axis on an objective lens side of the lens system and a second optical axis on an image formation side of the lens system.

11. An imager apparatus according to claim 9, wherein the imager apparatus case is flat and rectangular, and contains an objective lens of the lens system disposed on a surface;

a second optical axis of the lens system is parallel to the surface; and the driver is positioned at a side in a direction perpendicular to the second optical axis and parallel to the surface.

* * * * *